(12) United States Patent
Takashima

(10) Patent No.: US 7,533,224 B2
(45) Date of Patent: May 12, 2009

(54) APPARATUS, METHOD AND COMPUTER PROGRAM FOR CONTENT UTILIZATION MANAGEMENT

(75) Inventor: Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 392 days.

(21) Appl. No.: 10/984,519

(22) Filed: Nov. 8, 2004

(65) Prior Publication Data

US 2005/0131998 A1    Jun. 16, 2005

(30) Foreign Application Priority Data

| Nov. 6, 2003 | (JP) | ............................ P2003-376789 |
| Jan. 30, 2004 | (JP) | ............................ P2004-022638 |
| Apr. 19, 2004 | (JP) | ............................ P2004-123100 |

(51) Int. Cl.
    *G06F 13/00* (2006.01)
(52) U.S. Cl. .................. 711/154; 711/170; 711/205
(58) Field of Classification Search ................. 711/154, 711/170, 205
    See application file for complete search history.

(56) References Cited

U.S. PATENT DOCUMENTS

| 2004/0213092 | A1* | 10/2004 | Ueda et al. ............... 369/30.03 |
| 2005/0105727 | A1* | 5/2005 | Takashima et al. .......... 380/201 |
| 2005/0105888 | A1* | 5/2005 | Hamada et al. ............... 386/95 |
| 2005/0114295 | A1* | 5/2005 | Takashima .................. 707/1 |
| 2006/0101283 | A1* | 5/2006 | Kim et al. .................... 713/189 |
| 2006/0227973 | A1* | 10/2006 | Takashima et al. .......... 380/277 |
| 2007/0061584 | A1* | 3/2007 | Takashima et al. .......... 713/176 |

* cited by examiner

*Primary Examiner*—Reba I. Elmore
(74) *Attorney, Agent, or Firm*—K&L Gates LLP

(57) ABSTRACT

A processing device, processing method, and information recording medium manages copyright and utilization control of each of fragmented data of contents stored on the recording medium. The information recording medium has contents of a utilization management object recorded thereon. Main contents having a data format which complies with a particular audio visual format, and sub-contents having another data format which does not comply with the audio visual format, are stored as recording data on the information recording medium. Configuration data of the main contents and the sub-contents are set as contents management units, and the data included in the contents management units are stored as encrypted data, encrypted with individual unit keys individually corresponding to the contents management units.

65 Claims, 34 Drawing Sheets

| INDEX OR APPLICATION FILE OR DATA GROUP IN APPLICATION LAYER | CONTENTS MANAGEMENT UNIT(CPS) | UNIT KEY(CPS) | |
|---|---|---|---|
| TITLE 1 | CPS1 | Ku1 | |
| TITLE 2 | CPS1 | Ku1 | |
| APPLICATION 1 | CPS2 | Ku2 | MAIN CONTENTS CORRESPONDENCE DATA |
| APPLICATION 2 | CPS3 | Ku3 | |
| ⋮ | ⋮ | ⋮ | |
| DATA GROUP 1 | CPS4 | Ku4 | |
| DATA GROUP 2 | CPS5 | Ku5 | SUB CONTENTS CORRESPONDENCE DATA |
| ⋮ | ⋮ | ⋮ | |

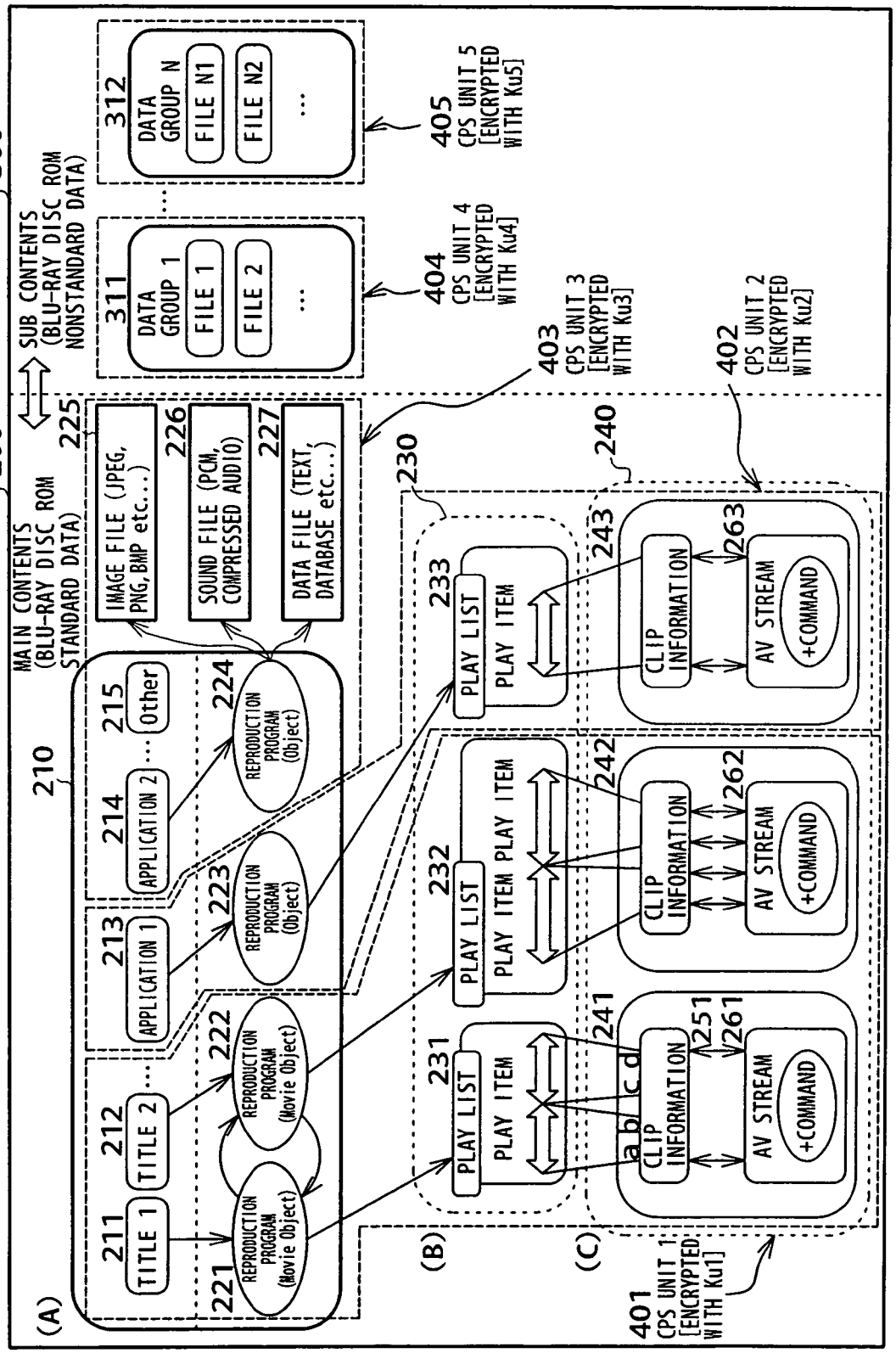

FIG. 4

| INDEX OR APPLICATION FILE OR DATA GROUP IN APPLICATION LAYER | CONTENTS MANAGEMENT UNIT(CPS) | UNIT KEY(CPS) | |
|---|---|---|---|
| TITLE 1 | CPS1 | Ku1 | MAIN CONTENTS CORRESPONDENCE DATA |
| TITLE 2 | CPS1 | Ku1 | |
| APPLICATION 1 | CPS2 | Ku2 | |
| APPLICATION 2 | CPS3 | Ku3 | |
| .. | .. | .. | |
| DATA GROUP 1 | CPS4 | Ku4 | SUB CONTENTS CORRESPONDENCE DATA |
| DATA GROUP 2 | CPS5 | Ku5 | |
| .. | .. | .. | |

| INDEX OR APPLICATION FILE OR DATA GROUP IN APPLICATION LAYER | CONTENTS MANAGEMENT UNIT (CPS) | UNIT KEY (CPS) |
| --- | --- | --- |
| First Playback | CPS1 | Ku1 |
| Top Menu | CPS1 | Ku1 |
| TITLE 1 | CPS2 | Ku2 |
| .. | .. | .. |
| APPLICATION 1 | CPS3 | Ku3 |
| .. | .. | .. |
| DATA GROUP 1 | CPS4 | Ku4 |
| DATA GROUP 2 | CPS5 | Ku5 |
| .. | .. | .. |

Rows "First Playback" through "APPLICATION 1": MAIN CONTENTS CORRESPONDENCE DATA
Rows "DATA GROUP 1" onward: SUB CONTENTS CORRESPONDENCE DATA

FIG.10

| CONTENTS MANAGEMENT UNIT (CPS) | INITIAL STATE | CURRENT STATE |
|---|---|---|
| CPS1 | Discrete only | Discrete |
| CPS2 | Discrete initially | Bound |
| CPS3 | Bound only | Bound |
| CPS4 | Bound initially | Discrete |
| .. | .. | .. |
| CPSm | Discrete only | Discrete |

FIG. 11

| field NAME | num_of_bits | |
|---|---|---|
| Num_of_Content | 16 | |
| for(i=0;i<Num_OF_Content;i++){ | | |
|   CCI_and_other_info_for_Content[i] | 128 | |
| } | | |

| | | SOME OR ALL OF THE FOLLOWING INFORMATION IS HELD IN FLAG, VALUE. (THE BIT NUMBER USED BY VALUE IS ARBITRARY) |
|---|---|---|
| CONTENTS OF CCI_and_other_info_for_Content[i]: | (FRAG/VALUE) | (SUBSTANCE) |
| <OPERATION IN Discrete STATE> | | |
| REPRODUCTION | FLAG | OK/NG |
| REPRODUCTION METHOD OF CONTENTS WHICH CANNOT BE REPRODUCED IN Discrete STATE | VALUE | "CONNECTION TO KEY DISTRIBUTING SERVER", "INSERTION OF MEMORY CARD INCLUDING KEY" |
| DESIGNATION OF SERVER | VALUE | INDEX VALUE INTO SERVER LIST |
| <OPERATION IN Bound STATE> | | |
| COPY-STREAMING COMPATIBILITY INFORMATION | VALUE | COMPATIBILITY INFORMATION FOR REPRODUCTION OF CONTENTS ON ANOTHER APPARATUS IN NETWORK |
| DATA CONVERSION SYSTEM UPON COPY-STREAMING | VALUE | SYSTEM USABLE FOR CONVERSION OF CONTENTS FOR USE FOR ANOTHER APPARATUS |
| POSSIBILITY OF COPY ON SAME TYPE RECORDING MEDIUM IN NETWORK | FLAG | OK/NG |
| NUMBER OF TIMES OF COPYING ON SAME TYPE RECORDING MEDIUM IN NETWORK | VALUE | NUMBER OF TIMES |
| TERM OF VALIDITY OF COPYING ON SAME TYPE RECORDING MEDIUM IN NETWORK | VALUE | TERM OF VALIDITY |
| POSSIBILITY OF COPY ON DIFFERENT TYPE RECORDING MEDIUM IN NETWORK | FLAG | OK/NG |
| NUMBER OF TIMES OF COPYING ON DIFFERENT TYPE RECORDING MEDIUM IN NETWORK | VALUE | NUMBER OF TIMES |
| TERM OF VALIDITY OF COPYING ON DIFFERENT TYPE RECORDING MEDIUM IN NETWORK | VALUE | TERM OF VALIDITY |
| PRESENCE/ABSENCE OF DATA FOR COPYING ON DIFFERENT TYPE RECORDING MEDIUM IN NETWORK | FLAG | OK/NG |
| DESIGNATION OF DATA FOR COPYING ON DIFFERENT TYPE RECORDING MEDIUM IN NETWORK | VALUE | INDEX VALUE DESIGNATING DATA FOR COPYING |
| POSSIBILITY OF COPYING IN PORTABLE APPARATUS | FLAG | OK/NG |
| NUMBER OF TIMES OF COPYING IN PORTABLE APPARATUS | VALUE | NUMBER OF TIMES |
| TERM OF VALIDITY OF COPYING IN PORTABLE APPARATUS | VALUE | TERM OF VALIDITY |
| PRESENCE/ABSENCE OF DATA FOR COPYING IN PORTABLE APPARATUS | FLAG | OK/NG |
| DESIGNATION OF DATA FOR COPYING IN PORTABLE APPARATUS | VALUE | INDEX VALUE DESIGNATING DATA FOR COPYING |
| POSSIBILITY OF STREAMING | FLAG | OK/NG |
| DESIGNATION OF OBJECT OF STREAMING RECEPTION | VALUE | LIMITATION OF OBJECT APPARATUS |
| POSSIBILITY OF REMOTE REPRODUCTION | FLAG | OK/NG |
| DESIGNATION OF OBJECT OF REMOTE REPRODUCTION RECEPTION | VALUE | LIMITATION OF OBJECT APPARATUS |
| PROCESS WHERE CONTENTS ARE PLACED OUT OF Bound STATE | VALUE | IMMEDIATE INVALIDATION OF COPYING, INVALIDATION AFTER FIXED INTERVAL OF TIME, ERASURE, ETC. |
| DOWNLOAD DATA TYPE | VALUE | TYPE OF DOWNLOAD DATA(CAPTION,Audio,STILL PICTURE,ETC.) |
| DOWNLOAD DATA ACQUIRING METHOD | VALUE | "CONNECTION TO DOWNLOAD SERVER","INSERTION OF MEMORY CARD INCLUDING DATA", ETC. |
| DESIGNATION OF DOWNLOAD SERVER | VALUE | INDEX VALUE TO DOWNLOAD SERVER LIST |
| DESIGNATION OF OPERATION CONTROL INFORMATION ACQUIRING SERVER FOR ACQUIRING OPERATION CONTROL INFORMATION FROM SERVER | FLAG | ACCORDING TO OPERATION CONTROL INFORMATION ACQUIRED FROM SERVER |
| | VALUE | INDEX VALUE TO SERVER LIST REPRESENTATIVE OF OPERATION CONTROL INFORMATION ACQUIRING SERVER |

(A) WHERE ALL INFORMATION IS PLACED INTO ONE LOOP

| field NAME | num_of_bits |
|---|---|
| Num_of_Content | 16 |
| for(I=0;I<Num_of_Content;I++){ | |
| Num_of_function [I] | 16 |
| for(J=0;J<Num_of_function;J++){ | |
| CCI_and_other_info_length | 16 |
| CCI_and_other_info_type | 8 |
| CCI_and_other_info_value | 8 |
| Additional_info | N |
| } | |
| } | |

(B) WHERE DIFFERENT LOOPS ARE APPLIED TO DIFFERENT STATES

| field NAME | num_of_bits |
|---|---|
| Num_of_Content | 16 |
| for(I=0;I<Num_of_Content;I++){ | |
| Num_of_Discrete_function [I] | 16 |
| for(J=0;J<Num_of_function;J++){ | |
| CCI_and_other_info_length | 16 |
| CCI_and_other_info_type | 8 |
| CCI_and_other_info_value | 8 |
| Additional_info | N |
| } | |
| Num_of_Bound_function [I] | 16 |
| for(J=0;J<Num_of_function;J++){ | |
| CCI_and_other_info_length | 16 |
| CCI_and_other_info_type | 8 |
| CCI_and_other_info_value | 8 |
| Additional_info | N |
| } | |
| } | |

CCI_and_other_info_type TABLE AND SUBSTANCE OF CORRESPONDING CCI_and_other_info_value, Additional_info

| "CCI_and_other_info_type" | "CCI_and_other_info_value" | "Additional_info" |
|---|---|---|
| REPRODUCTION IN Discrete STATE | OK/NG | REPRODUCTION METHOD OF CONTENTS WHICH CANNOT BE REPRODUCED IN Discrete STATE |
| | | DESIGNATION OF SERVER |
| COPY ON SAME TYPE RECORDING MEDIUM IN NETWORK | OK/NG | NUMBER OF TIMES OF COPYING, TERM OF VALIDITY |
| COPY ON DIFFERENT TYPE RECORDING MEDIUM IN NETWORK | OK/NG | NUMBER OF TIMES OF COPYING, TERM OF VALIDITY, PRESENCE/ABSENCE OF DATA FOR COPYING, DESIGNATION OF DATA FOR COPYING |
| | | DESIGNATION OF SYSTEM WHERE DATA CONVERSION IS PERFORMED UPON COPYING |
| COPY IN PORTABLE APPARATUS | OK/NG | NUMBER OF TIMES OF COPYING, TERM OF VALIDITY, PRESENCE/ABSENCE OF DATA FOR COPYING, DESIGNATION OF DATA FOR COPYING |
| | | DESIGNATION OF SYSTEM WHERE DATA CONVERSION IS PERFORMED UPON COPYING |
| STREAMING IN NETWORK | OK/NG | DESIGNATION OF STREAMING OBJECT APPARATUS |
| | | PRESENCE/ABSENCE OF DATA FOR STREAMING, DESIGNATION OF DATA FOR STREAMING |
| | | DESIGNATION OF SYSTEM WHERE DATA CONVERSION IS PERFORMED UPON STREAMING |
| REMOTE REPRODUCTION IN NETWORK | OK/NG | DESIGNATION OF OBJECT APPARATUS OF REMOTE REPRODUCTION |
| PROCESS UPON RELEASE FROM Bound STATE | VALUE | IMMEDIATE INVALIDATION OF COPYING, INVALIDATION AFTER FIXED INTERVAL OF TIME, ERASURE, ETC. |
| REPRODUCTION OF DOWNLOAD DATA | VALUE(DATA TYPE) | DESIGNATION OF ACQUIRING METHOD OF DOWNLOAD DATA, DOWNLOAD SERVER |
| 502 — INFORMATION FOR ACQUISITION OF OPERATION CONTROL INFORMATION FROM SERVER | VALUE | DESIGNATION OF SERVER |
| 503 — USER DEFINITION INFORMATION | DEFINED UNIQUELY BY CONTENTS OWNER. | DEFINED UNIQUELY BY CONTENTS OWNER |

FIG.22

EXAMPLE OF STRUCTURE OF Unit_Key_Gen_VIue.inf

| [field NAME] | num_of_bits |
|---|---|
| Unit_Key_Gen_Value.inf { | |
|   CPS_Unit_number_for_FirstPlayback | 16 |
|   CPS_Unit_number_for_TopMenu | 16 |
|   Number of Titles | 16 |
|   for(i=1;i<Number_of_Titles+1;i++) { | |
|     CPS_Unit_number for Title#i | |
|   } | |
|   Number of CPS_Units | 16 |
|   for(i=1;i<Number_of_CPS_Unit+1;i++) { | |
|     Unit Key Genertion Value for CPS_Unit#1 | 128 |
|   } | |
| } | |

· WHERE First Playback DOES NOT EXIST IN AV CONTENTS, CPS_Unit_number_for_FirstPlayback=0
· WHERE TopMenu DOES NOT EXIST IN AV CONTENTS,CPS_Unit_number_for_TopMenu=0
· Title #1 TO Title #[Number_of_Titles]DEFINES CPS_Unit NUMBER CORRESPONDING IN Syntax ABOVE

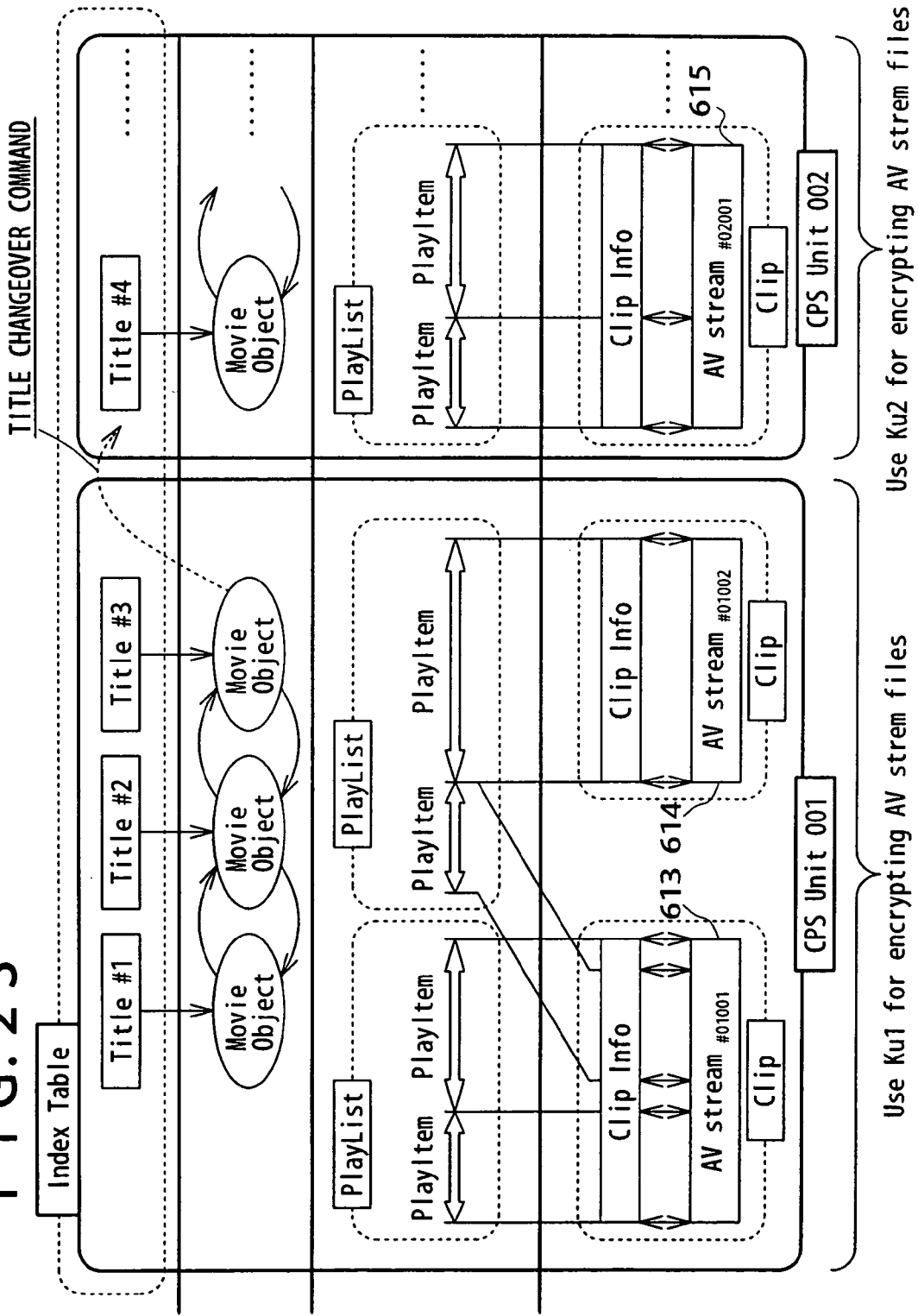

FIG. 28

CI_and_other_info(): EXAMPLE OF BASIC INFORMATION

| (NAME) | (SUBSTANCE) |
|---|---|
| COPY POSSIBILITY INFORMATION | COPY PERMITTED/INHIBITED/PERMITTED ONLY FOR ONE GENERATION |
| IMAGE OUTPUT RESOLUTION LIMITATION INFORMATION | PRESENCE/ABSENCE OF OUTPUT LIMITATION |
| ANALOG COPY CONTROL INFORMATION | PERMITTED/INHIBITED (DESIGNATE ANALOG COPY PREVENTING TECHNIQUE TO BE USED) |
| INFORMATION REPRESENTATIVE OF ENCRYPTED/NOT ENCRYPTED STATE | ENCRYPTED/NOT ENCRYPTED |
| INFORMATION REPRESENTATIVE OF WHETHER OR NOT RIGHT IS CLAIMED | PRESENCE/ABSENCE OF CLAIMING OF LIGHT |

CI_and_other_info(): EXAMPLE OF EXTENDED INFORMATION

| (NAME) | (SUBSTANCE) |
|---|---|
| INFORMATION REPRESENTATIVE OF WHETHER OR NOT REPRODUCTION BY SOLE Disc IS POSSIBLE | INDICATE WHETHER OR NOT CONTENTS REPRODUCTION IS POSSIBLE ONLY WITH INFORMATION ON Disc |
| REPRODUCTION METHOD OF CONTENTS WHICH CANNOT BE REPRODUCED WITH SOLE Disc | "CONNECTION TO KEY DISTRIBUTING SERVER", "INSERTION OF MEMORY CARD INCLUDING KEY" |
| DESIGNATION OF SERVER | INDEX VALUE INTO SERVER LIST |
| COPY-STREAMING COMPATIBILITY INFORMATION | COMPATIBILITY INFORMATION FOR REPRODUCTION OF CONTENTS ON ANOTHER APPARATUS IN NETWORK |
| DATA CONVERSION SYSTEM UPON COPY-STREAMING | SYSTEM USABLE FOR CONVERSION OF CONTENTS FOR USE FOR ANOTHER APPARATUS |
| POSSIBILITY OF COPY ON SAME TYPE RECORDING MEDIUM IN NETWORK | OK/NG |
| NUMBER OF TIMES OF COPYING ON SAME TYPE RECORDING MEDIUM IN NETWORK | NUMBER OF TIMES |
| TERM OF VALIDITY OF COPYING ON SAME TYPE RECORDING MEDIUM IN NETWORK | TERM OF VALIDITY |
| POSSIBILITY OF COPY ON DIFFERENT TYPE RECORDING MEDIUM IN NETWORK | OK/NG |
| NUMBER OF TIMES OF COPYING ON DIFFERENT TYPE RECORDING MEDIUM IN NETWORK | NUMBER OF TIMES |
| TERM OF VALIDITY OF COPYING ON DIFFERENT TYPE RECORDING MEDIUM IN NETWORK | TERM OF VALIDITY |
| PRESENCE/ABSENCE OF DATA FOR COPYING ON DIFFERENT TYPE RECORDING MEDIUM IN NETWORK | OK/NG |
| DESIGNATION OF DATA FOR COPYING ON DIFFERENT TYPE RECORDING MEDIUM IN NETWORK | INDEX VALUE DESIGNATING DATA FOR COPYING |
| POSSIBILITY OF COPYING IN PORTABLE APPARATUS | OK/NG |
| NUMBER OF TIMES OF COPYING IN PORTABLE APPARATUS | NUMBER OF TIMES |
| TERM OF VALIDITY OF COPYING IN PORTABLE APPARATUS | TERM OF VALIDITY |
| PRESENCE/ABSENCE OF DATA FOR COPYING IN PORTABLE APPARATUS | OK/NG |
| DESIGNATION OF DATA FOR COPYING IN PORTABLE APPARATUS | INDEX VALUE DESIGNATING DATA FOR COPYING |
| POSSIBILITY OF STREAMING | LIMITATION OF OBJECT APPARATUS |
| DESIGNATION OF OBJECT OF STREAMING RECEPTION | OK/NG |
| POSSIBILITY OF REMOTE REPRODUCTION | LIMITATION OF OBJECT APPARATUS |
| DESIGNATION OF OBJECT OF REMOTE REPRODUCTION RECEPTION | OK/NG |
| PROCESS WHERE UTILIZATION OF CONTENTS IN NETWORK IS ENDED | IMMEDIATE INVALIDATION OF COPYING, INVALIDATION AFTER FIXED INTERVAL OF TIME, ERASURE, ETC. |
| DOWNLOAD DATA TYPE | TYPE OF DOWNLOAD DATA(CAPTION,Audio,STILL PICTURE,ETC.) |
| DOWNLOAD DATA ACQUIRING METHOD | "CONNECTION TO DOWNLOAD SERVER","INSERTION OF MEMORY CARD INCLUDING DATA", ETC. |
| DESIGNATION OF DOWNLOAD SERVER | INDEX VALUE TO DOWNLOAD SERVER LIST |
| DESIGNATION OF OPERATION CONTROL INFORMATION ACQUIRING SERVER FOR ACQUIRING OPERATION CONTROL INFORMATION FROM SERVER | ACCORDING TO OPERATION CONTROL INFORMATION ACQUIRED FROM SERVER INDEX VALUE TO SERVER LIST REPRESENTATIVE OF OPERATION CONTROL INFORMATION ACQUIRING SERVER |

F I G. 29

| [field_NAME] | [num_of_bits] |
|---|---|
| CPSUnitX.cci { | |
| Number_of_Primary_CCI_loops | 16 |
| Reserved | 112 } 721 |
| for(I=0;I<Number_of_Primary_CCI_loops;I++) { | |
|   CCI_and_other_info_type | 16 |
|   CCI_and_other_info_data_length (=N) | 16   2048 Bytes |
|   CCI_and_other_info_data | N*8 |
| } | X |
| Reserved | 160 |
| Hash_value_for_Primary_CCI | |
| Number_of_Secondary_CCI_loops | 16 |
| Reserved | 112 } 722 |
| for(I=0;I<Number_of_Secondary_CCI_loops;I++) { | |
|   CCI_and_other_info_type | 16 |
|   CCI_and_other_info_data_length (=M) | 16   (2048*N)Bytes:Option |
|   CCI_and_other_info_data | N*8 |
| } | Y |
| Reserved | 160 |
| Hash_value_for_All_CCI | |
| } | |

F I G. 3 1

| [field NAME] | [num_of_bits] | |
|---|---|---|
| Number_of_Basic_CCI_loops | 16 | |
| Reserved | 112 | ⎫ |
| for(I=0;I<Number_of_Basic_CCI_loops;I++) { | | ⎬ 771 |
|   CCI_and_other_info_type | 16 | |
|   CCI_and_other_info_data_length (=N) | 16 | |
|   CCI_and_other_info_data | N*8 | ⎭ 2048 Bytes |
| } | | |
| Reserved | X | |
| Hash_value_for_Basic_CCI | 160 | |
| Number_of_Extended_CCI_loops | 16 | |
| Reserved | 112 | ⎫ |
| for(I=0;I<Number_of_Extended_CCI_loops;I++) { | | ⎬ 772 |
|   CCI_and_other_info_type | 16 | |
|   CCI_and_other_info_data_length (=M) | 16 | |
|   CCI_and_other_info_data | N*8 | ⎭ (2048*N)Bytes:Option |
| } | | |
| Reserved | Y | |
| Hash_value_for_All_CCI | 160 | |

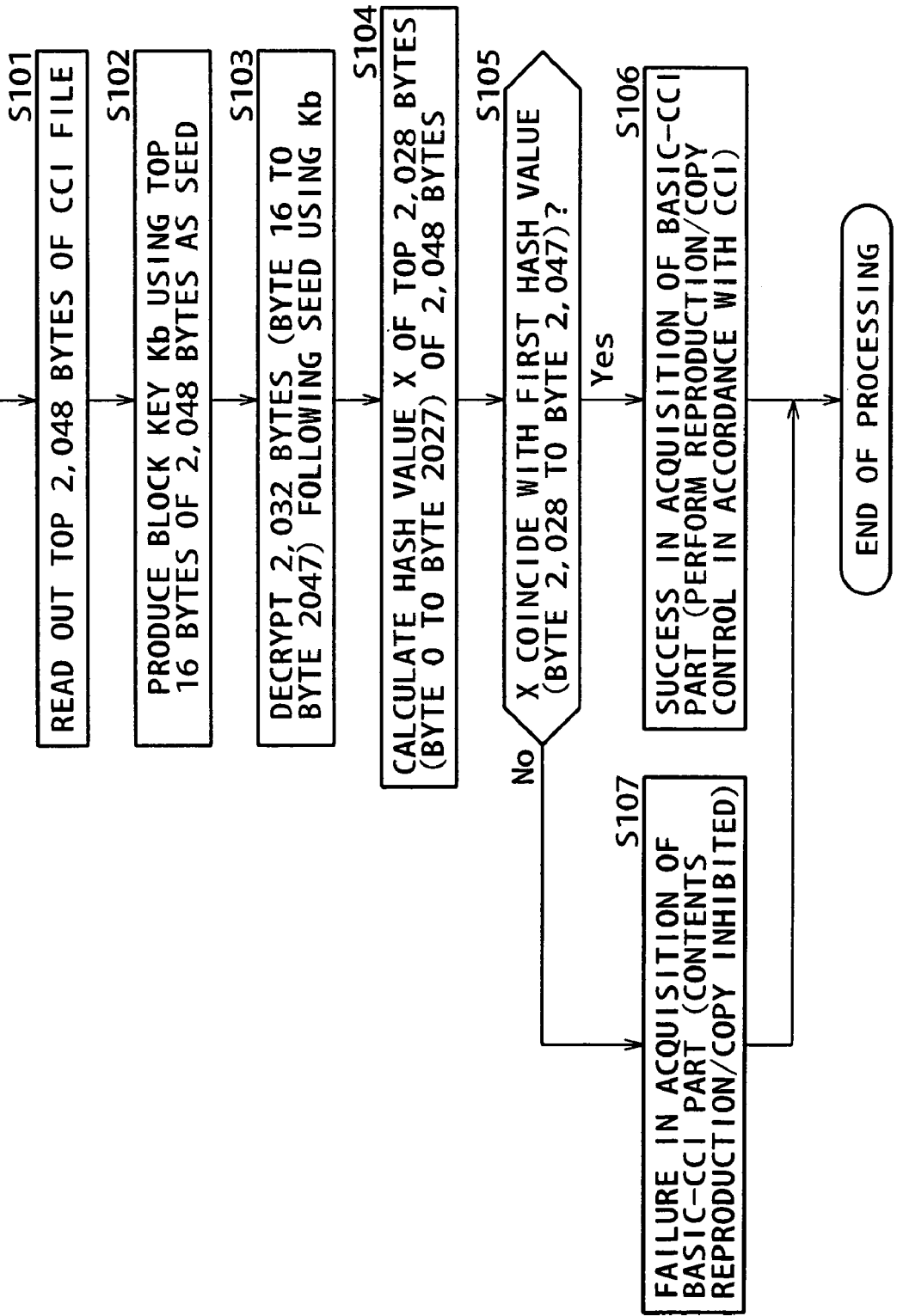
F I G . 3 2

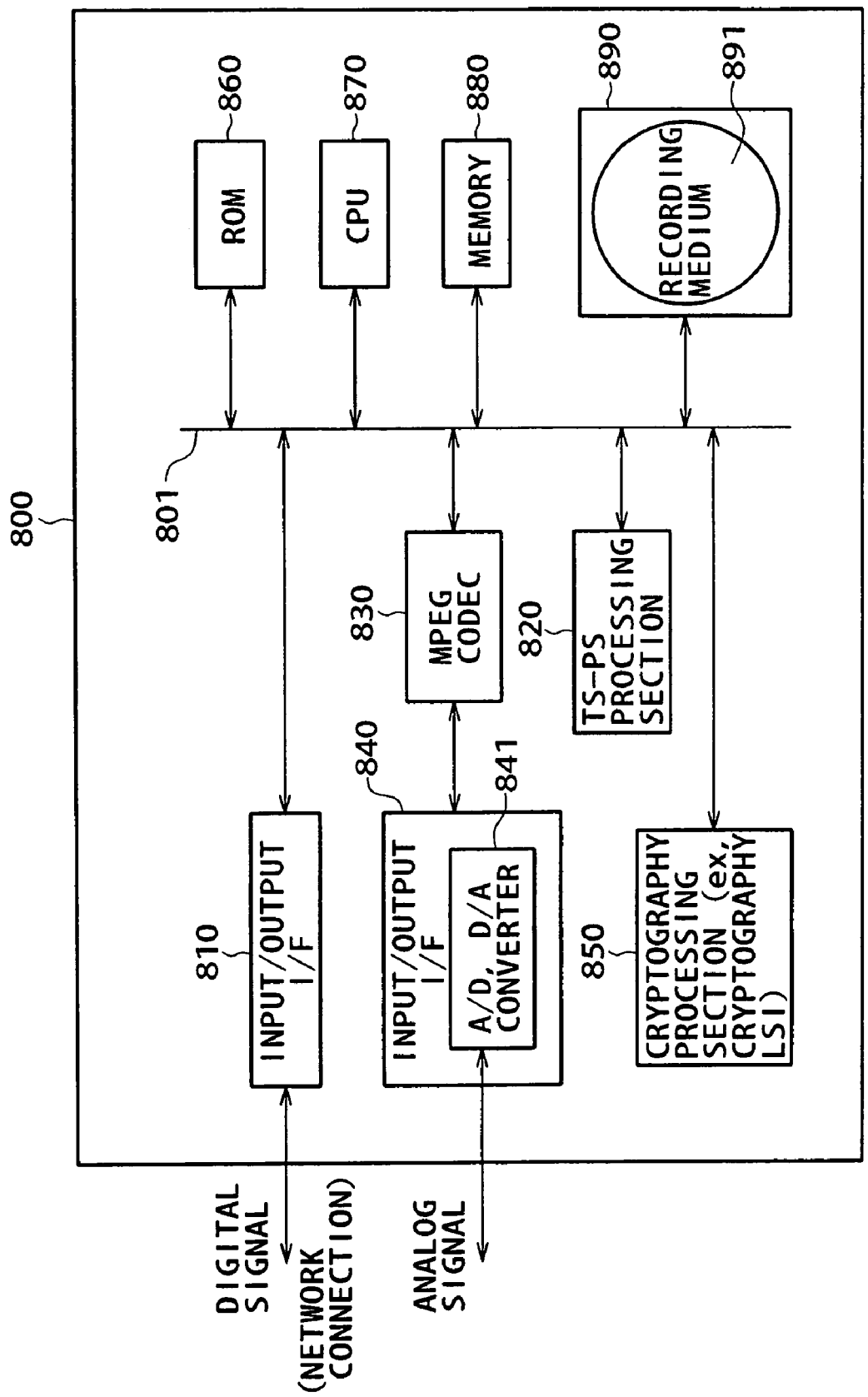

APPARATUS, METHOD AND COMPUTER PROGRAM FOR CONTENT UTILIZATION MANAGEMENT

BACKGROUND OF THE INVENTION

The present invention relates to an information processing apparatus, an information recording medium, an information processing method and a computer program. More specifically, the present invention relates to an information processing apparatus, an information recording medium, an information processing method and a computer program which achieve storage of various contents for which contents utilization management is required and utilization management for each fragmented data unit.

Various kinds of software data (hereinafter, referred to as contents) such as audio data of music and so forth, image data of a movie and so forth, game programs, various application programs and so forth, can be stored as digital data on recording media such as Blu-ray discs for which a blue laser is used, DVDs (Digital Versatile Discs), MDs (Mini Discs) and CDs (Compact Discs). Particularly, the Blu-ray discs for which a blue laser is used allow high density recording and can record large capacity video contents and so forth as high picture quality data.

Such various information recording media have digital contents stored thereon and are provided as such to users. A user would use a reproduction apparatus such as a PC (Personal Computer) or a disc player to reproduce or utilize the contents.

With regard to many contents such as music data and image data, the distribution right or the like is usually owned by a producing person or a selling person of the contents. Accordingly, upon distribution of contents, fixed utilization limitations are typically applied. In particular, utilization of contents is permitted only to legal users so that a copy or the like of the contents may be prevented without permission.

Use of a digital recording apparatus and a digital recording medium allows repetitions of recording and reproduction, for example, without any deterioration in image and sound. This gives rise to a problem of a spread of distribution of illegal copy contents through the Internet, distribution of pirate edition discs which are CD-Rs and so forth on which contents are copied and utilization of copy contents stored on a hard disc for a PC.

Large capacity recording media such as a DVD or a recording medium for which a blue laser whose development has been, and is proceeding, is used to allow recording of a large amount of data corresponding, for example, to one or several movies as digital information on a single medium. As it becomes possible to record video information and so forth as digital information in this manner, it is a progressively significant subject to prevent illegal copying to protect the owner of the copyright. Recently, in order to prevent such illegal copying of digital data, various techniques for preventing illegal copying by digital recording apparatus and on digital recording media have been placed into practical use.

For example, a DVD player adopts a contents scramble system. According to the contents scramble system, video data, audio data or the like are recorded in an encrypted form on a DVD-ROM (Read Only Memory), and a key which is used to decrypt the encrypted data is provided to a licensed DVD player. The license is given to a DVD player designed so as to comply with predetermined operation prescriptions such as a prescription that no illegal copying is performed. Accordingly, the licensed DVD player can utilize the provided key to decrypt encrypted data recorded on a DVD-ROM to reproduce images and sound from the DVD-ROM.

On the other hand, a non-licensed DVD player cannot decrypt encrypted data recorded on the DVD-ROM because it does not have the key for decrypting the encrypted data. In this manner, according to the contents scramble system configuration, a DVD player which does not satisfy conditions required upon licensing cannot reproduce a DVD-ROM having digital data recorded thereon. As a result, illegal copying by the DVD player is prevented.

On the other hand, together with the popularization of a data communication network in recent years, a home network also is being spread. The home network interconnects various appliances, computers and other peripheral equipments so as to allow communication between the components. The home network provides convenience and comfortability to its user typically in that a data processing function is shared by the components through communication between the components, or contents are transmitted and received between the components. Thus, it is estimated that the home network is further popularized in the future.

As such networking proceeds, accessing to and utilization of stored contents on an information recording medium from and by an apparatus connected to a home network increases. The conventional illegal copying preventing system described above is typically based on the point of view that contents reproduction only by one licensed reproduction machine is permitted. Accordingly, sufficient consideration has not been yet taken to dealing with a process wherein an apparatus in which a recording medium is loaded among apparatus interconnected by a network, for example, a home server or a player, is accessed from another network-connected apparatus such as a PC or a television set so that contents of the recording medium are reproduced through the network.

Conventionally, such a form that utilization of one piece of contents stored in a recording medium is executed on a single reproduction apparatus is typically used. Therefore, it has been sufficient to set the right of use of contents such as a license to contents or a reproduction apparatus to perform utilization management of the contents. However, in the present age in which increase of the capacity of information recording media and digitalization and networking of apparatus in a home proceed, a utilization management configuration of contents different from that in the past is required. In particular, the following requirements are provided.

(1) Achievement of a configuration which records a variety of contents on a recording medium and allows utilization management which differs among different contents.

(2) Achievement of a contents utilization management configuration which allows utilization of contents within a particular network such as a home network; that is, contents reproduction by a network-connected apparatus or contents copying into a home server.

(3) Achievement of a configuration which distributes information necessary for contents reproduction through a network, for example, a key to be used for decryption of contents, to a particular user in safety.

It is, thus, desirable to achieve the configurations (1) to (3) above.

SUMMARY OF THE INVENTION

The present invention is, accordingly, directed toward providing an information processing apparatus, an information recording medium, an information processing method and a computer program which achieve, in contents utilization of an information recording medium on which various contents for which utilization management such as management of the copyright is required are stored, management of the copyright and utilization control of each of fragmented data of contents stored on the recording medium.

The present invention further seeks to provide an information processing apparatus, an information recording medium, an information processing method and a computer program which achieve contents utilization management of a higher security level.

To this end, contents utilization control information corresponding to contents fragmented into contents management units is recorded as encrypted data encrypted with unit keys individually corresponding to the contents management units. Further, falsification verification data corresponding to the data including the contents utilization control information are set and recorded.

In order to attain the objects described above, according to one embodiment of the present invention, there is provided an information recording medium having contents of a utilization management object recorded thereon. Main contents which have a data format which complies with a particular audio visual format and sub-contents which have another data format which does not comply with the audio visual format are stored as recording data on the information recording medium. Configuration data of the main contents and the sub-contents is set as contents management units. The data included in the contents management units is stored as encrypted data encrypted with individual unit keys individually corresponding to the contents management units.

According to another embodiment aspect of the present invention, there is provided an information processing apparatus for recording contents of a utilization management object, including a contents management unit setting section for setting configuration data of main contents which have a data format which complies with a particular audio visual format and sub-contents which have another data format which does not comply with the particular audio visual format as contents management units, and a data storage section for storing the data included in the contents management units as encrypted data encrypted with individual unit keys individually corresponding to the contents management units on an information recording medium.

According to another embodiment of the present invention, there is provided an information processing apparatus for executing a reproduction process of contents of a utilization management object, including an acquisition section for acquiring encrypted contents utilization control information corresponding to contents management units stored on an information recording medium, and an execution section for executing a decryption process using a unit key set corresponding to any of the contents management units and a falsification verification process and executing a contents utilization process based on the contents utilization control information under the condition that the contents are free from falsification.

According to another embodiment of the present invention, there is provided an information processing method for recording contents of a utilization management object, including a contents management unit setting step of setting configuration data of main contents which have a data format which complies with a particular audio visual format and sub-contents which have another data format which does not comply with the particular audio visual format as contents management units, and a data storage step of storing the data included in the contents management units as encrypted data encrypted with individual unit keys individually corresponding to the contents management units on an information recording medium.

According to another embodiment of the present invention, there is provided an information processing method for executing a reproduction process of contents of a utilization management object, including an acquisition step of acquiring encrypted contents utilization control information corresponding to contents management units stored on an information recording medium, a falsification verification process execution step of executing a decryption process using a unit key set corresponding to any of the contents management units and a falsification verification process, and a contents utilization process execution step of executing a contents utilization process based on the contents utilization control information under the condition that the contents are free from falsification.

According to another embodiment of the present invention, there is provided a computer program for recording contents of a utilization management object, including a contents management unit setting step of setting configuration data of main contents which have a data format which complies with a particular audio visual format and sub-contents which have another data format which does not comply with the particular audio visual format as contents management units, and a data storage step of storing the data included in the contents management units as encrypted data encrypted with individual unit keys individually corresponding to the contents management units on an information recording medium.

According to another embodiment of the present invention, there is provided a computer program for executing a reproduction process of contents of a utilization management object, including an acquisition step of acquiring encrypted contents utilization control information corresponding to contents management units stored on an information recording medium, a falsification verification process execution step of executing a decryption process using a unit key set corresponding to any of the contents management units and a falsification verification process, and a contents utilization process execution step of executing a contents utilization process based on the contents utilization control information under the condition that the contents are free from falsification.

According to another embodiment of the present invention, there is provided an information recording medium having stored thereon one or more pieces of contents each sectioned into contents management units and including encrypted data encrypted with a unit key set corresponding to each of the contents management units and contents utilization control information set corresponding to each of the contents management units, the contents utilization control information being configured such that the contents utilization control information is stored as encrypted data encrypted using the unit key set corresponding to each of the contents management units and has falsification verification data added thereto.

According to another embodiment of the present invention, there is provided an information processing apparatus for executing a reproduction process of contents of a utilization management object, including an acquisition section for acquiring contents utilization control information corresponding to a contents management unit stored on an information recording medium, and an execution section for using a unit key set corresponding to the contents management unit to execute a decryption process in a unit of a block of block data which forms the contents utilization control information and has a predetermined data amount and a falsification verification process based on falsification verification data included in the block data and executing a contents utilization process based on the decrypted contents utilization control information under the condition that it is confirmed that the data are free from falsification.

According to another embodiment of the present invention, there is provided an information processing apparatus for executing a data recording process on an information recording medium, including a falsification verification data production section for producing falsification verification data for contents utilization control information corresponding to each of contents management units set in order to perform individual utilization management control, an encryption section for executing an encryption process using a unit key set corresponding to each of the contents management units to produce encrypted data, and a production and recording section for executing a production and recording process for the encrypted contents utilization control information including the falsification verification data.

According to another embodiment of the present invention, there is provided an information processing method for executing a reproduction process of contents of a utilization management object, including an acquisition step of acquiring contents utilization control information corresponding to a contents management unit stored on an information recording medium, a decryption step of using a unit key set corresponding to the contents management unit to execute a decryption process in a unit of a block of block data which forms the contents utilization control information and has a predetermined data amount, a step of executing a falsification verification process based on falsification verification data included in the block data, and a step of executing a contents utilization process based on the decrypted contents utilization control information under the condition that it is confirmed that the data are free from falsification.

According to another embodiment of the present invention, there is provided an information processing method for executing a data recording process on an information recording medium, including a step of producing falsification verification data for contents utilization control information corresponding to each of contents management units set in order to perform individual utilization management control, an encryption processing step of executing an encryption process using a unit key set corresponding to each of the contents management units to produce encrypted data, and a step of executing a generation and recording process for the encrypted contents utilization control information including the falsification verification data.

According to another embodiment of the present invention, there is provided a computer program for executing a reproduction process of contents of a utilization management object, including an acquisition step of acquiring contents utilization control information corresponding to a contents management unit stored on an information recording medium, a decryption step of using a unit key set corresponding to the contents management unit to execute a decryption process in a unit of a block of block data which forms the contents utilization control information and has a predetermined data amount, a step of executing a falsification verification process based on falsification verification data included in the block data, and a step of executing a contents utilization process based on the decrypted contents utilization control information under the condition that it is confirmed that the data are free from falsification.

According to another embodiment of the present invention, there is provided a computer program for executing a data recording process on an information recording medium, including a step of producing falsification verification data for contents utilization control information corresponding to each of contents management units set in order to perform individual utilization management control, an encryption processing step of executing an encryption process using a unit key set corresponding to each of the contents management units to produce encrypted data, and a step of executing a generation and recording process for the encrypted contents utilization control information including the falsification verification data.

It is to be noted that any of the computer programs according to the present invention can be provided through a storage medium such as a CD, a floppy disc or an magneto-optical disc, or a communication medium such as a network, which provides, for example, various program codes in a computer-readable form to a computer system which can execute such program codes. Where such a program as described above is provided in a computer-readable form, a process according to the program can be implemented on the computer system.

With the information processing apparatus, information recording media, information processing methods and computer programs according to the present invention, configuration data of main contents having a data format which complies with a particular AV (Audio Visual) format such as the Blu-ray disc ROM format and sub-contents having another data format which does not comply with the AV format are set as contents management units. Further, the data included in the contents management units is stored as encrypted data encrypted with unit keys individually coordinated with the contents management units on an information recording medium. Therefore, utilization control in various forms can be achieved not only for data which comply with the AV (Audio Visual) format but also for data of an arbitrary format which does not comply with the AV (Audio Visual) format.

Further, with the information processing apparatus, information recording media, information processing methods and computer programs according to the present invention, it is possible to perform utilization management of main contents and sub-contents for each of the units into which configuration data of the main contents and sub-contents are sectioned and, more particularly, to perform various types of utilization control for each unit such as reproduction control and copy control. Since contents utilization control can be performed in a unit of an individual contents management unit, many contents stored on an information recording medium can be managed for each fragmented unit of the contents.

Further, with the information processing apparatus, information recording media, information processing methods and computer programs according to the present invention, configuration data of main contents and sub-contents are sectioned into units, and utilization control information of the contents for each unit is set as falsification verification data and encrypted and provided as such. Consequently, illegal acquisition of the utilization control information and illegal utilization of the contents by falsification can be prevented.

Further, with the information processing apparatus, information recording media, information processing methods and computer programs according to the present invention, contents utilization control information corresponding to contents sectioned into contents management units (CPS units) is converted into encrypted data encrypted with unit keys individually corresponding to the contents management units. Further, falsification verification data corresponding to the data including the contents utilization control information is set and recorded. Consequently, leakage or falsification of the contents utilization control information can be prevented, and contents utilization management having a higher degree of security can be achieved.

Furthermore, with the information processing apparatus, information recording media, information processing methods and computer programs according to the present invention, contents utilization control information corresponding to contents sectioned into contents management units (CPS units) is converted into basic control information and extended control information. Further, particular block data including the basic control information is set, and the block data are encrypted in a unit of a block. Further, falsification verification information corresponding to the particular block data including the basic control information is set. Consequently, an apparatus which performs contents utilization in accordance only with the basic control information need not execute a decoding or falsification verification process of the data blocks in which the extended control information is stored. Consequently, an efficient process can be anticipated.

The present invention can be applied effectively to an information processing apparatus, an information recording medium, an information processing method and a computer program used, for example, in a system wherein a number of pieces of contents are stored in an information recording medium and it is required to execute utilization control for each piece of contents.

Further, the present invention can be applied effectively to an information processing apparatus, an information recording medium, an information processing method and a computer program used, for example, in a system for which strict utilization control of contents is required.

Additional features and advantages of the present invention are described in, and will be apparent from, the following Detailed Description of the Invention and the Figures.

BRIEF DESCRIPTION OF THE FIGURES

FIG. 3 is a diagrammatic view illustrating an example of setting of a contents management unit set for the storage contents of the information recording medium.

FIG. 4 is a view illustrating an example of a contents management unit configuration and unit key management table.

FIG. 5 is a diagrammatic view illustrating an example of a format of storage contents including a first playback (First Playback) and a top menu (Top Menu).

FIG. 7 is a view illustrating an example of a contents management unit configuration and a unit key management table in the configuration including the first playback (First Playback) and the top menu (Top Menu).

FIG. 10 is a view illustrating an example of data of a contents state management table.

FIG. 11 is a view illustrating an example of data of a contents reproduction and copy limitation control information management table of contents.

FIG. 12 is a view illustrating examples of a contents reproduction and copy control information management table in which contents management information according to different states of contents is recorded with variable length data.

FIG. 22 is a view illustrating a data configuration of unit key generation value information.

FIG. 23 is a diagrammatic view illustrating a contents configuration according to the Blu-ray Disc ROM format illustrating correspondence between an AV stream and CPS units.

FIG. 28 is a view illustrating a particular example of basic control information and extended control information.

FIG. 29 is a view illustrating a syntax corresponding to the example of storage of contents utilization control information illustrated in FIG. 27.

FIG. 31 is a view illustrating a syntax corresponding to the example of storage of contents utilization control information illustrated in FIG. 30.

FIG. 32 is a flow chart illustrating a processing sequence of an information processing apparatus which reads only basic control information and executes contents utilization in accordance with the basic control information.

FIG. 34 is a block diagram showing an example of an information processing apparatus which is loaded with and reproduces an information recording medium.

DETAILED DESCRIPTION OF THE INVENTION

In the following, an information processing apparatus, an information recording medium, an information processing method and a computer program are described in detail with reference to the figures. It is to be noted that the description is given in order of the following items:

1. storage data configuration of an information recording medium;
2. example of a storage contents configuration;
3. encryption, utilization management configuration of storage contents;
4. configuration of a first playback and menu display process;
5. contents utilization management based on network discrete, network bound states;
6. contents copy management in a network;
7. management information corresponding to contents management units;
8. storage configuration of main contents, sub-contents, and contents management information;
9. configuration of an encryption and falsification preventing process of contents utilization control information;
9-1. outline of the configuration of the encryption and falsification preventing process of contents utilization control information;
9-2. examples of a particular configuration of the encryption and falsification preventing process of contents utilization control information; and
10. example of a configuration of an information processing apparatus.

1. Storage Data Configuration of an Information Recording Medium

Figure 1:
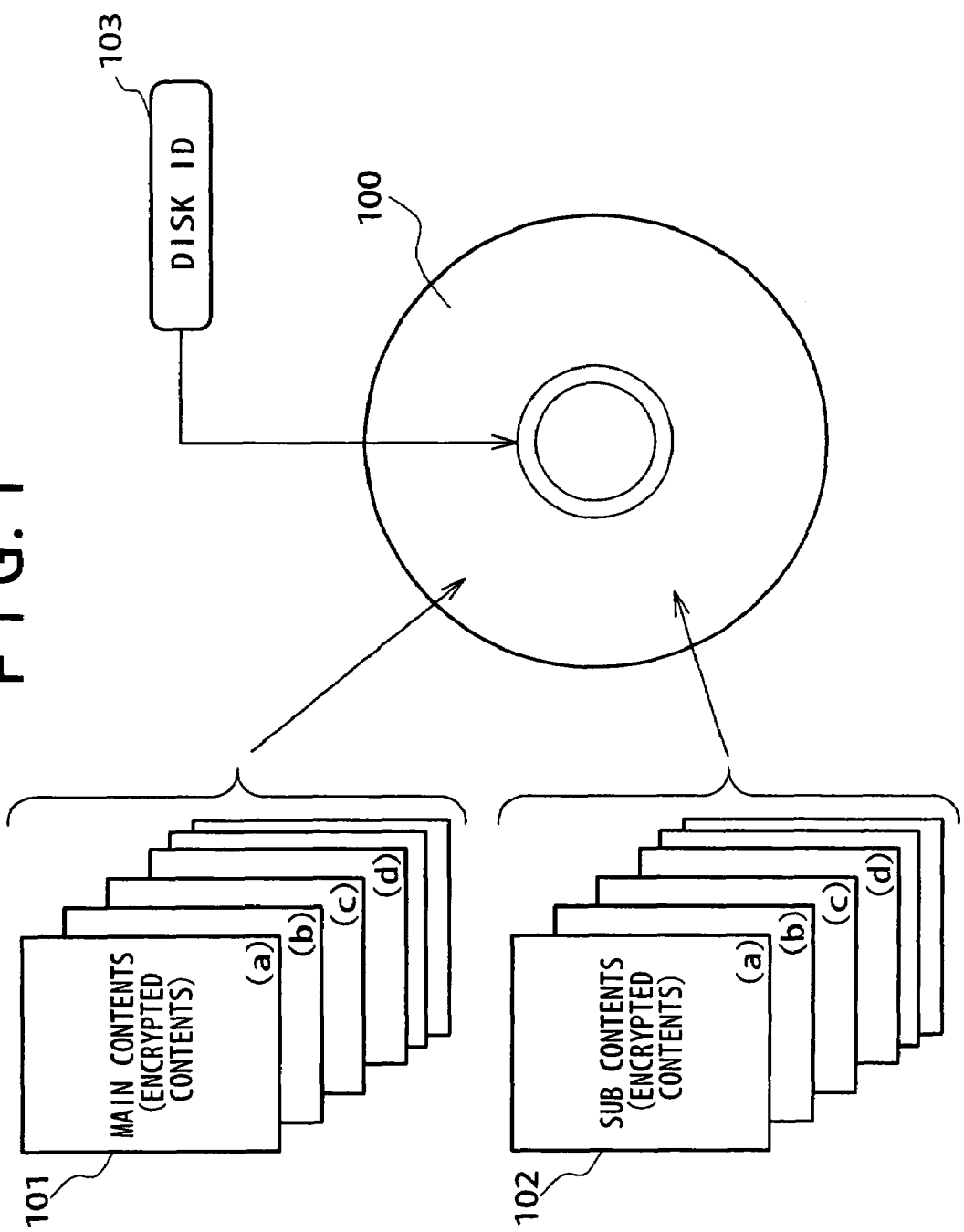
FIG. 1 is a schematic view illustrating a storage data configuration of an information recording medium.

First, a storage data configuration of an information recording medium is described. FIG. 1 shows an example of an information recording medium on which contents to which a process of the present invention can be applied are stored and particularly illustrates an example of information storage of a ROM disc on which contents are stored already.

The ROM disc is an information recording medium having legal contents stored thereon and manufactured in a disc manufacturing factory under the license of a contents proprietor having a legal contents copyright or distribution right. It is to be noted that, in the following description of the embodiment, a disc type medium is taken as an example of an information recording medium. However, the present invention can be applied to various types of information recording media and configurations which use such information recording media.

Referring to FIG. 1, the information recording medium 100 has various contents recorded thereon. The contents are classified roughly into two categories. One of the two categories is main contents 101 which may be an AV (Audio Visual) stream of moving picture contents such as HD (High Definition) movie contents of high definition moving picture data or a game program, an image file, sound data, text data or the like prescribed by predetermined standards. The main contents 101 are particular AV format standard data and are stored in accordance with a particular AV data format. More particularly, the main contents 101 are stored, for example, as Blu-ray disc ROM standard data in accordance with the Blu-ray disc ROM standard format.

Further, for example, a game program as service data, an image file, sound data, text data or the like are stored as sub-contents 102. The sub-contents 102 are data having a data format which does not conform to the particular AV data format. In other words, data out of the Blu-ray disc ROM standards are stored as the sub-contents 102 in an arbitrary format which does not conform to the Blu-ray disc ROM format.

Both of the main contents 101 and the sub-contents 102 include various kinds of contents such as music data, image data of moving pictures and still pictures, game programs and WEB contents. The contents may include information of various modes such as contents information which can be utilized only by data from the information recording medium 100 and contents information which can utilize data provided from a server connected through a network together with data from the information recording medium 100.

Each piece of contents or a set of a number of pieces of contents included in the main contents 101 and the sub-contents 102 is stored on the information recording medium 100 in a form wherein it is encrypted applying an individual cryptographic key (unit key) for purposes of utilization management of the contents. A disc ID 103 as identification information of the information recording medium 100 is further stored on the information recording medium 100.

2. Example of a Storage Contents Configuration

A storage format of contents stored on the information recording medium of the present invention is described with reference to FIG. 2.

Figure 2:
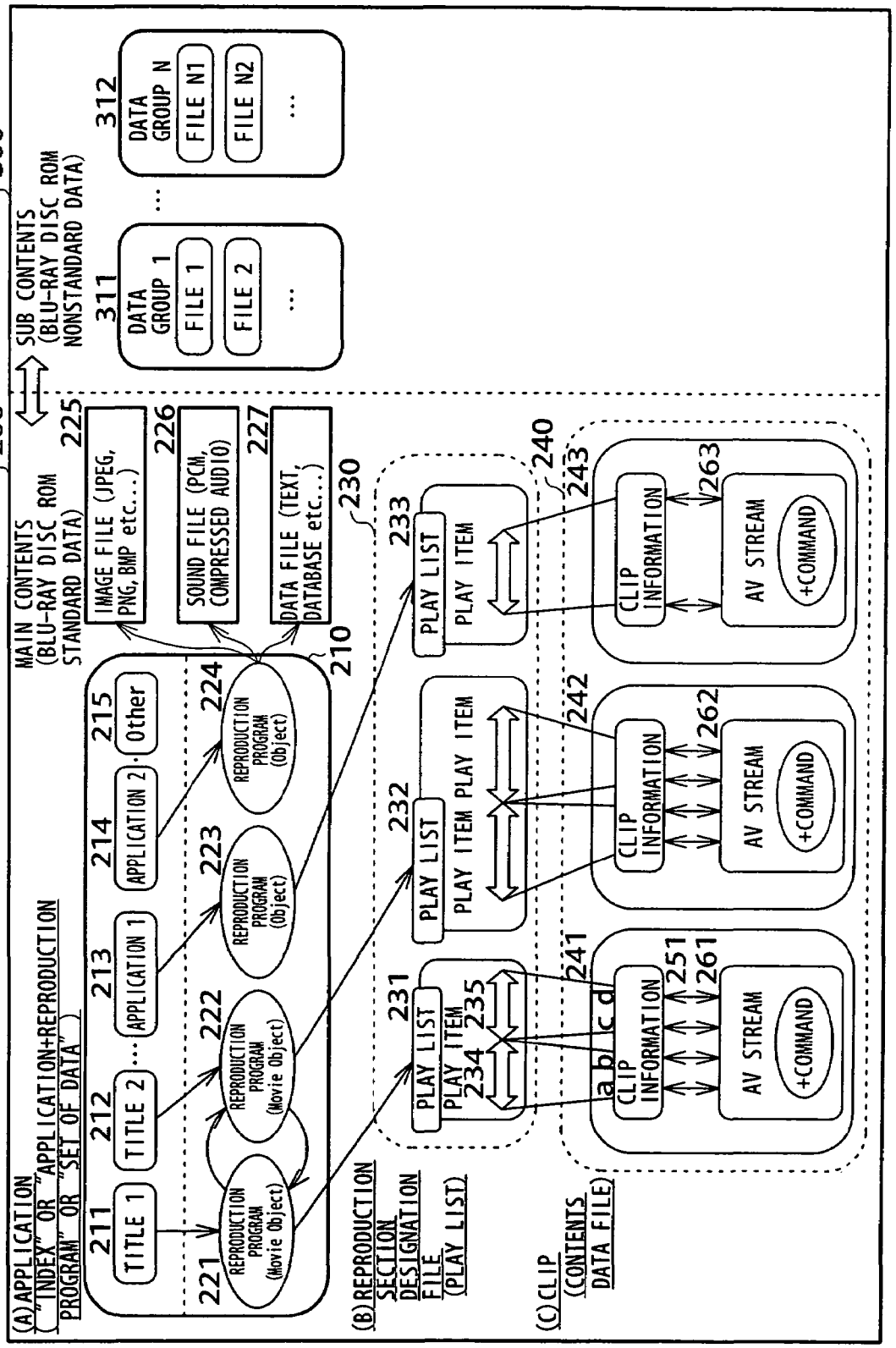
FIG. 2 is a diagrammatic view illustrating an example of a format of storage contents of the information recording medium.

On the information recording medium, AV streams of moving picture contents such as HD (High Definition) movie contents which are high definition moving picture data are stored as main contents 200 as seen in FIG. 2. Meanwhile, other data and programs such as game programs as service data, image files, sound data and text data are stored as sub-contents 300 on the information recording medium.

The main contents 200 are stored in accordance with a particular AV format, for example, stored as Blu-ray disc ROM standard data in accordance with the Blu-ray disc ROM standard format. Meanwhile, the sub-contents 300 are stored as Blu-ray disc ROM non-standard data in an arbitrary format which does not conform to the Blu-ray disc ROM standard format.

As seen in FIG. 2, the main contents 200 include moving picture contents (AV stream) stored in accordance with the Blu-ray disc ROM standard format include actual contents of an object of reproduction and has a layered configuration complying with the Blu-ray disc ROM standard format. In particular, the main contents 200 have layers of:

(A) application 210;
(B) reproduction section designation file (play list) 230; and
(C) clip (contents data file) 240.

The (C) clip (contents data file) 240 has clips 241, 242, 243 which are individually sectioned contents data files, with each of the clips 241 to 243 having an AV stream file 261, 262, 263 and a clip information file 251, . . . .

The clip information file 251 is a data file in which attribute information regarding the AV stream file 261 is stored. The AV stream file 261 is, for example, MPEG-TS (Moving Picture Experts Group-Transport Stream) data and has a data structure wherein information of an image (Video), sound (Audio), caption data and so forth are multiplexed. Further, command information to be used upon reproduction to control a reproduction apparatus may be multiplexed in the clip information file 251.

The (B) reproduction section designation file (play list) 230 has a number of reproduction section designation files (play lists) 231, 232, 233. Each of the reproduction section designation files (play lists) 231, 232, 233 has one or more play items, each of which selects one of the number of AV stream data files included in the clip (contents data file) 240 and designates a particular data portion of the selected AV stream data file with a reproduction start point and a reproduction end point. If one of the reproduction section designation files (play lists) is selected, then a reproduction sequence is determined in accordance with the play item or items of the reproduction section designation file (play list), and reproduction is executed.

For example, where the reproduction section designation file (play list) 231 is selected to perform contents reproduction, a play item 234 coordinated with the reproduction section designation file (play list) 231 has a reproduction start point a and a reproduction end point b for the clip 241, and another play item 235 has a reproduction start point c and a reproduction end point d. If the reproduction section designation file (play list) 231 is selected to perform contents reproduction, then the particular data areas a to b and c to d of the AV stream file 261 which is contents included in the clip 241 are reproduced.

The (A) application 210 is set as a layer which has, for example, a combination of application index files 211, 212 including contents titles to be presented on a display unit which executes contents reproduction and reproduction programs 221, 222 or a combination of application execution files 213, 214 such as game contents or WEB contents and reproduction programs 223, 224. The user can determine an object of reproduction by selection of the titles included in the application index files 211, 212.

Each title is coordinated with one (movie object) of the reproduction programs 221 to 224 as shown in the FIG. 2. If the user selects one of the titles, then a reproduction process based on the reproduction program coordinated With the selected title is started. It is to be noted that the application index files 211, 212 indicated as title 1, title 2 in FIG. 2 include a title presentation program for automatically displaying titles and a menu to be reproduced automatically upon setting and starting of the information recording medium.

The application index files 211, 212 or the application execution files 213, 214 may include an application resource file used for execution of the application. Further, various data files which can be acquired from the information recording medium or a network connection server, for example, image files 225 such as JPEG, PNG or BMP image files, sound files 226 such as PCM or compressed Audio sound files and various data files 227 such as text or database data files may be applied as application resource files.

The reproduction programs (movie objects) 221 to 224 are contents reproduction processing programs for providing functions necessary for presentation of reproduction contents (HD movie contents) such as a response to operation information regarding a contents reproduction process inputted from the user, a jump between titles, a branch of a reproduction sequence in a programmable fashion in addition to designation of a reproduction section designation file (play list) to be reproduced. The reproduction programs 221 to 224 allow a jump therebetween, and a reproduction program to be executed actually is selected in accordance with an input of the user or a program set in advance. Then, reproduction contents are selected from the clip 240 based on the reproduction section designation file (play list) 230 designated by the selected reproduction program and are reproduced.

The main contents 200 are managed, for example, as Blu-ray disc ROM standard data in a layered configuration in accordance with the Blu-ray disc ROM standard format as seen in FIG. 2. Contents management units (CPS units) are set within the limit of the layered structure and utilization management of contents is performed in a unit of a contents management unit (CPS unit). The contents management unit (CPS unit) is hereinafter described in detail.

The information recording medium has the sub-contents 300 stored thereon in addition to the main contents 200. The sub-contents 300 are contents stored in an arbitrary format which does not conform to a particular AV format; for example, the Blu-ray disc ROM standard format.

The sub-contents 300 include, for example, game programs such as service data, image files, sound data, text data and so forth, and a set including a number of data files is set as a data group.

In FIG. 2, first data group 311 to Nth data group 312 are shown. Such data groups can be set as utilization management object content. Where the data groups set as utilization management object contents, a contents management unit (CPS unit) is set in a unit of a data group, and utilization management is performed in a unit of a data group.

3. Encryption, Utilization Management Configuration of Storage Contents

Now, a contents management configuration which classifies contents stored on the information recording medium to implement utilization controls different among different sectioned contents is described with reference to several Figures beginning with FIG. 3.

In the present embodiment, as a basic configuration for implementing utilization controls different among different sectioned contents, different keys (unit keys) are allocated to individual different sectioned contents. A unit to which one unit key is allocated is hereinafter referred to as contents management unit (CPS unit).

A unit key is applied to encrypt contents belonging to the corresponding unit, and for utilization of the contents, the key (unit key) allocated to the pertaining unit is acquired to perform reproduction. The unit keys can be managed individually, and a unit key allocated, for example, to a certain unit A set as a key which can be acquired from the information recording medium. Meanwhile, the unit key allocated to another unit B may be acquired under the condition that the user accesses the server connected by the network and executes a predetermined procedure. In this manner, the acquisition and management configuration of the keys corresponding to the individual units can be set to different modes which are independent of each other among the unit keys.

A setting mode of a unit to which a key is allocated (that is, a contents management unit (CPS unit)), is described with reference to FIG. 3.

First, a setting configuration of a contents management unit (CPS unit) on the main contents 200 side is described.

On the main contents 200 side, a CPS unit which includes the application index files 211, 212 or the application execution files 213, 214 or the like included in the application 210 and including more than one title is set.

A CPS unit 1 401 shown in FIG. 3 is a unit wherein application index files, reproduction program files, play lists and AV stream files as contents actual data are set as one unit.

Meanwhile, a CPS unit 2 402 is a unit wherein an application execution file, a reproduction program file, a play list and AV stream files as contents actual data are set as one unit.

Further, a CPS unit 3 403 is a unit wherein an application execution file, a reproduction program file, a recording medium and various data files which can be acquired from the information recording medium or the server connected to the network.

The CPS units mentioned are encrypted individually with the same keys (CPS unit keys: keys Ku1, Ku2, Ku3 in FIG. 3) and stored in the encrypted form on the information recording medium.

Referring to FIG. 3, the CPS unit 1 401 and the CPS unit 2 402 are each formed from the (A) application of the higher layer and the (B) reproduction section designation file (play list)+(C) clip (Contents data file) of the lower layers. Meanwhile, the CPS unit 3 403 does not include the (B) reproduction section designation file (play list)+(C) clip (Contents data file) of the lower layers but is formed from the (A) application layer of the upper layer and various data files which can be acquired from the information recording medium or the server connected to the network; that is, an image file 225, a sound file 226, a data file 227 and so forth.

The contents management unit (CPS unit) 1 401 includes a title 1 211, another title 2 212, reproduction programs 221, 222, play lists 231, 232, a clip 241 and another clip 242. AV stream data files 261, 262 which are actual data of contents included in the two clips 241, 242 are encrypted using the unit key Ku1 which is a cryptographic key set in a coordinated relationship with the contents management unit (CPS unit) 1 401.

Meanwhile, the contents management unit (CPS unit) 2 402 includes an application file 213 formed from game contents, WEB contents or the like, a reproduction program 223, a play list 233 and a clip 243. An AV stream data file 263 which is actual data of contents included in the clip 243 is encrypted using the unit key Ku2 as a cryptographic key set in a coordinated relationship with the contents management unit (CPS unit) 2 402. Also, the application file 213 may be formed as an encrypted file applying the unit key Ku2.

The contents management unit (CPS unit) 3 403 is set as a unit which includes application files 214, 215 included in the (A) application layer of the upper layer, a reproduction program 224, and various data files which can be acquired from the information recording medium or the server connected to the network by the reproduction program 224. The data files mentioned may include an image file 225 such as a JPEG, PNG or BMP image file, a sound file 226 such as a PCM or compressed Audio sound file, and various data files 227 such as text and database data files.

The contents management unit (CPS unit) 3 403 is encrypted using the unit key Ku3 as a cryptographic key set in a coordinated relationship with the contents management unit (CPS unit) 3 403.

For example, when the user tries to execute a reproduction process of the application file or contents corresponding to the CPS unit 1 401, it is necessary to acquire the unit key Ku1 as a cryptographic key set in a coordinated relationship with the contents management unit (CPS unit) 1 401 and execute a decryption process using the unit key Ku1. After the decryption process is executed, the application program can be executed to perform reproduction of the contents.

For example, in order to perform a utilization process of the application file corresponding to the contents management unit 3 403, or the image file 225, the sound file 226 such as a PCM or compressed Audio sound file and various data files 227 such as text and database data files, all coordinated with the reproduction program 224, it is necessary to acquire the unit key Ku3 as a cryptographic key set in a coordinated relationship with the contents management unit (CPS unit) 3 403 to execute a decryption process. After the decryption process is executed, the application program is executed or the various files are executed.

As a limitation item in execution of a process to which the method described above is applied, while a particular title is being reproduced, an AV stream file which is not included in the CPS unit to which the title belongs cannot be reproduced. In other words, a movie object executed during reproduction of the title must not include a command for reproducing an AV stream file which is not included in the CPS unit to which the title belongs. It is to be noted that a movie object can have a command for executing changeover of the title, and at a point of time when title changeover occurs in response to a title jump command or the like, the reproduction apparatus decides that the title being reproduced changes. In particular, in FIG. 3, it is possible to execute a command for jumping to the title 2 212 while the title 1 211 is being reproduced. In this instance, after the jump, the title 2 212 is reproduced.

Although a play list can refer to a number of clips, the clips to be referred to are limited to those which are included in one CPS unit.

Where such limitations are set, changeover of a unit key does not occur while titles which belong to one CPS unit are reproduced. As a result, when AV streams are reproduced continuously within the titles, seamless connection can be achieved readily.

It is to be noted that, since a title is information visible to the user, there is an advantage that, where distribution of a key, contents management and so forth are performed in a CPS unit, explanation to the user and contents management can be performed easily.

Also, when a play list is referred to during execution of an application, seamless connection can be performed readily while AV streams which belong to one CPS unit, similarly as in the case wherein titles are reproduced, are reproduced. Since resource files which are used during execution of one application are encrypted with the same key, there is no change of the cryptographic key (CPS unit key) during execution of the application and the decryption process can be performed smoothly.

The information recording medium has the sub-contents 300 stored thereon in addition to the main contents 200 as described hereinabove. The sub-contents 300 are, for example, game programs as service data, image files, sound data, text data and so forth, and a set composed of a number of data files is set as a data group. The sub-contents 300 are stored as Blu-ray disc ROM non-standard data in an arbitrary format which does not conform to the Blu-ray disc ROM standard format.

Also, data groups in the sub-contents 300 can be set as utilization management object contents. Where such groups as just described are set as utilization management object contents, they are set as contents management units (CPS units) and utilization management is performed in a unit of a data group.

In the example shown in FIG. 3, the data group 1 311 in the sub-contents 300 is set as a contents management unit (CPS unit) 4 404 and the data group N 312 is set as a contents management unit (CPS unit) 5 405.

Files included in the contents management unit (CPS unit) 4 404 are encrypted using a unit key Ku4 as a cryptographic key set in a coordinated relationship with the contents management unit (CPS unit) 4 404.

For example, when the user tries to execute a utilization process of programs or data included in the files corresponding to the contents management unit (CPS unit) 4 404, it is necessary to acquire the unit key Ku4 as a cryptographic key set in a coordinated relationship with the contents management unit (CPS unit) 4 404 and execute a decryption process with the unit key Ku4.

Meanwhile, files included in the contents management unit (CPS unit) 5 405 are encrypted using a unit key Ku5 as a cryptographic key set in a coordinated relationship with the contents management unit (CPS unit) 5 405.

When the user tries to execute a utilization process of programs or data included in the files corresponding to the contents management unit (CPS unit) 5 405, it is necessary to acquire the unit key Ku5 as a cryptographic key set in a coordinated relationship with the contents management unit (CPS unit) 5 405 and execute the decryption process with the unit key Ku5.

It is to be noted that, though not shown, an administrative reproduction control program for administratively controlling a contents reproduction process exists and performs administrative control of contents reproduction.

The administrative reproduction control program identifies a contents management unit (CPS unit) corresponding to reproduction designation contents of the user and executes an acquisition process of a CPS cryptographic key corresponding to the identified CPS management unit information. The administrative reproduction control program displays a message representing that reproduction is impossible and so forth when the CPS cryptographic key cannot be obtained. Further, the administrative reproduction control program performs detection of occurrence of changeover of the contents management unit (CPS unit) upon execution of contents reproduction and further performs acquisition of a necessary key, display of a message that reproduction is impossible and so forth.

The administrative reproduction control program executes reproduction management based on such a unit configuration and unit key management table as shown in FIG. 4.

The unit configuration and unit key management table coordinates contents management units (CPS units) corresponding to indices, application files or data groups of the application layer with unit key information as seen in FIG. 4. The administrative reproduction control program performs management based on the management table.

It is to be noted that the management table illustrated in FIG. 4 illustrates an example wherein management data corresponding to main contents stored in accordance with a predetermined AV format (for example, the Blu-ray disc ROM standard format) and management data corresponding to sub-contents as stored contents of formats difference from the particular AV format are set as a single management table. However, the management data may otherwise be managed separately as management data corresponding to main contents and management data corresponding to sub-contents. A particular file configuration (directory configuration) of management data is hereinafter described.

The administrative reproduction control program performs, if it detects that changeover of the contents management unit (CPS unit) occurs by changeover of the application index, changeover of the key to be used after the changeover of the contents management unit (CPS unit). Further, the administrative reproduction control program executes such a process as displaying of a message that it is necessary to acquire a unit key.

For example, where a reproduction apparatus which is executing a contents reproduction process has stored therein the unit key Ku1 for the CPS unit 1 401 and also the unit key Ku2 for the CPS unit 2 402, if the administrative reproduction control program for administratively controlling the contents reproduction process detects that changeover between units of an application or changeover of contents occurs, then it performs changeover of the unit key corresponding to the changeover of the contents management unit (CPS unit); that is, changeover of Ku1 to Ku2.

On the other hand, where a reproduction apparatus which is executing a contents reproduction process has the unit key Ku1 for the CPS unit 1 401 stored therein but does not have the unit key Ku2 for the CPS unit 2 402 stored therein, if the administrative reproduction control program for administratively controlling the contents reproduction process detects that changeover between units of an application or changeover of contents occurs, then it executes such a process as to display a message that acquisition of a unit key is required and so forth.

Such processes are also executed similarly in unit changeover between main contents, unit changeover between sub-contents, and changeover between a unit of main contents and a unit of sub-contents. Thus, in response to detection of changeover between units, changeover between unit keys Ku1 to Kun or display of a key acquisition message is executed.

4. Configuration of a First Playback and Menu Display Process

The storage format of contents stored on the information recording medium and the encryption and management configuration of contents based on the contents management unit (CPS unit) are described above with reference to FIGS. 2 to 4. In the following, a configuration having a first playback (First Playback) as reproduction contents to be started upon loading of the information recording medium (disc) into a driver and a top menu (Top Menu) as contents to be reproduced upon starting of a menu displaying function is described with reference to FIGS. 5 to 7.

Figure 5:
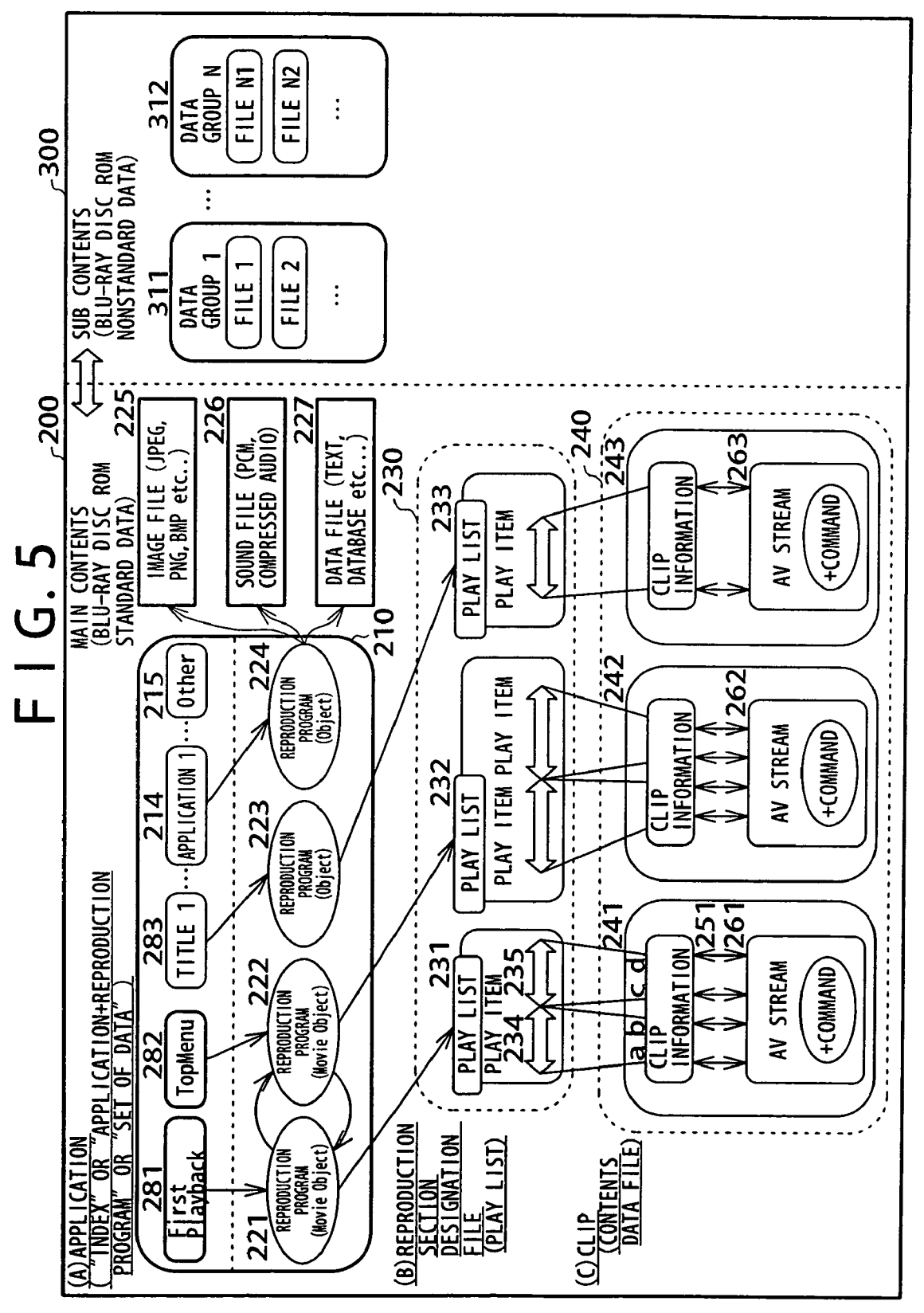
Figure 6:
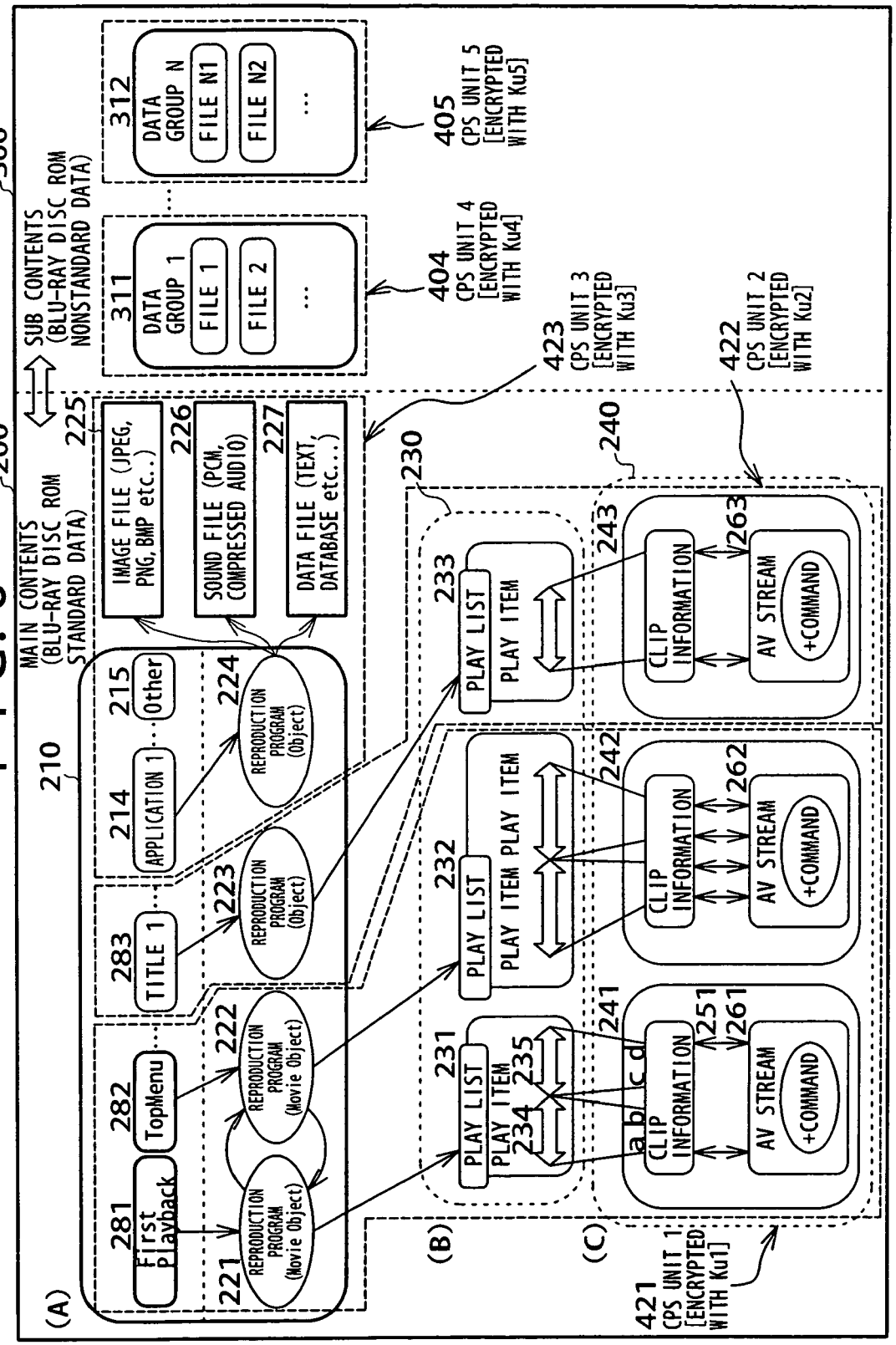
FIG. 6 is a view illustrating an example of setting of a contents management unit set for a contents configuration including the first playback (First Playback) and the top menu (Top Menu).

FIG. 5 illustrates a contents storage format in the configuration which has the first playback (First Playback) and the top menu (Top Menu). FIG. 6 illustrates encryption of the content storage configuration shown in FIG. 5 and an example of setting of the contents management unit (CPS unit).

The contents storage format illustrated in FIG. 5 is similar to that described hereinabove with reference to FIG. 2 in that AV streams of moving picture contents such as HD (High Definition) movie contents which are high definition moving picture data are stored as main contents 200 as seen in FIG. 5. Meanwhile, other data and programs such as game programs as service data, image files, sound data and text data are stored as sub-contents 300 on the information recording medium. In FIG. 5, the same components as those in FIG. 2 are denoted by the same reference numerals in FIG. 2.

In the configuration illustrated in FIG. 5, the main contents 200 stored in accordance with the Blu-ray disc ROM standard format have moving picture contents (AV streams) stored as real contents of an object of reproduction thereon and has a layered configuration complying with the Blu-ray disc ROM standard format. In particular, the main contents 200 have layers of:

(A) application 210;

(B) reproduction section designation file (play list) 230; and (C) clip (contents data file) 240.

The (C) clip (contents data file) 240 and the (B) reproduction section designation file (play list) 230 have configurations similar to those described hereinabove with reference to FIG. 2.

In the configuration shown in FIG. 5, the (A) application 210 has a first playback (First Playback) 281 as index information of reproduction contents to be started upon loading of the information recording medium (disc) into a drive and a top menu (Top Menu) 282 as index information of contents to be reproduced upon starting of a menu displaying function. The first playback (First Playback) and the top menu (Top Menu) are reproduction objects (contents) defined by the BD-ROMAV application standards and having a structure similar to that of the title.

The first playback (First Playback) 281 is an index for designating contents to be started and reproduced upon loading of the information recording medium (disc) into a drive and includes, for example, display of the copyright and so forth. The first playback (First Playback) 281 is contents which are reproduced in accordance with a reproduction sequence unique to a studio or an authoring company which performs editing of contents such as display of a company logo of the studio or authoring company. Meanwhile, the top menu (Top Menu) 282 is an index for designating contents to be displayed when a menu displaying function is rendered operative on a reproduction apparatus.

Based on the indices, a corresponding reproduction program specified by the indices is started up, and reproduction of contents data (AV stream) specified by a play list designated by the reproduction program is executed. The reproduction order is similar to that in the reproduction process which are based on indices such as titles described hereinabove with reference to FIG. 2.

An example of a contents management configuration in a configuration having contents corresponding to the first playback (First Playback) and contents corresponding to the top menu (Top Menu) is described with reference to FIG. 6.

As described hereinabove, in the present embodiment, as a basic configuration for implementing utilization controls different among different sectioned contents, different keys (unit keys) are allocated to individual different sectioned contents. A unit to which one unit key is allocated is a contents management unit (CPS unit). Also in the configuration having contents corresponding to the first playback (First Playback) and contents corresponding to the top menu (Top Menu), contents management units (CPS units) are coordinated with the contents to perform unit management.

Also, contents corresponding to the first playback (First Playback) and contents corresponding to the top menu (Top Menu) are individually encrypted using respective unit keys, and upon contents utilization, the key (unit key) allocated to a pertaining unit is acquired and used for reproduction.

In the example illustrated in FIG. 6, a single unit including contents corresponding to the first playback (First Playback) and contents corresponding to the top menu (Top Menu) is set. In particular, in FIG. 6, a CPS unit 1 421 is a contents management unit which includes the contents mentioned above.

It is to be noted that a CPS unit only including contents corresponding to the first playback (First Playback) and another CPS unit which only includes contents corresponding to the top menu (Top Menu) may otherwise be set separately from each other.

The CPS unit 1 421 shown in FIG. 6 is a unit wherein an application index file including a first playback (First Playback) index 281 and a top menu (Top Menu) index 282, reproduction program files, play lists and AV stream files as contents actual data are set as one unit.

Meanwhile, a CPS unit 2 422 is a unit wherein an application execution file, a reproduction program file, a play list and AV stream files as contents actual data are set as one unit.

Further, a CPS unit 3 423 is a unit formed from application execution files, a reproduction program file, and various data files which can be acquired from the information recording medium or the server connected to the network.

The units are individually encrypted with the same keys (CPS unit keys: keys Ku1, Ku2, Ku3 in FIG. 3) and stored in the encrypted form on the information recording medium.

The contents management unit (CPS unit) 1 421 includes a first playback (First Playback) index 281, a top menu (Top Menu) index 282, reproduction programs 221, 222, play lists 231, 232, a clip 241 and another clip 242. AV stream data files 261, 262 which are actual data of contents included in the two clips 241, 242 are encrypted using the unit key Ku1 which is a cryptographic key set in a coordinated relationship with the contents management unit (CPS unit) 1 421.

The contents management unit (CPS unit) 2 422 includes a title 1 283, a reproduction program 223, a play list 233 and a clip 243. An AV stream data file 263 which is actual data of contents included in the clip 243 is encrypted using the unit key Ku2 which is a cryptographic key set in a coordinated relationship with the contents management unit (CPS unit) 2 422.

The contents management unit (CPS unit) 3 423 is set as a unit which includes application files 214, 215 included in the (A) application layer of the upper layer, a reproduction program 224, and various data files which can be acquired from the information recording medium or the server connected through the network by the reproduction program 224. The various data files include, for example, an image file 225 such as JPEG, PNG and BMP image files, a sound file 226 such as a PCM or compressed Audio sound file, and various data files 227 such as text and database data files.

The contents management unit (CPS unit) 3 423 is encrypted using the unit key Ku3 which is a cryptographic key set in a coordinated relationship with the contents management unit (CPS unit) 3 423.

When the user tries to execute a reproduction process of contents coordinated with the contents management unit 1 421, that is, contents coordinated with the first playback (First Playback) index 281 and the top menu (Top Menu) index 282, it is necessary to acquire the unit key Ku1 as a cryptographic key set in a coordinated relationship with the contents management unit (CPS unit) 1 421 and execute the decryption process with the unit key Ku1. After the decryption process is executed, the program can be executed to perform contents reproduction.

As described hereinabove, the administrative reproduction control program identifies a contents management unit (CPS unit) corresponding to reproduction contents and executes an acquisition process of a CPS cryptographic key corresponding to the identified CPS management unit information. On the other hand, if the CPS cryptographic key cannot be acquired, then the administrative reproduction control program performs display of a message that reproduction is impossible and so forth. Further, the administrative reproduction control program performs detection of occurrence of changeover of the contents management unit (CPS unit) upon execution of contents reproduction and performs acquisition of a necessary key, display of a message that reproduction is impossible and so forth.

An example of a configuration of a unit key management table in a configuration wherein contents corresponding to the first playback (First Playback) as reproduction contents to be started upon loading of the information recording medium (disc) into a drive and the top menu (Top Menu) as contents to be reproduced upon starting of the menu display function are set as one contents management unit is illustrated in FIG. 7.

The unit configuration and unit key management table coordinates contents management units (CPS units) corresponding to indices, application files or data groups of the application layer with unit key information as seen in FIG. 7. The administrative reproduction control program performs management based on the management table.

The table configuration of FIG. 7 corresponds to the CPS setting illustrated in FIG. 6, and the contents management unit (CPS unit) 1 includes contents corresponding to the first playback (First Playback) and the top menu (Top Menu) and is coordinated with the unit key Ku1. Further, different keys (Ku2~) are coordinated successively with different CPS units (CPS 2~), and upon contents reproduction of each unit, it is necessary to perform a decryption process applying the corresponding unit key.

As described hereinabove, the administrative reproduction control program executes, if it detects that changeover of the contents management unit (CPS unit) occurs by changeover of the application index, changes over the key to be used after the changeover of the contents management unit (CPS unit). Or, the administrative reproduction control program executes such a process as displaying of a message that it is necessary to acquire a unit key.

5. Contents Utilization Management Based on Network Discrete, Network Bound States Now, description is given of a configuration wherein, when an information recording medium on which contents sectioned into contents management units described hereinabove and encrypted using a unit key as a cryptographic key in a unit of a contents management unit is loaded into a reproduction apparatus as an apparatus connected to a network such as a home network to perform reproduction or utilization of contents, contents utilization management is performed based on whether each of the pieces of contents is in a network discrete state or in a network bound state. It is to be noted that the contents described below include both main contents and sub-contents.

Figure 8:
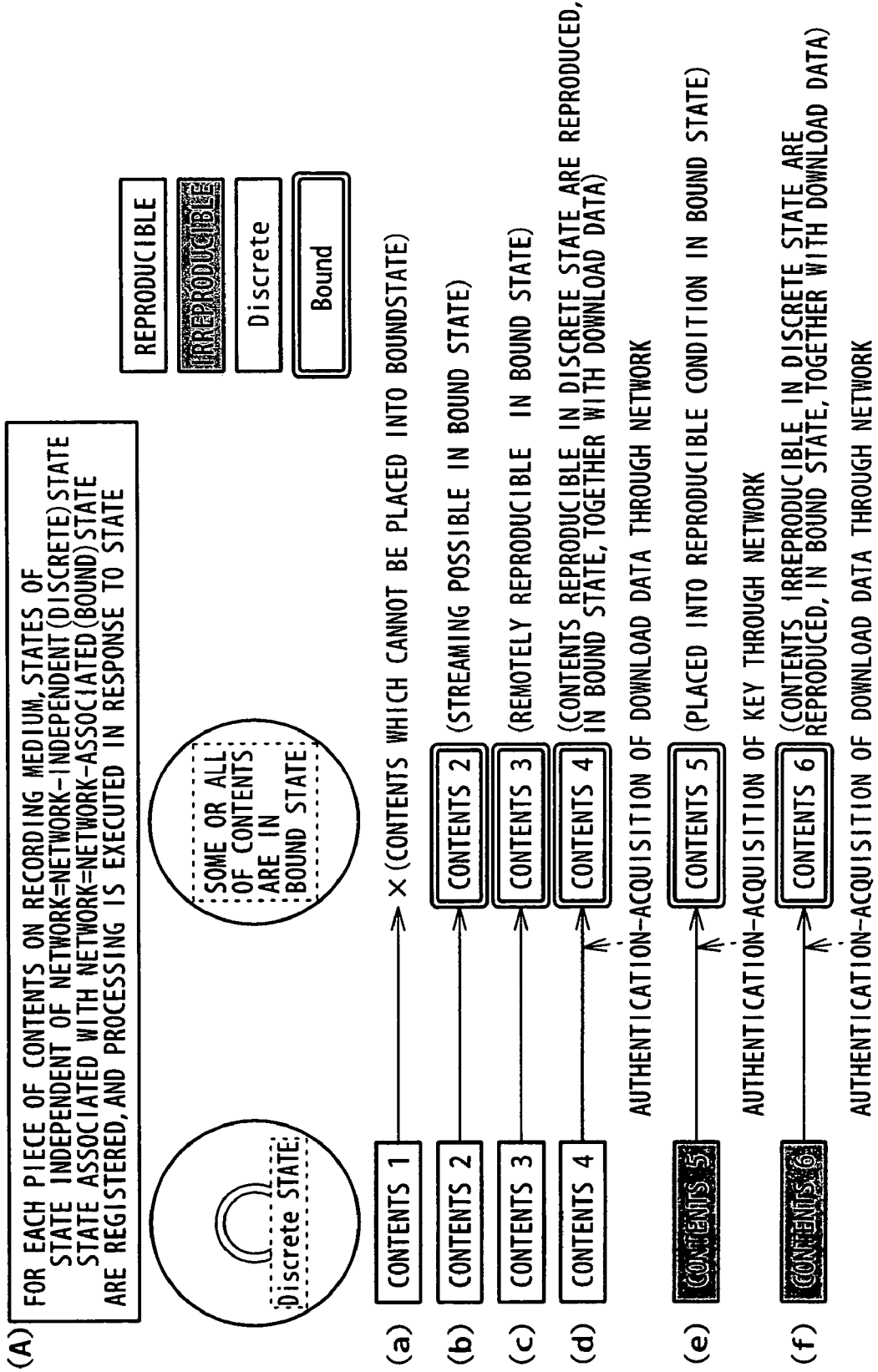
FIG. 8 is a diagrammatic view illustrating contents utilization modes and utilization limitations in a network discrete state and a network bound state of contents.

As a state of a contents management unit (CPS unit) on a recording medium, two states are defined including a state wherein the contents management unit (CPS unit) is independent of the network (state independent of the network=Discrete state) and another state wherein the contents management unit (CPS unit) is associated with the network (state associated with the network=Bound state) as seen in (A) of FIG. 8.

Where a recording medium includes a number of pieces of contents (contents management units), it is managed for each contents management unit (CPS unit) in which one of the states the contents management unit (CPS unit) is. The management information of the Discrete/Bound state for each contents management unit (CPS unit) is recorded on the information recording medium, in a player (information reproduction apparatus) in which the information recording medium is loaded or a management server on a home network which executes the information management process.

Contents 1 to contents 6 illustrated in FIG. 8 individually correspond to contents management units (CPS units) and belong to main contents or sub-contents.

A reproduction method of contents is described below.

The individual contents stored on the information recording medium and sectioned into contents management units (CPS units) include contents which can be reproduced in a network independent state (Discrete state) and contents which cannot be reproduced in a network independent state (Discrete state).

The contents 1 to 4 in FIG. 8 are contents which can be reproduced in the network independent state (Discrete state) while the contents 5 to 6 are contents which cannot be reproduced in the network independent state (Discrete state).

Each of the pieces (contents management units) of contents on the recording medium can be placed into a network associated state (Bound state) by an operation of the user, a process of a reproduction apparatus or the like. It is to be noted that such contents which are inhibited from being placed into the network associated state (Bound state) like the contents 1 indicated by (a) of FIG. 8 also exist.

The information described is determined as an attribute of each piece of the contents (contents management unit) stored on the information recording medium and is stored as attribute information corresponding to the contents management unit on the information recording medium.

For each piece of contents (contents management unit), processing modes which can be executed in the two states described above are determined in advance as:

(1) a process which can be executed in the network independent state (Discrete state); and (2) a process which can be executed in the network associated state (Bound state).

The information regarding the processes is recorded as corresponding attribute information of the individual contents (contents management units) on the information recording medium or recorded in the management server which holds management information.

As an example, such contents (contents management units), for example, as illustrated in (a) to (f) of FIG. 8 are possible.

(a) The contents 1 are contents which can be reproduced in the network independent state (Discrete state) and cannot be placed into the network associated state (Bound state).

(b) The contents 2 are contents which can be reproduced in the network independent state (Discrete state) and allows, in the network associated state (Bound state), streaming reproduction using a network connection. The streaming reproduction is a contents reproduction process of transmitting data on a recording medium or data obtained by conversion of the data on the recording medium as digital data through a network and decoding and displaying the digital data via an apparatus on the receiver side.

(c) The contents 3 are contents which can be reproduced in the network independent state (Discrete state) and allows, in the network associated state (Bound state), remote reproduction using a network connection. The remote reproduction is a contents reproduction process of performing a process including such a response to a user operation as is included in interactive contents of the DVD-Video via an apparatus on the transmission side and transmitting only an image to be displayed on a screen and sound to be reproduced in the form of data which can be displayed by a receiver apparatus. In the remote reproduction, it is necessary for an apparatus on the receiver side to receive an operation command of the user and send the operation command to a reproduction apparatus, which performs reproduction, through a network.

(d) The contents 4 are contents which can be reproduced in the network independent state (Discrete state) and are contents (contents management unit) which implement contents reproduction of contents wherein contents on the recording medium and data downloaded through the network are reproduced together.

The data to be downloaded may include not only a caption, sound data and menu screen data of a language not stored on the recording medium but also the latest version of data to be used upon contents reproduction. The contents 4 are an example of contents which can be reproduced in the network independent state (Discrete state) but are reproduced, in the network associated state (Bound state), together with downloaded data.

(e) The contents 5 are contents (contents management unit) which cannot be reproduced in the network independent state (Discrete state) but can be reproduced only in the network associated state (Bound state).

If a key necessary for reproduction, that is, a unit key corresponding to contents management unit defined as the contents 5, is acquired through the network, then the contents 5 can be reproduced using the key. When such a reproduction permission configuration which permits reproduction under the condition of acquisition of a unit key as just described is adopted, distribution or sales of contents which cannot be reproduced in the network independent state (Discrete state) can be performed, and a service of such a form that key information is sold with a charge imposed upon reproduction also can be anticipated.

(f) The contents 6 are contents which cannot be reproduced in the network independent state (Discrete state) but is contents (contents management unit) which can be reproduced only in the network associated state (Bound state). Further, the contents 6 are contents (contents management unit) which implement contents reproduction wherein contents on the recording medium and data downloaded through the network are reproduced together.

It is to be noted that, although (d) the contents 4 to (f) the contents 6 involve a network connection process and an acquisition process of download data or a unit key, as a precondition of the data acquisition, an authentication process is executed for the confirmation that the data request is originated from a legal apparatus or user, and provision of download data or a unit key from the server is executed under the condition that the authentication is established. It is to be noted that transfer data through the network are provided in an encrypted form to the user apparatus. The processes mentioned are hereinafter described.

6. Contents Copy Management in a Network

Now, description is given of a configuration wherein, when an information recording medium on which contents sectioned into contents management units described hereinabove and encrypted using a unit key as a cryptographic key in a unit of a contents management unit is loaded into a reproduction apparatus as an apparatus connected to a network such as a home network to perform reproduction or utilization of contents, contents copy management is performed based on whether each of the pieces of contents is in the network discrete state or the network bound state. It is to be noted that the contents described below include both main contents and sub-contents.

Figure 9:
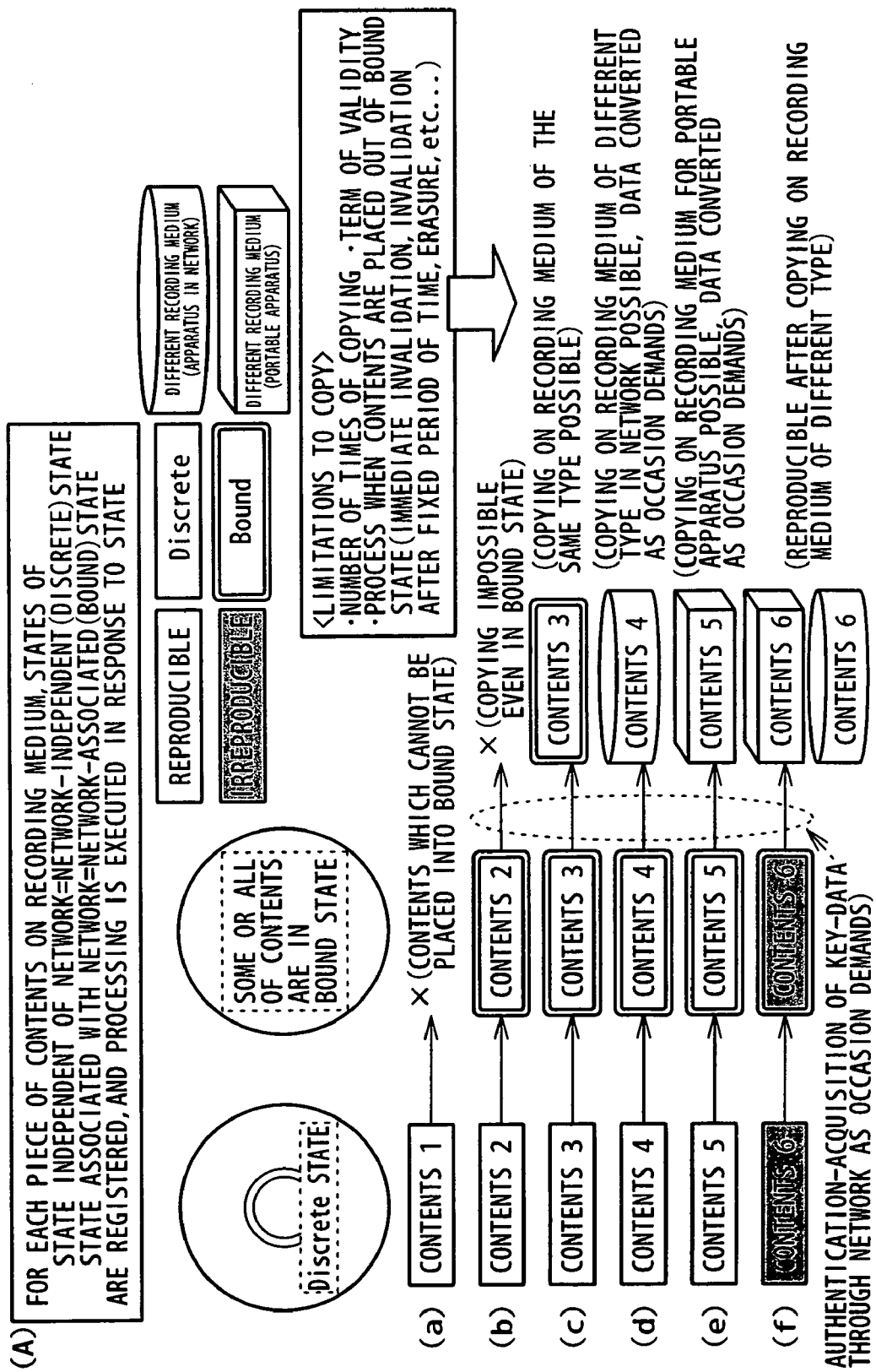
FIG. 9 is a diagrammatic view illustrating contents copy limitations in a network discrete state and a network bound state of contents.

As a state of a contents management unit (CPS unit) on a recording medium, two states are defined including a state wherein the contents management unit (CPS unit) is independent of the network (state independent of the network=Discrete state) and another state wherein the contents management unit (CPS unit) is associated with the network (state associated with the network=Bound state) as seen in (A) of FIG. 9.

Where a recording medium includes a number of pieces of contents (contents management units), it is managed for each contents management unit (CPS unit) in which one of the states the contents management unit (CPS unit) is. The management information of the Discrete/Bound state for each contents management unit (CPS unit) is recorded on the information recording medium, in a player (information reproduction apparatus) in which the information recording medium is loaded or a management server on the home network which executes the information management process.

Contents 1 to contents 6 illustrated in FIG. 9 individually correspond to contents management units (CPS units). Each of the pieces of contents (contents management unit) on the recording medium can be placed into the network associated state (Bound state) by a user operation or a process of a reproduction apparatus. It is to be noted that contents which are inhibited from being placed into the network associated state (Bound state) like the contents 1 illustrated in (a) of FIG. 9 also exist.

The information described is determined as an attribute of each piece of the contents (contents management unit) stored on the information recording medium and is stored as attribute information corresponding to the contents management unit on the information recording medium or in the management server in which management information is stored.

For each piece of the contents (contents management unit), copy processing modes which can be executed in the two states described above are determined in advance as:

(1) a process which can be executed in the network independent state (Discrete state); and (2) a process which can be executed in the network associated state (Bound state).

The information regarding the processes is recorded as corresponding attribute information of the individual contents (contents management units) on the information recording medium or recorded in the management server which holds management information.

As an example, such contents (contents management units), for example, as illustrated in (a) to (f) of FIG. 8 are possible.

(a) The contents 1 are contents (contents management units) which can be reproduced in the network independent state (Discrete state) and cannot be placed into the network associated state (Bound state).

(b) The contents 2 are contents which can be reproduced in the network independent state (Discrete state) and can be reproduced also in the network associated state (Bound state), but are contents (contents management unit) whose copy is not permitted.

(c) The contents 3 are contents which can be reproduced in the network independent state (Discrete state) and can be reproduced also in the network associated state (Bound state). Further, the contents 3 are contents (contents management unit) whose copy into a recording medium of the type same as that of the source of the copy is permitted only in the network associated state (Bound state).

As the destination of copy, the following three types are presumable:

a recording medium of the type same as that of the copy source;

a different recording medium (within the network); and a portable apparatus.

The contents 3 are contents whose copy only on a recording medium of the same type is permitted. Only if it is confirmed that the destination of the copy is a recoding medium of the same type as that of the source of the copy, the source of the copy can send the data on the recording medium as they are to the destination of the copy.

(d) The contents 4 are contents which can be reproduced in the network independent state (Discrete state) and can be reproduced also in the network associated state (Bound state). Further, the contents 4 are contents (contents management unit) whose copy on a recording medium of a type different from that of the source of the copy is permitted only in the network associated state (Bound state).

The contents 4 permit copy on a different recording medium, and as occasion demands, an apparatus of the source of the copy or the destination of the copy can perform conversion of data and recording of resulting copy data.

(e) The contents 5 are contents which can be reproduced in the network independent state (Discrete state) and also can be reproduced in the network associated state (Bound state). Further, the contents 5 are contents (contents management unit) whose copy into a portable apparatus is permitted only in the network associated state (Bound state). A portable apparatus may be carried out from a home network, and it is necessary to perform copy management taking carrying out of the portable apparatus to the outside into consideration.

As a limitation regarding copying, it is necessary to prescribe the number of times of copying, the term of validity, a process when an original recording medium is placed out of the network associated state (Bound state) and so forth. Preferably, the information regarding them can be prescribed individually for the three copy modes described above. It is to be noted that, as a process when an original recording medium is placed out of the network associated state (Bound state), invalidation, invalidation after lapse of a fixed interval of time, erasure and so forth of copy data are presumable. Data which are not erased can be used as they are when the recording medium is placed back into the network associated state (Bound state). Consequently, even in such a case that the recording medium is lent to a friend or the like, although copy data are temporarily placed into a disabled state, when the medium is returned, the use of the copy data is enabled again.

(f) The contents 6 are contents which cannot be reproduced in the network independent state (Discrete state) but is contents (contents management unit) which can be reproduced only in the network associated state (Bound state). Further, the contents 6 are contents (contents management unit) which have data for copy stored on the recording medium in advance presupposing that the data for copy may be copied in the home network.

The data for copy may be, for example, of a format which cannot be reproduced by the apparatus of the source of the copy, or copy of the data for copy may be permitted as a result of copying on a different apparatus. For example, a configuration can be applied wherein, on a recording medium on which data of the multi-layered format described hereinabove with reference to FIGS. 2 and 3 are stored, data for copy having the same substance are stored in advance in a data format which can be reproduced by a general apparatus connected to the network (for example, a file format such as the AVI format or the MPEG-PS format which can be reproduced by a personal computer), and in copying through the network, the data for copy are signaled thereby to allow reproduction on such an apparatus as described above.

It is to be noted that it is preferably configured to perform authentication or acquisition of a key through the network before copy of contents is performed. Further, for example, in a system which imposes a charge for each copying and requires a key to perform copying, such a contents management processing configuration as to limit the number of times of copying based on the number of times of distribution of the key preferably is adopted.

7. Management Information Corresponding to Contents Management Units

Now, management information corresponding to contents management units of an information recording medium on which contents sectioned into contents management units described hereinabove and encrypted using a unit key as a cryptographic key for a unit of contents management unit are stored is described. It is to be noted that the contents described below include both main contents and sub-contents.

As described hereinabove, one unit key is set in a coordinated relationship to a contents management unit (CPS unit), and a contents management unit (CPS unit) configuration and key management table is set as such a management table of unit key information as shown in FIG. 4 unit configuration and unit key management table.

Further, attribute information corresponding to a contents management unit (CPS unit) includes state information which indicates in which one of (a) the network independent state (Discrete state), and (b) the network associated state (Bound state) each contents management unit (CPS unit) is as described hereinabove. It should be noted that, in an information recording medium which does not allow data writing, only information in an initial state is described as the state information.

In an information recording medium which allows data writing, two kinds of information including information in an initial state and information at present are recorded. A writing process of state information at present on a recording medium is performed by an information processing apparatus as a reproduction apparatus in which the information recording medium is loaded or a management server connected through the network.

FIG. 10 illustrates an example of a configuration of a "state management table" in which information in an initial state and information in a state at present are recorded on an information recording medium which allows data writing. The state management table describes in which one of (a) the network independent state (Discrete state) and (b) the network associated state (Bound state) the initial state and the state at present corresponding to each contents management unit (CPS unit) are.

It is to be noted that the state management table shown in FIG. 10 is recorded on the information recording medium and further recorded in an information processing apparatus as a reproduction apparatus in which the information recording medium is loaded or an external apparatus such as the management server connected through the network.

In the case of an information recording medium which does not allow data writing, only data in an initial state are recorded, and an information processing apparatus as a reproduction apparatus in which the information recording medium is loaded or an external apparatus such as the management server connected through the network has a state management table in which an initial state and a state at present are recorded.

The following states are selectively set as an initial state in the state management table:

a. discrete only;
b. discrete initially;
c. bound only; or
d. bound initially.

The a. discrete only indicates contents (contents management unit) which are permitted to assume only the network independent state (Discrete state) but not permitted to enter the network associated state (Bound state).

The b. discrete initially indicates contents (contents management unit) which initially assume the network independent state (Discrete state) but are permitted to enter the network associated state (Bound state).

The c. bound only indicates contents (contents management unit) which are permitted to assume only the network associated state (Bound state) but are not permitted to enter the network independent state (Discrete state).

The d. bound initially indicates contents (contents management unit) which initially assume the network associated state (Bound state) and are permitted to enter the network independent state (Discrete state).

The network associated state (Bound state) in an initial state presumes a case wherein contents are distributed in a state associated with information on the network in advance. This applies, for example, to contents which are presupposed to be reproduced together with information on the network.

As the state at present, any one of the network independent state (Discrete state) and the network associated state (Bound state) is set.

Although it is possible to set the state at present for each contents management unit, two state management methods are available as a mode of performing utilization management of contents. The first method is a configuration wherein, when a recording medium is placed out of the home network, the contents are placed back into the initial state.

For example, where a removable medium which can be removably loaded into a reproduction apparatus is used as a contents storage recording medium, the states of the individual contents are returned to the respective initial states at a point of time when the removable medium is removed from the reproduction apparatus. In this instance, the state management table stored outside the recording medium is also initialized.

The second method is to register the state of the recording medium into the external management server. In this instance, only if a removable medium is removed, the state management table outside the recording medium need not be initialized.

When it is tried to load a removable medium, on which contents set to the network associated state (Bound state) are stored by a reproduction apparatus of a home network (A), for example, into another reproduction apparatus connected to a home network (B) constructed in another home and set the removable medium to the network associated state (Bound state), then the management server detects, based on the state management table, that the contents which are in the network associated state (Bound state) in the home network (A) are being set to the network associated state (Bound state) doubly in the different home network (B) and does not permit setting of the contents to the network associated state (Bound state) in the home network (B).

Where such management as described above is performed, the same contents can be prevented from being utilized parallelly in a number of different utilizations.

It is to be noted that, if each management server holds such a state management table as shown in FIG. 10, then even if a removable medium is removed from a reproduction apparatus, the state of contents of the removable medium at present can be referred to and utilization management of the contents based on the detected states can be performed.

It is to be noted that, where the information recording medium is a recordable medium and the state at present is recorded on the information recording medium, since the state at present is recorded on the recording medium, it is possible to read the state of the information recording medium at present directly from the recording medium without confirming whether or not the recording medium is in the network associated state (Bound state) through the server and perform utilization management of the contents based on the read information.

It is to be noted that, as a configuration for writing such state management information as described above into a ROM medium which does not allow write-once writing in an ordinary data area, preferably a writable area is formed partially on a ROM medium and a configuration wherein the ROM medium having the configuration is used is adopted.

Further, another configuration is adopted wherein an optical disc medium which allows write-once writing, a medium accommodated in a cartridge having an IC memory or the like or a like medium is used.

It is to be noted that the state management table shown in FIG. 10 may be formed as such an information table wherein a contents management unit (CPS unit) configuration and a table unit configuration and unit key management table for managing unit keys are integrated with each other as shown in FIG. 4 or alternatively may be formed as such management tables separate from each other.

The management information corresponding to a contents management unit further includes reproduction, utilization limitation information of contents where the contents are network independent state (Discrete state) and reproduction, utilization limitation information of contents where the contents are in the network associated state (Bound state).

Such contents management information is described as attribute information corresponding to contents on the information recording medium or recorded in the management server which performs the contents management process. It is to be noted that, for contents which permit utilization thereof only in the network associated state (Bound state), it is possible to take a contents utilization management configuration based only on the contents management information recorded in the management server.

An example of data of contents management information is described with reference to FIG. 11. FIG. 11 illustrates an example of a configuration of contents utilization control information recorded with fixed length data, that is, a contents reproduction and copy control information management table. The contents reproduction and copy control information management table is set as data in a unit of a CPS unit or as an information table wherein data of all CPS units are collected.

The contents reproduction and copy control information management table shown in FIG. 11 has control information regarding utilization or copy recorded with fixed length data thereon. The control information in this instance may be contents management information which depends upon, for example, information of the state of contents; that is, whether the contents are in the network independent state (Discrete state) or in the network associated state (Bound state).

Where contents utilization in the home network is taken into consideration, such setting of contents management information of a fixed length as illustrated in FIG. 11 is preferable. As management information in the network independent state (Discrete state), for example, it is described whether or not reproduction in the network independent state (Discrete state) is possible. For contents which cannot be reproduced in the network independent state (Discrete state), a method for reproducing the contents is described. For example, the fact that it is necessary to acquire key data which is distributed through connection to a key distribution server or in the form of a different medium (memory card or the like), information for specifying the server such as a URL or a telephone number or an index value to a list in which such information is stored is described.

Meanwhile, as management information in the network associated state (Bound state), whether or not copying in a network, streaming or remote reproduction is possible, the number of times of copying, the term of validity, whether or not copying or streaming data are present, the data conversion system, handling of copy data when the contents are placed out of the network associated state (Bound state) and so forth for each of types of object apparatus are described.

It is to be noted that, since FIG. 11 supposes storage of part or all of the information described into a field of a fixed length, data having a great number of characters such as a URL or the position of data (path information) are stored into a different file while an index to a list stored in the different file is stored into the field of the fixed length.

Further, in order to make it possible to acquire operation control information upon reproduction from the server without using reproduction control information on the recording medium and operate in accordance with the operation control information, such a configuration that a flag indicating acquisition of information from a server and information indicative of an accessing method to the server are stored as seen from contents management information configuration data 501 shown in FIG. 11 may be used.

Where such information is set as contents management information, complicated control which cannot be represented with fixed length data, a change of the control method after the recording medium is sold and so forth are possible.

FIG. 12 shows an example of a configuration of a contents reproduction and copy control information management table wherein contents utilization control information set for each CPS unit, that is, contents reproduction and copy control information, is recorded in the form of variable length data.

The substance of information to be set is the same as that in FIG. 11. Since variable length information can be placed, data having a great number of characters such as a URL or the position of data (path information) also can be described directly in contents management information. Further, since a loop structure is adopted and a type (CCI_and_other_info_type) of contents management information is defined for each kind of contents management information, also when a new copy control method is added later, this can be coped with readily by defining a type and incidental information (CCI_and_other_infor_value and Additional_info in FIG. 12). In this instance, no processing is required for unknown types of apparatus sold in the past.

It is to be noted that two different structures can be set including a structure wherein contents management information regarding the network independent state (Discrete state) and the network associated state (Bound state) is not separated from each other as seen in (A) of FIG. 12 and another structure wherein a loop of contents management information is provided for each of the two stages as seen in (B) of FIG. 12.

It is to be noted that, in order to make it possible to acquire operation control information upon reproduction from the server without using reproduction control information on the recording medium and operate in accordance with the operation control information, such a configuration that a flag indicating acquisition of information from a server and information indicative of an accessing method to the server are stored as seen from contents management information configuration data 502 shown in FIG. 12 may be used.

Where such information is set as contents management information, complicated control which cannot be represented with fixed length data, a change of the control method after the recording medium is sold and so forth are possible.

Further, if a configuration is used wherein user definition information 503 is set in the contents reproduction and copy control information management table as seen in FIG. 12 and a type of control information which can be defined by a user is set in the user definition information 503, then it is possible to use contents reproduction control ready for each individual user; that is, a reproduction process wherein, for example, particular membership users and non-membership users are handled separately from each other such that reproduction is permitted only to the membership users. Or, where the configuration described is used, a control method which is beyond the limits of specifications belonging to a recording medium such that copy control information (CCI information) which does not rely upon the medium specifications or a control method which can be defined freely by a contents distributor can be achieved.

As an example of use of copy control information (CCI information) based on a user definition, for example, the use wherein a definition of copy control information (CCI information) which does not rely upon the specifications for a recording medium is set is available.

Parameters and so forth of the copy control information (CCI information) are prescribed by standards for each particular recording system (such as the DVD standards), and it is difficult to extend the copy control information (CCI information) after reproduction apparatus ready for the copy control information (CCI information) are popularized once.

Therefore, arbitrary control information which is not included in the copy control information (CCI information) determined by a recording system is set as user definition information, and a contents owner or manager sets unique copy control information (CCI information).

Since interpretation of copy control information (CCI information) set uniquely by a contents owner or manager is difficult only with a reproduction apparatus which complies with the specifications, an application (for example, Java) for interpreting the copy control information (CCI information) is stored on the recording medium, in the server or the like such that it can be acquired from the recording medium or from the outside such as the server. Then, the acquired application is executed on a reproduction apparatus. Consequently, copy control information (CCI information) defined uniquely can be interpreted, and operation control in accordance with the CCI information can be executed on the reproduction apparatus.

8. Storage Configuration of Main Contents, Sub-Contents, and contents management Information Now, a storage configuration of main contents, sub-contents and contents management information is described.

Various contents management units (CPS units) described hereinabove, a directory configuration for storing various kinds of management information corresponding to the units and an example of setting of a storage section for the management information are described with reference to FIG. 13. A BDMV directory is a directory for storing application files in the Blu-ray Disc ROM format.

In the directory configuration shown in FIG. 13, a main contents data part 511 is a directory which stores data files of main contents in a configuration of a number of layers according to a particular AV format described hereinabove with reference to FIGS. 2 and 3, that is, contents, programs and so forth according to the particular AV format (Blu-ray Disc ROM format) having a layered configuration such as the application, play list and clip layers and so forth.

Such data files as described above are stored in the user data area of the information recording medium. It is to be noted that an AV stream included in a clip is a data file encrypted with a unit key set for each contents management unit (CPS unit).

Management files corresponding to the main contents are stored in a main contents management data part 512. In particular, data files of various tables including such a table for managing contents management unit (CPS unit) configurations and unit keys as described hereinabove with reference to FIG. 4, that is, the unit configuration and key management table, the state management table for managing the states of the network independent state (Discrete state) and the network associated state (Bound state) of each contents management unit described hereinabove with reference to FIG. 10 and the contents reproduction and copy control information management table for storing utilization and copy control information of contents in the individual states described hereinabove with reference to FIGS. 11 and 12 are stored. The tables are stored as individual data files or as a data file including a table wherein a number of tables are combined.

A sub-contents data part 513 is a directory wherein contents which do not belong to main contents, that is, contents which do not comply with the particular AV format (Blu-ray Disc ROM format), or contents belonging to the data group illustrated in FIGS. 2 and 3, are stored. Also, the data files are stored in the user data area of the information recording medium. It is to be noted that the contents belonging to the sub-contents data part 513 may include both of contents which are set as contents management units (CPS units) and contents which are not set as contents management units (CPS units). Contents set as a contents management unit (CPS unit) make a data file encrypted with a unit key.

Management files corresponding to sub-contents are stored in a sub-contents management data part 514. In particular, data files of various tables including such a table for managing contents management unit (CPS unit) configurations and unit keys as described hereinabove with reference to FIG. 4, that is, the unit configuration and key management table, the state management table for managing the states of the network independent state (Discrete state) and the network associated state (Bound state) of each contents management unit described hereinabove with reference to FIG. 10 and the contents reproduction and copy control information management table for storing utilization and copy control information of contents in the individual states described hereinabove with reference to FIGS. 11 and 12.

Data group information 515 is a file in which data group information of the sub-contents is stored, and for each of data groups 1 to N, a path of data files which belong to the group is registered. In order to open sub-contents, the data group information 515 is opened first, and then information of the group to which the desired contents belong is acquired and a data file can be specified based on the acquired information.

It is to be noted that, in the case of a group set as a contents management unit (CPS unit), each data group is encrypted with a unit key coordinated therewith, and in order to utilize a data file which belongs to the group set as the contents management unit (CPS unit), it is necessary to acquire the unit key and perform a decryption process using the unit key. The information mentioned can be acquired from the management file of the sub-contents management data part 514.

Figure 13:
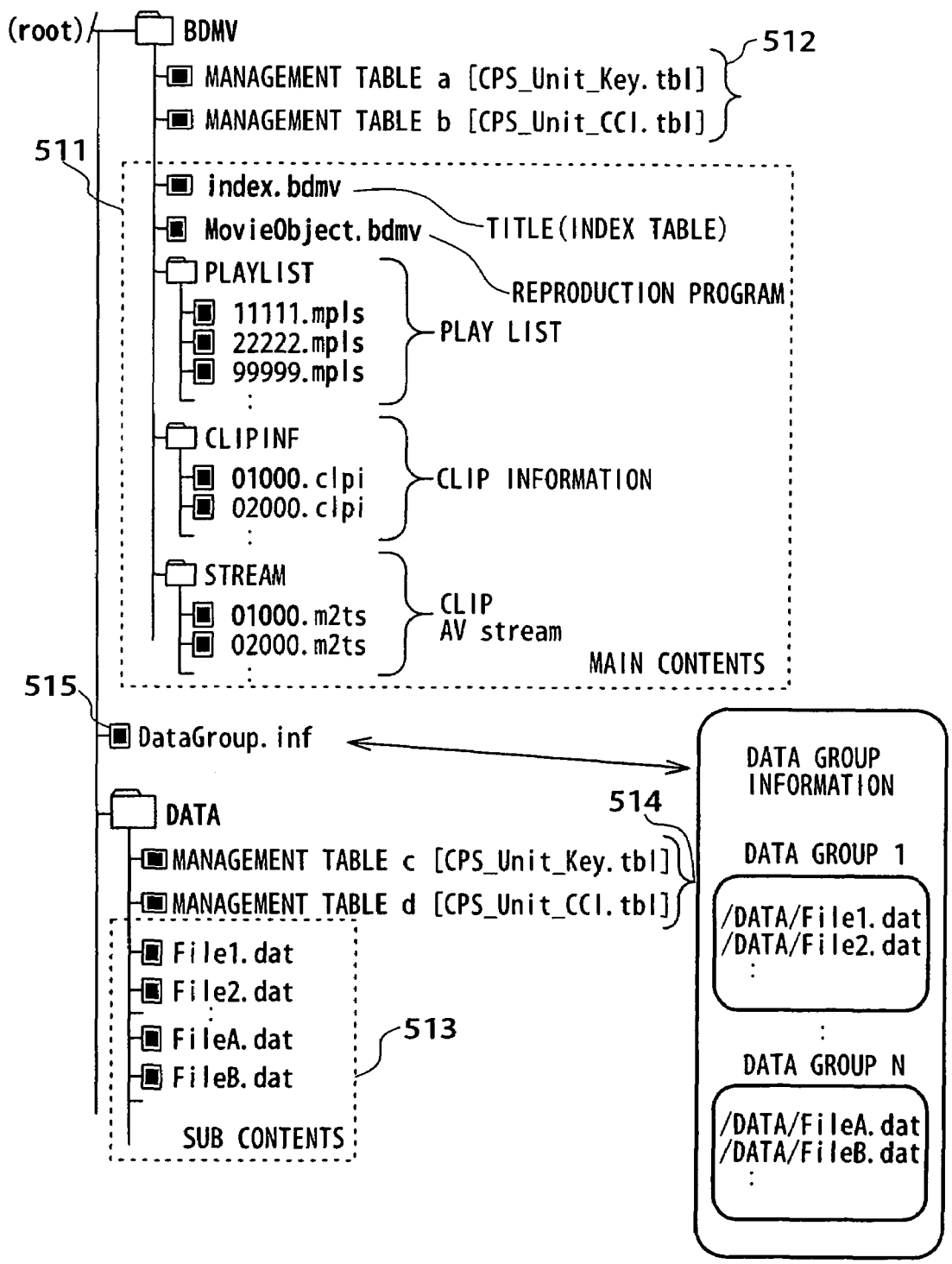
FIGS. 13, 14 and 15 are diagrammatic views illustrating different examples of a configuration of a data storage directory of an information recording medium.
Figure 14:
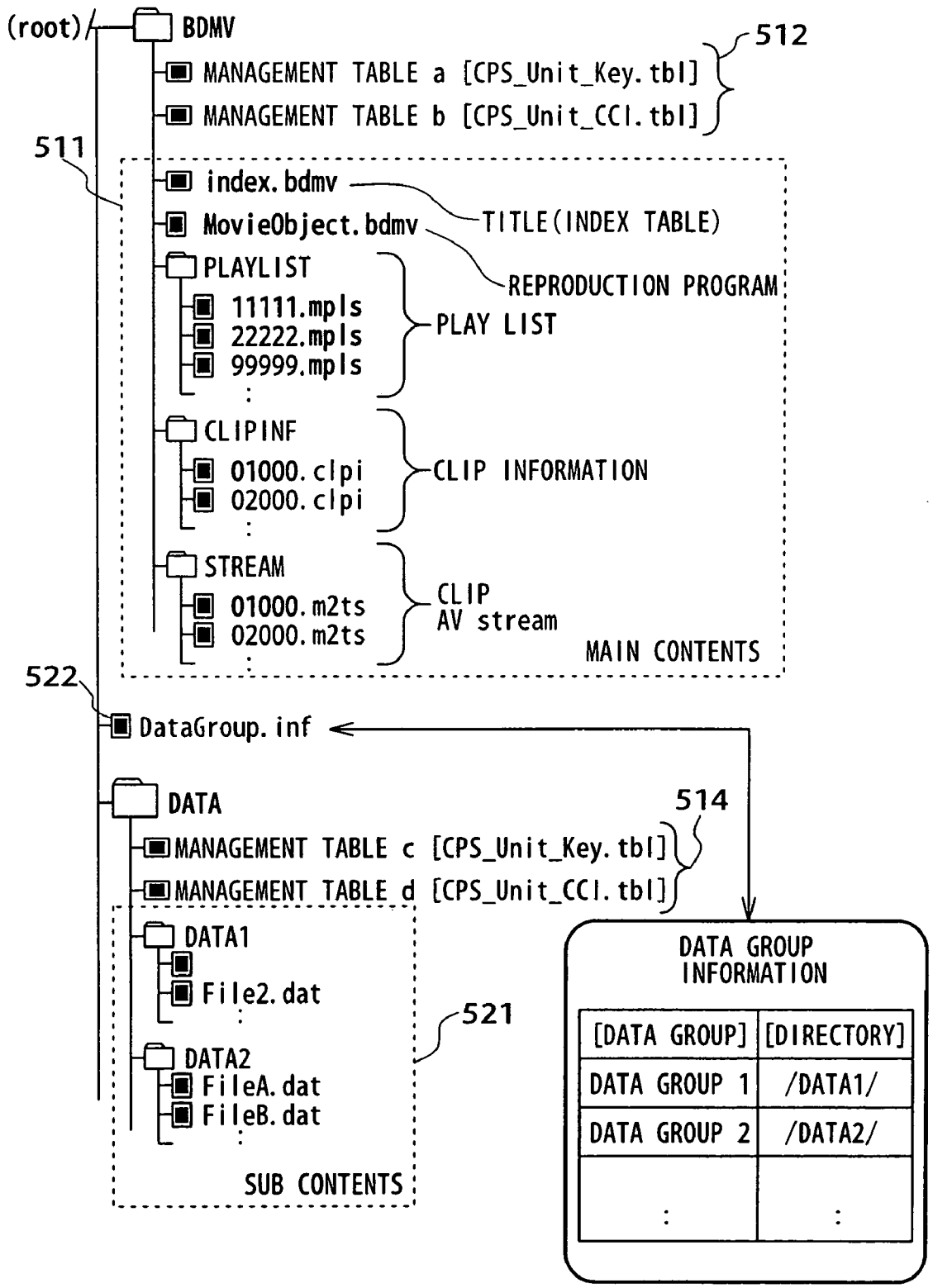

While the sub-contents data part 513 shown in FIG. 13 has a configuration wherein files which belong to all data groups are set in a mixed state, another configuration may be used wherein a folder is set for each data group such that files of data and so forth which belong to the same group may be included in the folder as seen in FIG. 14.

Where the configuration shown in FIG. 14 is employed, data group information 522 is formed as data to which directory names (folder names) corresponding to the data groups are set. In order to open a piece of sub-contents, the data group information 522 is opened first to acquire the directory name as information of the group to which the desired piece of sub-contents belongs, and then the data file is acquired based on the acquired information.

In the data storage configurations shown in FIGS. 13 and 14, management information corresponding to main contents and management information corresponding to sub-contents are set separately from each other. However, for example, such a configuration as shown in FIG. 15 may be used alternatively wherein the two kinds of management information are set as a file directly coupled to the root such that all of management information corresponding to the main contents and the sub-contents is managed collectively.

Figure 15:
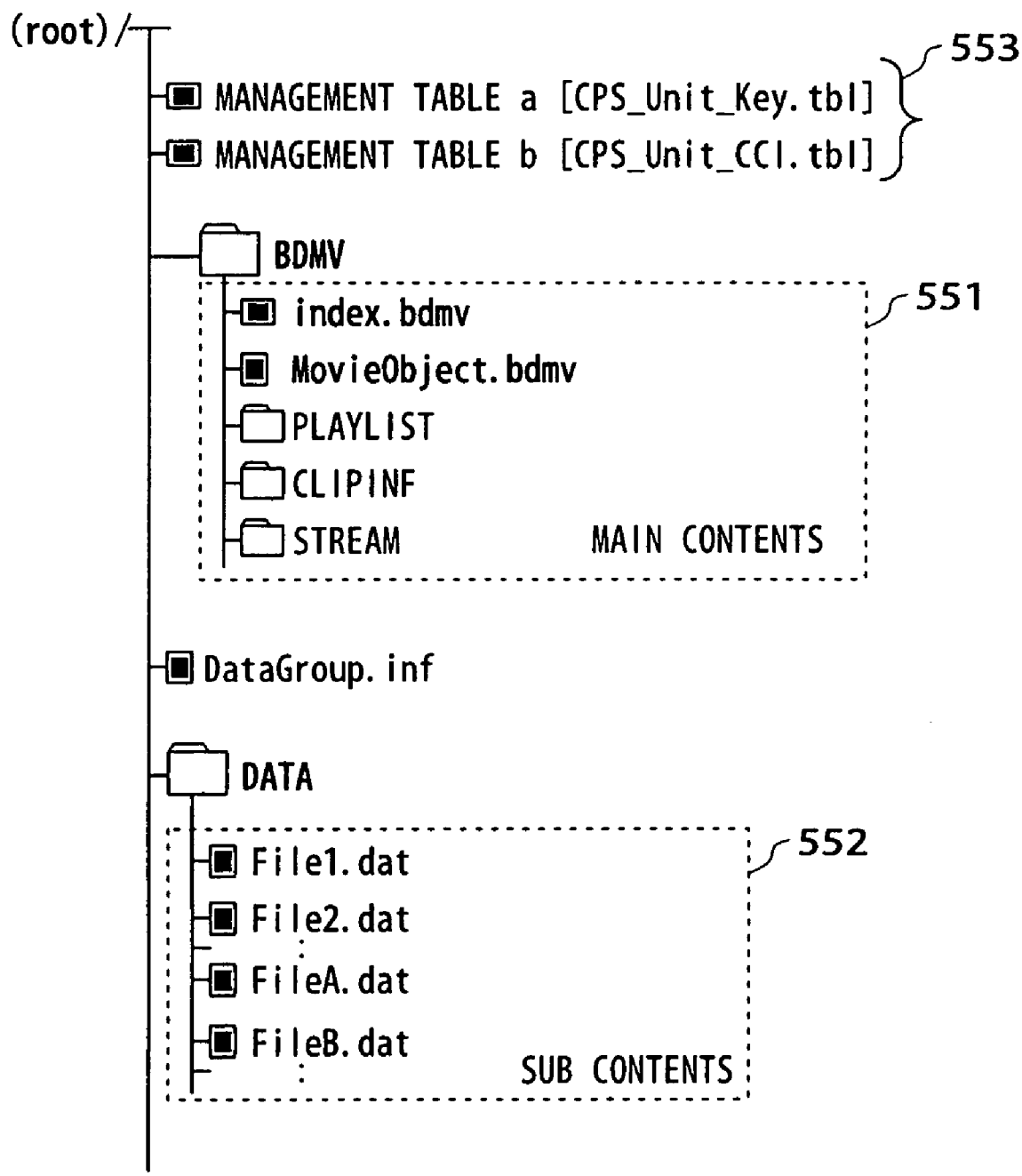

The directory configuration shown in FIG. 15 includes a main contents data part 551, a sub-contents data part 552, and a contents management data part 553 for both of main contents and sub-contents.

Management files corresponding to both of the main contents and the sub-contents are stored in the contents management data part 553. In particular, data files of various tables including such a table for managing contents management unit (CPS unit) configurations and unit keys as described hereinabove with reference to FIG. 4, that is, the unit configuration and key management table, the state management table for managing the states of the network independent state (Discrete state) and the network associated state (Bound state) of each contents management unit described hereinabove with reference to FIG. 10 and the contents reproduction and copy control information management table for storing utilization and copy control information of contents in the individual states described hereinabove with reference to FIGS. 11 and 12 are stored.

The main contents management data, the sub-contents management data or the contents management data including both of them can be stored in various storage forms.

Figure 16:
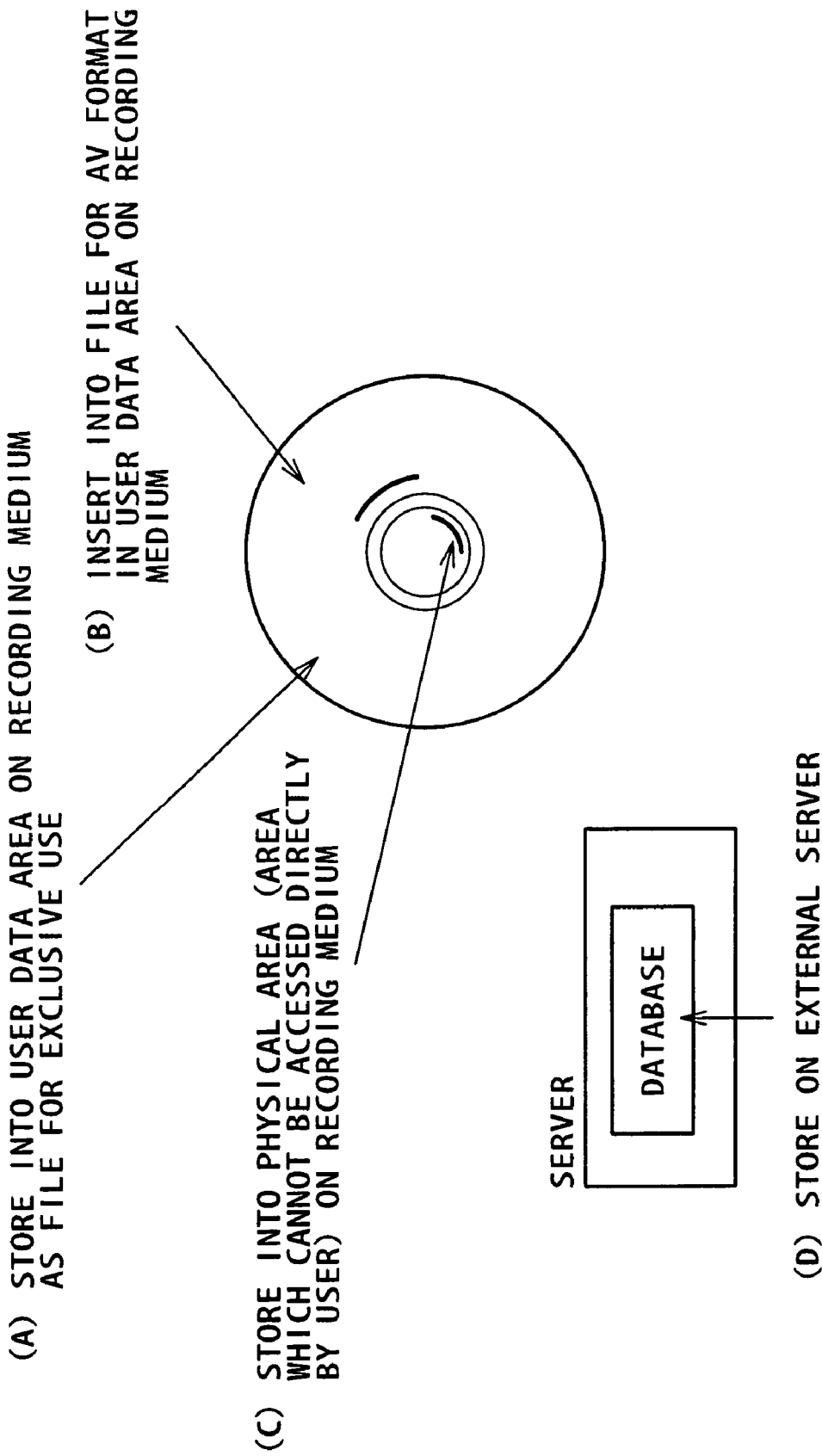
FIG. 16 is a schematic view illustrating storage modes of management information.

FIG. 16 illustrates different examples of a storage configuration of the management data. The management data are stored, for example, in the following forms.

(A) The management data are stored as a file for exclusive use in the user data area of the recording medium.

(B) The management data are inserted in a file for an AV format in the user data area on the recording medium. For example, management table data are inserted in a title, an index data file or a file for an AV format such as a play list to store the management data.

(C) The management data are stored in a physical area of the recording medium; in particular, in an area of the recording medium which cannot be accessed directly by the user.

(D) The management data are stored in an external server.

The management data are stored in one of the forms (A) to (D) described above.

It is to be noted that, although the unit configuration and key management table, state management table and contents reproduction and copy control information management table are described as particular examples of the management data, they do not necessarily have to be stored in one form, but may be stored using different storage forms for the different tables.

An example wherein the three kinds of information described above are stored in a physical area (an area which cannot be accessed directly by a user) such as the lead-in area of the recording medium is the form (C). Another example wherein the three kinds of information are stored not on the recording medium but in an external server or the like is the form (D). In this instance, the reproduction apparatus must acquire information corresponding to the three tables from the external server without fail before reproduction of the recording medium is started.

9. Configuration of an Encryption and Falsification Preventing Process of Contents Utilization Control Information Now, a configuration of an encryption and falsification preventing process of contents utilization control information is described. In the following description:

an outline of a number of examples of a configuration is described in (9-1); and details of one particular process configuration are described in (9-2).

(9-1) Outline of the Configuration of the Encryption and Falsification Preventing Process of Contents Utilization Control Information First, an outline of the configuration of the encryption and falsification preventing process of contents utilization control information is described. In order to prevent illegal falsification or reading of the contents utilization control information corresponding to contents corresponding to each CPS unit described hereinabove with reference to FIGS. 11 and 12, that is, the contents reproduction and copy control information management table in which contents utilization, copy control information is placed, it is preferable to apply a falsification preventing process to and encrypt and store the information.

The falsification preventing process, encryption processing configuration of the reproduction/copy control information is described with reference to FIG. 17 and so forth.

Figure 17:
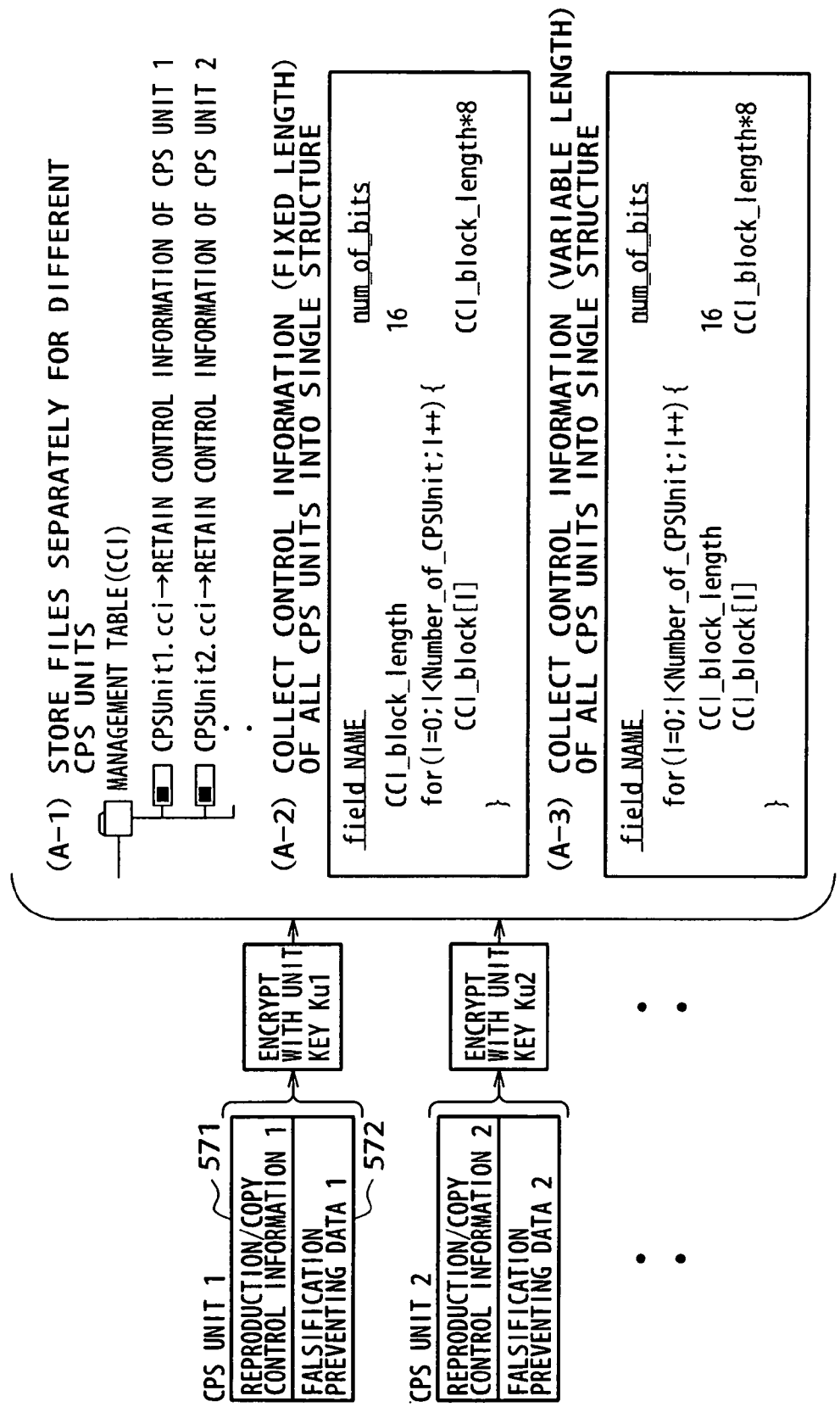
FIG. 17 is a diagrammatic view illustrating a falsification preventing and cryptography processing configuration of reproduction/copy control information.

The reproduction/copy control information which is set for each CPS unit is stored in an encrypted form after data for falsification verification is added as seen in FIG. 17.

For example, falsification verification data 1 572 is set for reproduction/copy control information 1 571 of a CPS unit 1. For the falsification verification data, a configuration wherein, for example, hash data of the SHA-1 or the like or the MAC (Message Authentication Code) based on reproduction/copy control information is set is applied.

The reproduction/copy control information 1 571 to which the falsification verification data 1 572 is added is encrypted with a unit key set corresponding to the CPS unit and stored.

The reproduction/copy control information can be stored in various storage forms including a form wherein a reproduction/copy control information file is set for each CPS unit as seen in (A-1) of FIG. 17. The reproduction/copy control information can be stored in another form wherein control information of all CPS units is stored collectively as a single data file formed from fixed length data described hereinabove with reference to FIG. 11 as seen in (A-2) of FIG. 17. Further, the reproduction/copy control information can be stored in a further form wherein control information of all CPS units is stored collectively as a single data file formed from various length data described hereinabove with reference to FIG. 12 as seen in (A-3) of FIG. 17.

Figure 18:
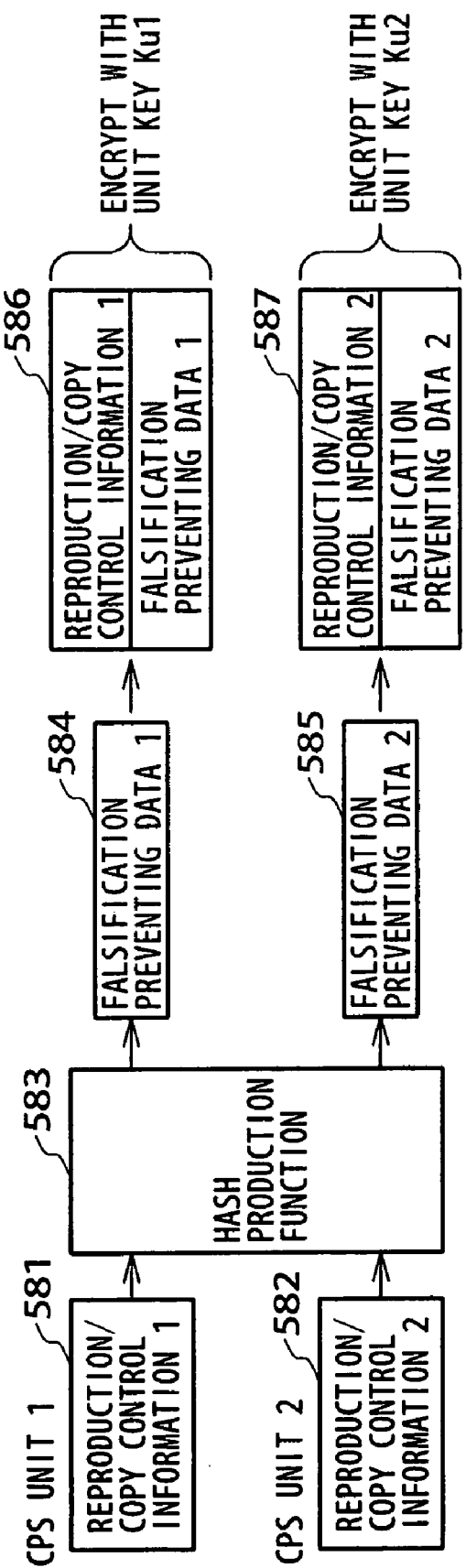
FIG. 18 is a diagrammatic view illustrating a falsification preventing and cryptography processing configuration of reproduction/copy control information which applies a hash function.

A sequence where a process which uses a hash function for the falsification verification data is executed is described with reference to FIG. 18.

From reproduction/copy control information data 581, 582 corresponding to the CPS units 1 and 2, hash values are produced by a hash production function 583 such as a SHA-1 function.

The hash values are set as falsification verification data 584, 585 corresponding to the reproduction/copy control information data 581, 582 corresponding to the CPS units 1 and 2, respectively. Further, unit keys Ku1, Ku2 corresponding to the CPS units 1 and 2 are used to encrypt connection data 586, 587 of the reproduction/copy control information and the falsification verification data, respectively, to produce storage files.

Figure 19:
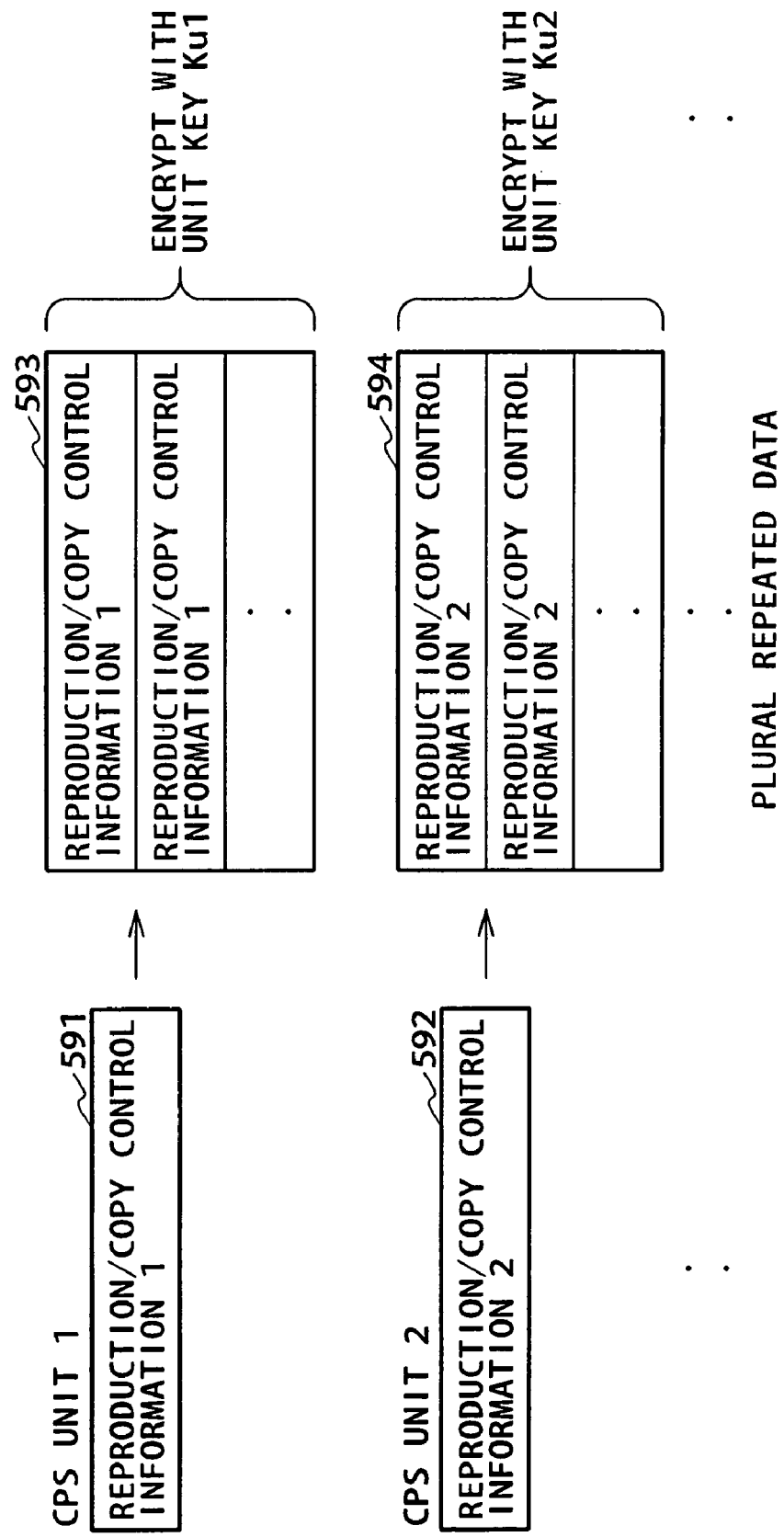
FIG. 19 is a diagrammatic view illustrating a falsification preventing and cryptography processing configuration of reproduction/copy control information which applies repeated data.

A falsification preventing configuration which does not apply a hash function is described with reference to FIG. 19. In a process illustrated in FIG. 19, reproduction/copy control information 591, 592 corresponding to the CPS units 1 and 2 are set as connection data 593, 594 wherein the reproduction/copy control information data are repeated by a number of times and the repeated reproduction/copy control information data are connected to each other to form connection data 593, 594, respectively. Then, the unit keys Ku1, Ku2 corresponding to the CPS units 1 and 2 are used to encrypt the connection data 593, 594, respectively, to form storage files.

Where such encrypted data of connection data of the same data are set as a storage file, when the unit key Ku1 or Ku2 is used to decrypt the encrypted data, verification of falsification can be performed based on whether or not a repeated pattern of the same data is detected.

An information processing apparatus which executes a reproduction process of the contents acquires the encrypted contents utilization control information corresponding to a contents management unit (CPS unit) stored on the information recording medium; that is, the reproduction/copy control information data. Then, the information processing apparatus executes a decryption process using a unit key set corresponding to the contents management unit and a falsification verification process. Then, under the condition that the contents are free from falsification, the information processing apparatus executes a contents utilization process based on the contents utilization control information.

(9-2) Examples of a Particular Configuration of the Encryption and Falsification Preventing Process of Contents Utilization Control Information Now, examples of a particular configuration of the encryption and falsification preventing process of contents utilization control information are described.

In the particular example described below, the reproduction/copy control information as the contents utilization control information is stored in the form illustrated in (A-1) of FIG. 17; that is, in the form wherein the reproduction/copy control information for each CPS unit is set and stored in an individual file corresponding thereto.

An encryption configuration of reproduction/copy control information as contents utilization control information is described with reference to FIG. 20 and so forth.

Figure 20:
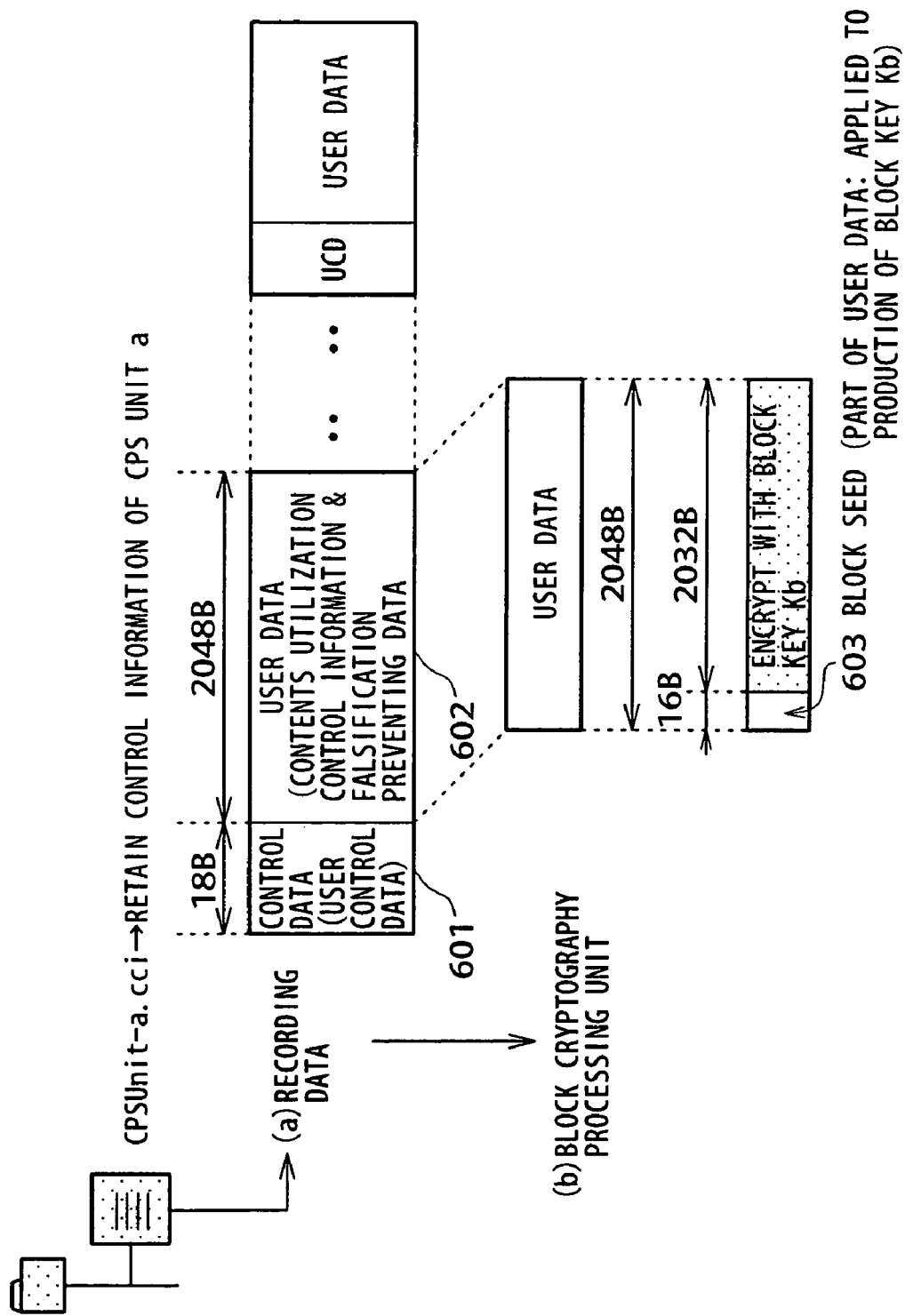
FIG. 20 is a diagrammatic view illustrating a data configuration of contents utilization control information stored on an information recording medium and, hence, a recording configuration of data which form individual files corresponding to reproduction/copy control information of individual CPS units.

FIG. 20 illustrates a data configuration of contents utilization control information stored on an information recording medium; that is, a recording configuration of data which form an individual file corresponding to the reproduction/copy control information for each CPS unit.

(a) of FIG. 20 shows a recording data configuration of contents utilization control information of a CPS unit 001 on the information recording medium. As seen in (a) of FIG. 20, the recording data have a configuration which includes a number of data blocks each formed from:

user control data (UCD: User Control Data) 601 of 18 bytes;

user data (User Data) 602 of 2,048 bytes including contents utilization control information; and hash data as falsification verification data.

The number of data blocks utilized differs depending upon the data length of the contents utilization control information.

The contents utilization control information of a CPS unit a shown in (a) of FIG. 20 corresponds to one CPS unit from among a number of CPS units stored on the information recording medium. For example, the contents utilization control information of the CPS unit a corresponds to contents utilization control information (CPSUnit001.cci) 610 of the CPS unit 001 in a directory showing a general data configuration recorded on the information recording medium illustrated in FIG. 21.

Figure 21:
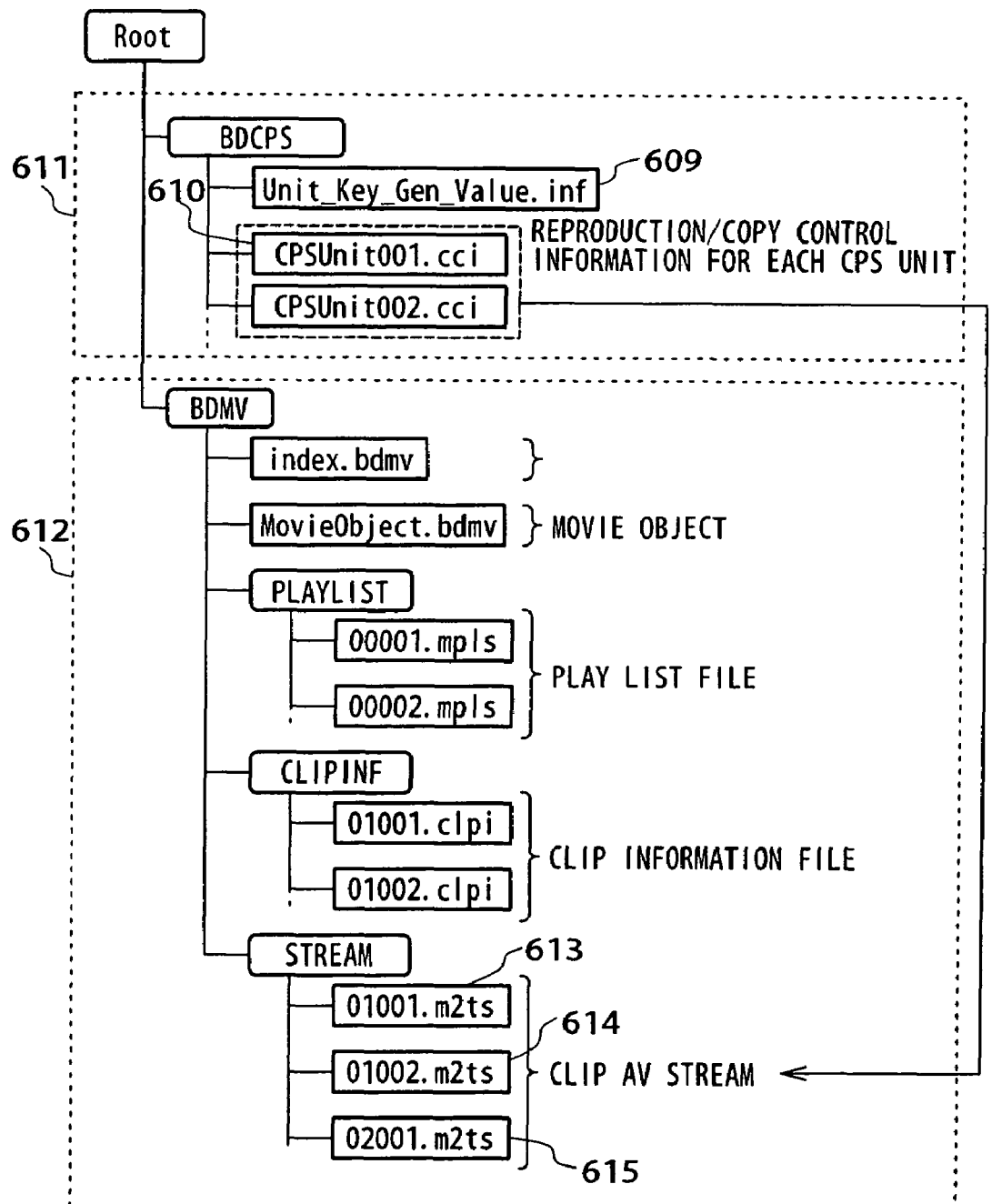
FIG. 21 is a diagrammatic view of a directory illustrating a general data configuration recorded on an information recording medium.

The directory configuration shown in FIG. 21 has set therein a contents data part 612 and a contents management data part 611 corresponding to contents. A BDMV directory shown in the contents data part 612 is set as a directory for storing contents and applications complying with the Blu-ray Disc ROM format.

Contents complying with the Blu-ray Disc ROM format have a layered configuration having layers of a title, an object, a play list, clip information, an AV stream and so forth as described hereinabove with reference to FIGS. 2 and 3, and data files which form the layered configuration are set to the BDMV directory.

Management files corresponding to contents are stored in the contents management data part 611. For example, unit key generation value information (Unit_Key_Gen_Value.inf) as information corresponding to the table described hereinabove which manages CPS unit keys for individual contents management units (CPS units) shown in FIG. 4 and contents utilization control information (CPSUnit0nn.cci) as reproduction/copy control information of contents set corresponding to each unit are stored for each CPS unit in the contents management data part 611.

A data configuration of unit key generation value information (Unit_Key_Gen_Value.inf) 609 is described with reference to FIG. 22. FIG. 22 illustrates an example of the Syntax of a unit key generation value information (Unit_Key_Gen_Value.inf) file. The unit key generation value information file is a data file which defines coordination information between the contents management units and the indices and random number information used for generation of a unit key.

In particular, the unit key generation value information (Unit_Key_Gen_Value.inf) file defines the indices including the first playback (First Playback) as reproduction contents to be started upon loading of the information recording medium (disc) into a drive described hereinabove with reference to FIGS. 5 to 7 and the top menu (Top Menu) as contents to be reproduced upon starting of the menu displaying function, information which coordinates titles as other indices and so forth with the CPS units and random number (Vu) information for generation of a key allocated to each CPS unit.

The unit key generation value information (Unit_Key_Gen_Value.inf) 609 includes the following data:

(a) (CPS_Unit_number_for_FirstPlayback) as designation information of a CPS unit No. corresponding to the first playback (First Playback);

(b) (CPS_Unit_number for TopMenu) as designation information of a CPS unit No. corresponding to the top menu (Top Menu);

(c) (Number of Titles) as title number information;

(d) (CPS_Unit_number for Title) as designation information of a CPS unit No. corresponding to each title;

(e) (Number of CPS_Units) as CPS unit number information; and (f) (Unit Key Generation Value for CPS_Unit) as random number (Vu) information for generation of a key corresponding to each CPS unit It is to be noted that, where contents corresponding to the first playback (First Playback) are not stored, (CPS_Unit_number_for_firstPlayback=0) is set, but where contents corresponding to the top menu (Top Menu) are not stored, (CPS_Unit_number_for_TopMenu=0) is set. Further, the CPS unit numbers are set in a coordinated relationship with the title numbers (Title #1 to Title #N).

The reproduction/copy control information of contents is set as individual information for each CPS unit. More particularly, individual contents utilization control information is set for each of the CPS units stored on the information recording medium like (CPS unit 1)

Copy permission time number for the recoding medium: a times, reproduction permission time number: b times, remote reproduction possibility: possible, . . .

(CPS unit 2)

Copy permission time number for the recoding medium: 0 time, reproduction permission time number: c times, remote reproduction possibility: impossible, . . .

Contents utilization control information (CPSUnit001.cci) 610 illustrated in FIG. 21 is contents utilization control information corresponding to the CPS unit 001, and contents utilization control information (CPSUnit002.cci) is contents utilization control information corresponding to another CPS unit 002.

The types of information mentioned particularly correspond to utilization control information of clip AV stream data 613, 614, 615 in the directory shown in FIG. 21.

FIG. 23 shows a contents configuration according to the Blu-ray Disc ROM format indicating a coordinated relationship between the AV streams and CPS units. The clip AV stream data 613, 614, 615 illustrated in FIG. 21 correspond to the clip AV stream data 613, 614, 615 illustrated in FIG. 23, respectively.

In particular, the clip AV stream data 613, 614 are data which belong to the CPS unit 001, and the clip AV stream data 615 are data which belong to the CPS unit 002.

Accordingly, the contents reproduction control information of the clip AV stream data 613, 614 is a contents reproduction control information file set corresponding to the CPS unit 001; for example, the contents utilization control information (CPSUnit001.cci) 610 illustrated in FIG. 21. Meanwhile, the contents reproduction control information of the clip AV stream data 615 is a contents reproduction control information file set corresponding to the CPS unit 002; for example, the contents utilization control information (CPSUnit002.cci) illustrated in FIG. 21.

When an information processing apparatus performs utilization of contents included in one of the CPS units, the information processing apparatus reads the contents utilization control information corresponding to the CPS unit and executes a utilization process in accordance with the read control information.

Referring back to FIG. 20, description of the recording configuration of the contents utilization control information is continued. The user control data (UCD: User Control Data) 601 of 18 bytes in the recording data illustrated in (a) of FIG. 20 is control data set for each user data (User Data) 602 of 2,048 bytes and is formed from control data of reproduction control information and so forth. The reproduction/copy control information for each CPS unit and a hash value as falsification verification data for the reproduction/copy control information are stored in the user data (User Data) 602.

Each data block undergoes block encryption in which a block key Kb generated from a block seed 603 set in the block and a unit key Ku corresponding to each contents management unit (CPS unit).

The block encryption process with the block key Kb is described with reference to FIG. 24. User data 621 illustrated in FIG. 24 indicate user data (2,048 bytes) in one data block. The user data include reproduction/copy control information for each CPS unit.

In the block encryption process, a block seed of a predetermined length is extracted from the user data (2,048 bytes) in one block, and an encryption process is performed based on the block seed and the unit key Ku to produce a block key Kb and an encryption process of the data part except the block seed is performed with the block key Kb.

Figure 24:
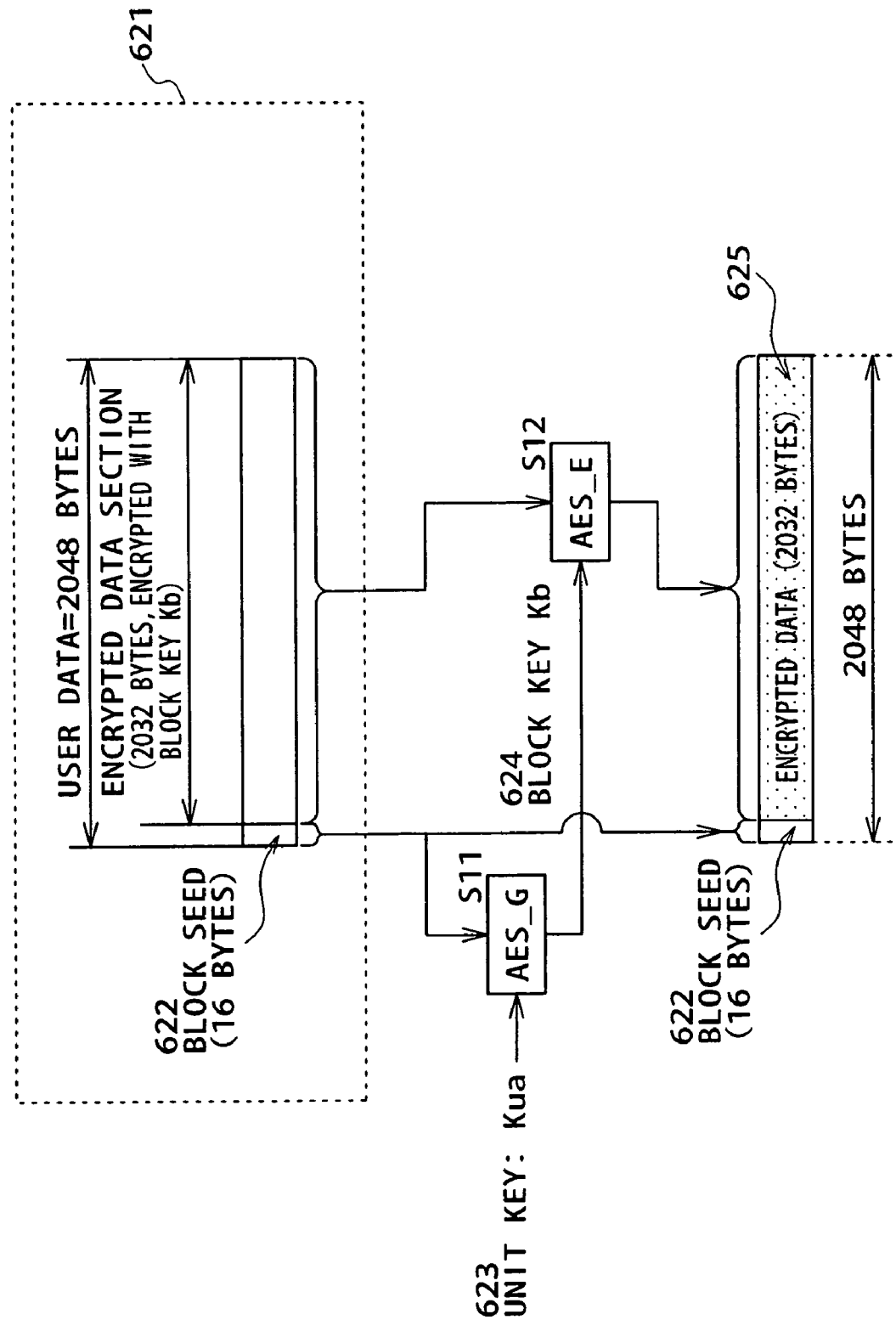
FIG. 24 is a diagrammatic view illustrating a block encryption process based on a block key.

In the example shown in FIG. 24, data of 16 bytes is extracted from the top portion of the user data, and the extracted 16-byte data is applied as a block seed 622.

As seen in FIG. 24, the block seed 622 of 16 bytes from the top of the user data is used for an encryption process, particularly for an AES encryption process, with a CPS unit key Ku-a at step S11 to generate a block key Kb 624.

The CPS unit key Ku-a used here is a unit key of a unit corresponding to contents utilization control information which is object data of the block encryption. Where the contents utilization control information which is object data of the block encryption is control data corresponding to the CPS unit a, the unit key Ku-a corresponding to the CPU unit a is applied. In this manner, a different unit key set for each CPS unit is used to execute generation of a block key.

After the block key Kb 624 is generated at step S11, an encryption process is executed for the data part of the user data 621 except 16 bytes of the block seed 622, that is, for the 2,032-byte data area, using the block key Kb 624 at step S12. For example, an AES encryption process is executed.

By the block encryption, the user data of 2,048 bytes which form the block data are set as the block seed 622 of 16 bytes which is not in an encrypted state and the encrypted data of 2,032 bytes encrypted with the block key Kb 624. The data are recorded on the information recording medium.

The block seed is extraction data from the user data and set as data which are different among different blocks. Accordingly, even where the common unit key Ku is applied, the block key Kb differs among different blocks. Consequently, an encryption process of a high degree of security is performed.

Figure 25:
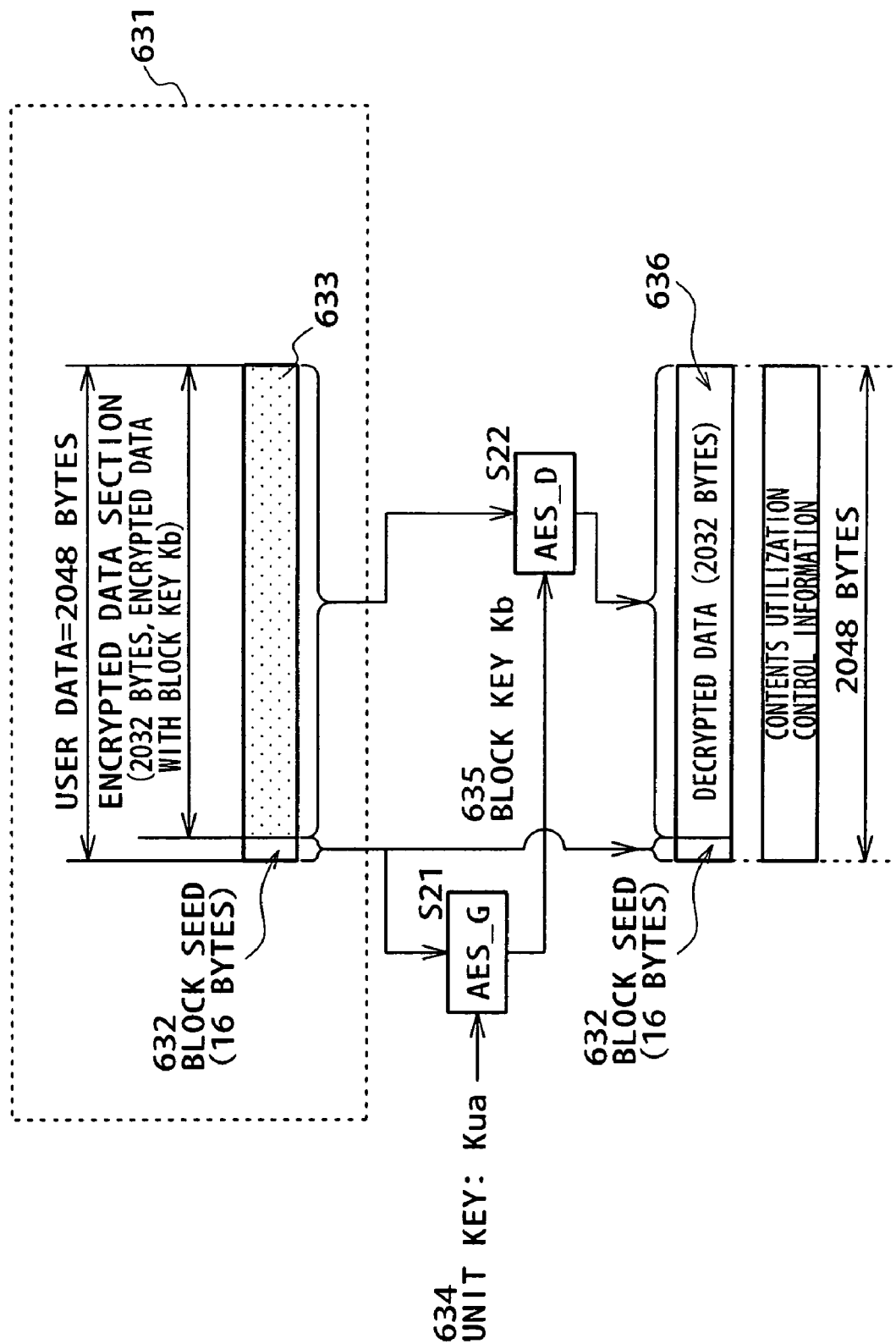
FIG. 25 is a diagrammatic view illustrating a decryption process based on the block key.

Now, a decryption processing sequence of data for which a block decryption process has been performed is described with reference to FIG. 25. User data 631 of 2,048 bytes illustrated in FIG. 25 are data for which the block encryption described hereinabove with reference to FIG. 24 has been performed. Thus, the user data 631 include a block seed 632 of 16 bytes for which an encryption process has not been performed and encrypted data 633 of 2,032 bytes encrypted with the block key Kb.

As seen in FIG. 25, a block seed 632 of 16 bytes from the top of user data is used for an encryption process with a CPS unit key Ku-a 634; more particularly, for example, for an AES encryption process to generate a block key Kb 635 at step S21.

The CPS unit key Ku-a 634 used here is a unit key of a unit corresponding to contents utilization control information which is object data of the block encryption. Where the contents utilization control information which is object data of the block encryption is control data corresponding to the CPS unit a, the unit key Ku-a corresponding to the CPS unit a is used.

After the block key Kb 635 is generated at step S21, a decryption process wherein the block key Kb 635 is used is executed for the data part of the user data 631 except the 16 bytes of the block seed 632; that is, for the encrypted data 633 of 2,032 bytes. For example, an AES decryption process is executed.

By the decryption process, the user data of 2,048 bytes which form the block data are composed of the block seed 632 of 16 bytes which are not in an encrypted form and decrypted data 636 of 2,032 bytes decrypted with the block key Kb 635. The data are contents utilization control information corresponding to a particular CPS unit, and an information processing apparatus which performs reproduction and utilization of contents performs contents utilization in accordance with the control information.

It is to be noted that, while encryption and decryption processes of one block are described with reference to FIGS. 24 and 25, contents utilization control information corresponding to a CPS is recorded using a number of blocks corresponding to the data length as described hereinabove with reference to FIG. 20. Accordingly, in recording and reproduction processes of contents utilization control information corresponding to a CPS, the process in a unit of a block described above with reference to FIGS. 24 and 25 is executed for a number of blocks.

Figure 26:
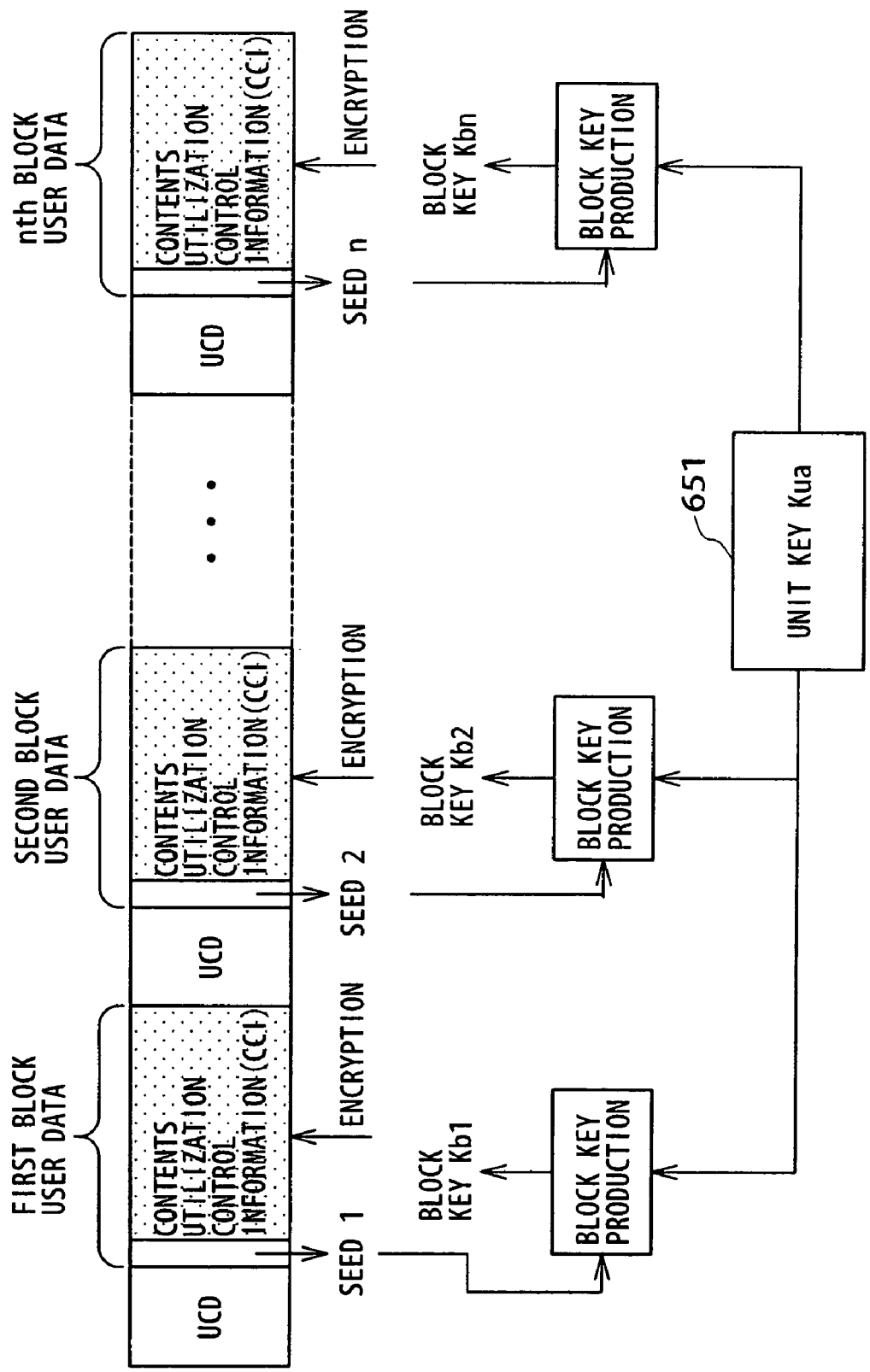
FIG. 26 is a diagrammatic view illustrating an example of a generation configuration of recording data of contents utilization control information corresponding to a certain one CPS unit.

FIG. 26 shows an example of a general configuration of recording data of contents utilization control information corresponding to a certain CPS unit a. The contents utilization control information is stored divisionally in a number of user data areas for block data. In the example shown in FIG. 26, user data of n blocks from the first to nth block are used.

From each block, 16 bytes at the top of the user data are extracted as a seed, and an encryption process in which a unit key Kua 651 corresponding to the unit is used is executed with the seed to generate a key.

With regard to the first block, key generation by an encryption process in which the seed 1 and the unit key Kua 651 are used is executed to generate a block key Kb1, and the block key Kb1 is used to encrypt the data area of the user data except the seed part. Similarly, with regard to the second block, key generation by an encryption process in which the seed 2 and the unit key Kua 651 are used is executed to generate a block key Kb2, and the block key Kb2 is used to encrypt the data area of the user data except the seed part. A similar process is executed for all of the other blocks to generate recording data.

Now, an example of recording of a contents utilization control information file corresponding to one contents management unit (CPS unit) and an example of setting of a hash value as falsification verification data are described with reference to FIG. 27.

As described hereinabove with reference to FIGS. 20 to 26, contents utilization control information as reproduction/copy control information of each CPS unit is divisionally stored in the user data area of 2,048 bytes which form block data.

Figure 27:
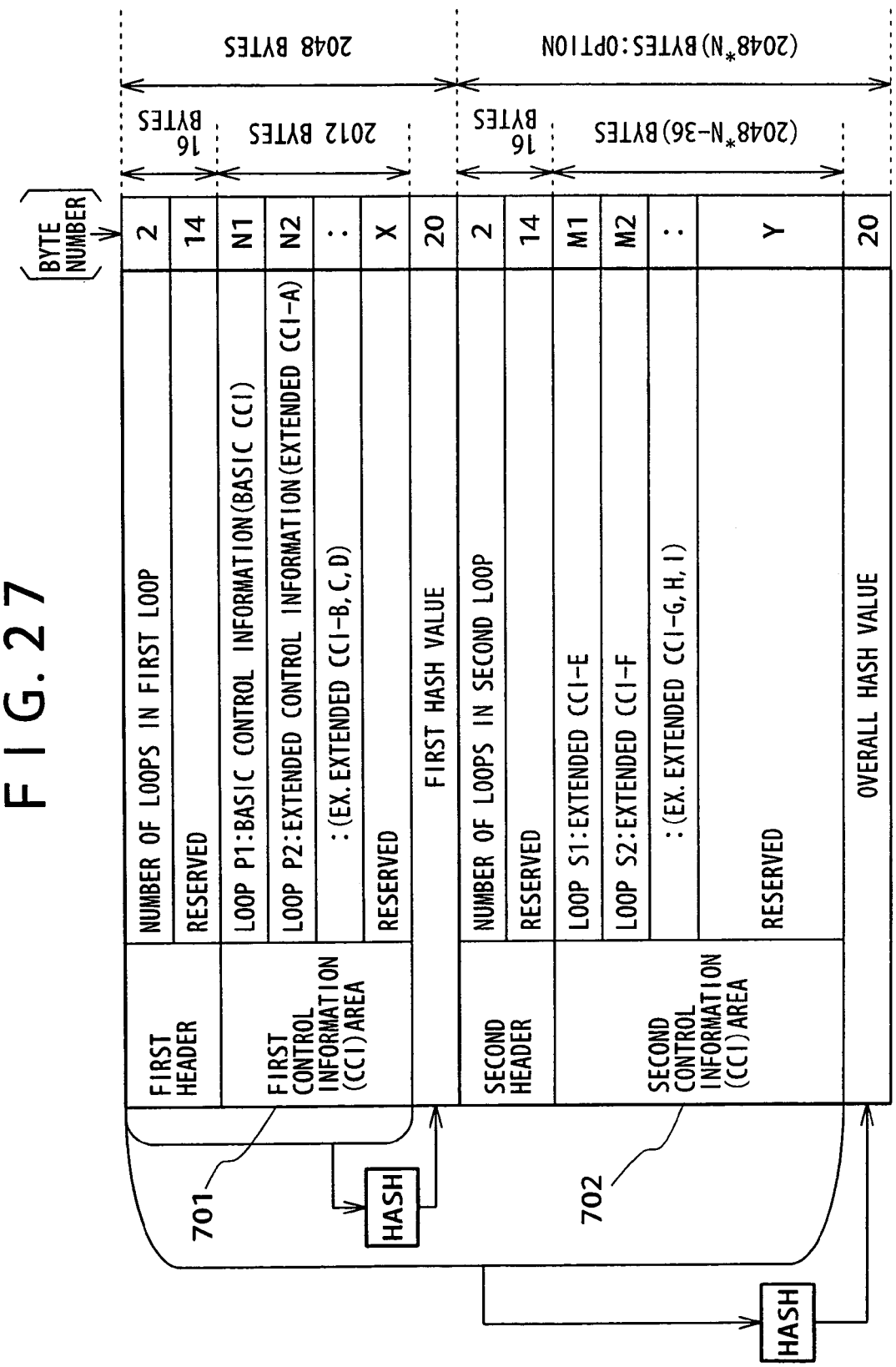
FIG. 27 is a view illustrating an example of recording of a contents utilization control information file corresponding to one contents management unit (CPS unit) and an example of setting of a hash value as falsification verification data.

FIG. 27 illustrates a first block 701 and a succeeding block 702 each as a user data area of 2,048 bytes which form block data in which contents utilization control information is placed. The succeeding block 702 is formed from one or more blocks. The succeeding block 702 is user data of N blocks and includes 2,048×N bytes.

The first block 701 is for user data having a total byte number of 2,048 bytes, and data of:
   a. a first header part: 16 bytes;
   b. a first control information (CCI) area: 2,012 bytes; and
   c. a first hash value: 20 bytes are stored in the first block 701.

In the a. first header part (16 bytes), information regarding the loop number of contents utilization control information (reproduction/copy control information) included in the first control information (CCI) area and a reserved area are set. The data of the first header part (16 bytes) is utilized as seed information for generation of a block key corresponding to the block.

As described hereinabove with reference to FIGS. 20 to 26, since the seed information does not make a block encryption object area, it remains in the form of plain text data when it is stored on an information recording medium. Accordingly, if contents utilization control information as reproduction/copy control information of each CPS unit is included in the 16-byte data of the top of the user data area of the block data utilized as seed information, then there is the possibility that the particular substance of the control information may leak to the outside. Therefore, the configuration is taken wherein the top 16-byte area is set as a header information area so that data of a low degree of secrecy are stored into the area.

In the b. first control information (CCI) area (2,012 bytes) following the header part, contents utilization control information (reproduction/copy control information) corresponding to each CPS unit is stored.

FIG. 27 illustrates an example wherein two kinds of control information including basic control information (Basic CCI) and extended control information (Extended CCI) are included in the contents utilization control information (reproduction/copy control information) of the first block 701. In the example shown in FIG. 27, a total of five information blocks are stored including one piece of basic control information (Basic CCI) and four pieces of extended control information (Extended CCI) A to D.

The basic control information (Basic CCI) is data formed from basic minimum contents utilization control information (reproduction/copy control information). The basic control information (Basic CCI) is information which is read by almost all information processing apparatus which execute a contents reproduction process in accordance with a predetermined contents reproduction processing program. The basic control information (Basic CCI) requires the information processing apparatus to execute processing in accordance with the control information. On the other hand, the extended control information (Extended CCI) is data formed from extended contents utilization control information (reproduction/copy control information) for being applied to an information processing apparatus which has a processing function of a high contents utilization process such as network transfer or streaming transmission/reception of data.

For the basic control information (Basic CCI), it is required to be extracted rapidly from a reproduction/copy control information storage file. On the other hand, for the extended control information (Extended CCI), a storage method which is less restricted by the size and so forth is adopted for the future extension. A particular example of the basic control information (Basic CCI) and the extended control information (Extended CCI) is illustrated in FIG. 28.

Referring to FIG. 28, the basic control information (Basic CCI) includes, for example, the following control information.

Copy possibility information: copy permitted/copy inhibited/copy permitted for only one generation.

Image output resolution limitation information: presence/absence of output limitation.

Analog copy control information:

permitted/inhibited (designate analog copy preventing technique to be used).

Information representative of encrypted/not encrypted state: encrypted/not encrypted.

Information representative of whether or not right is claimed: presence/absence of claiming of right.

Meanwhile, the extended control information (Extended CCI) includes, for example, the following information.

Information representative of whether or not reproduction by sole information recording medium (Disc) is possible: this indicates whether or not contents reproduction is possible only with information on the information recording medium (Disc).

Reproduction method of contents which cannot be reproduced with sole Disc: "connection to the key distribution server," insertion of a memory card in which the key is placed," etc.

Designation of server: index value to the server list.

Copy-streaming compatibility information: compatibility information for reproducing contents on another apparatus in the network.

Data conversion system upon copy-streaming: a system which can be used to convert contents into data for another apparatus.

Possibility of copy on same type recording medium in network and other limitation information.

Possibility of copying in portable apparatus and other copy limitation information.

Information of possibility of streaming, remote reproduction and so forth.

Control information for download process.

Information for acquiring operation control information from server.

It is to be noted that the extended control information (Extended CCI) allows setting of arbitrary control information.

Referring back to FIG. 27, the description of the configuration data of the first block 701 as the user data area of 2,048 bytes which form the block data in which the contents utilization control information is placed is continued.

In the first block 701, a first hash value (20 bytes) generated based on the data of:

a. the first header part: 16 bytes; and b. the first control information (CCI) area: 2,012 bytes, described hereinabove is placed. The hash value is data generated applying a hash function such as a SHA-1 function to the data of the first header part and the data in the first control information (CCI) area and is set as falsification verification data for the data of the first header part and the data in the first control information (CCI) area.

It is to be noted that the size of the hash value varies depending upon the hash function used, and in FIG. 27, an example is shown wherein a SHA-1 hash value of 160 bits (20 bytes) is used. However, it is possible to use a different hash function or a different hash value length. For the first hash value, a value obtained by inputting bit values from the top of the file to the bit immediately preceding to the area into which the hash value is to be recorded (where the SHA-1 is used, an area of 2,028 bytes from the top of the file) to the hash function is used.

An information processing apparatus which reads the contents utilization control information and executes the contents utilization in accordance with the utilization control information calculates a hash value based on data of the first header part and the data in the first control information (CCI) area. Then, the information processing apparatus executes comparison of the calculated hash value with a hash value placed in the user data area of the block data. If the hash values coincide with each other, then the information processing apparatus determines that the data are not falsified, and continues the processing. However, if the hash values do not coincide with each other, then the information processing apparatus determines that the data suffer from falsification, and stops the contents reproduction, utilization process in accordance with the contents utilization control information.

The succeeding block 702 shown in FIG. 27 is user data of N blocks and is formed from data of 2,048×N bytes.

The following data are placed in the user data of the succeeding block 702:

a. a second header part: 16 bytes;
b. a second control information (CCI) area: an arbitrary number of bytes; and
c. an overall hash value: 20 bytes.

The a. second header part: 16 bytes is 16 bytes of the top of the user data of the second block following the first block 701. In this area, information regarding the number of loops of the contents utilization control information (reproduction/copy control information) included in the second control information (CCI) area and a reserved area are set. The data of the second header part (16 bytes) are utilized as seed information for generation of a block key corresponding to 2,048 bytes of the top of the second block.

The b. second control information (CCI) area: an arbitrary number of bytes is set as an area for placing a number of pieces of contents utilization control information (reproduction/copy control information) within a range which does not exceed $(2,048 \times N - (16 + 20))$ bytes given as the difference of the header part and the data part of the overall hash from the data size $(2,048 \times N)$ bytes of the succeeding block 702. In the example shown in FIG. 27, a total of five information blocks of extended control information (Extended CCI) E to I are placed.

It is to be noted that, where a number of blocks are used for the succeeding block 702, 16-byte data of the top of the user data of each block is used as a seed area as block key generation information of the block. In the seed area, either configuration data of the, contents utilization control information (reproduction/copy control information) is placed, or information similar to the second header is placed, or else dummy data is placed.

In the overall hash value: 20 bytes, an overall hash value (20 bytes) generated based on the overall data of the first block 701 and, all data of the second header part: 16 bytes and second control information (CCI) area: an arbitrary number of bytes of the succeeding block 702 is placed. The overall hash value is data generated applying a hash function such as a SHA-1 hash function to the overall data of the first block 701, the second header of the succeeding block 702 and the overall data of the second control information (CCI). The overall hash value is thus used as falsification verification data for the overall data of the first block 701, the second header of the succeeding block 702 and the overall data of the second control information (CCI).

It is to be noted that the size of the hash value varies depending upon the hash function used, and in FIG. 27, an example is shown wherein a SHA-1 hash value of 160 bits (20 bytes) is used. However, it is possible to use a different hash function or a different hash value length. For the overall hash value, a value obtained by inputting bit values from the top of the file to the bit immediately preceding to the area into which the hash value is to be recorded (where the SHA-1 is used, an area of (file size—20) bytes from the top of the file) to the hash function is used.

An information processing apparatus which reads the contents utilization control information and executes the contents utilization in accordance with the utilization control information and, besides, executes a high grade contents utilization process in accordance with extended control information does not perform hash value verification of the first block but executes data falsification verification based on the overall hash value.

In particular, an information processing apparatus which execute contents utilization calculates a hash value based on the second header of the succeeding block 702 and the second control information (CCI). Then, the information processing apparatus executes comparison of the calculated hash value with an overall hash value placed in the user data area of the succeeding block 702. If the hash values coincide with each other, then the information processing apparatus determines that the data are not falsified, and continues the processing. However, if the hash values do not coincide with each other, then the information processing apparatus determines that the data suffer from falsification, and stops the contents reproduction, utilization process in accordance with the contents utilization control information.

An apparatus which performs high grade contents utilization and executes a high grade contents utilization process in accordance with extended control information in this manner calculates a hash value based on data included not only in the first block but also in the succeeding blocks beginning with the second block, and executes a process of comparing and collating the calculated hash value with the overall hash value. In contrast, another apparatus which does not perform high grade contents utilization and executes a contents utilization process in accordance only with the basic control information may execute hash value calculation based on information set in the first block 701 and execute comparison and collation between the calculated hash value and the first hash value set in the first block 701.

The storage configuration of contents utilization control information and the hash value setting configuration shown in FIG. 27 have the following three advantages.

(1) The generation and decryption process of and with a block key of 2,048 bytes of the top (first block) and the falsification verification by hash value collation make acquisition and verification of basic control information possible.

(2) Where the size of the extended control information is small, if also the extended control information is placed into 2,048 bytes of the top (first block), then the generation and decryption process of and with a block key of 2,048 bytes of the top (first block) and the falsification verification by hash value collation make acquisition and verification of basic control information possible.

(3) Where the size of the extended control information is large, the contents utilization control information can be placed using succeeding blocks beginning with the second block.

FIG. 29 is a view illustrating a syntax corresponding to the storage example of the contents utilization control information illustrated in FIG. 27.

Referring to FIG. 29, the syntax includes first block area data 721 formed from 2,048 bytes of the top and succeeding block area data 722 disposed following the first block area data 721 and having a size equal to an integral number of times 2,048 bytes.

In the first block area data 721, (Number_of_Primary_C-CI_loops) as information representative of the number of information blocks (loops) which form the contents utilization control information (reproduction/copy control information) described in the first block area: 16 bits and reserved (reserved) area: 112 bits are set as header part information. The data described hereinabove are the 16-byte data of the header part.

Further, as the first control information (CCI) area information, (CCI_and_other_info_type) as data type information of the contents utilization control information (reproduction/copy control information): 16 bits, (CCI_and_other_info_data_length) as data length information of the contents utilization control information (reproduction/copy control information): 16 bits, (CCI_and_other_info_data) as data value information of the contents utilization control information (reproduction/copy control information): (CCI_and_other_info_data_length×8) bits, and reserved (reserved) area: X bits are set.

Furthermore, (Hash_value_for_Primary_CCI) as the hash value calculated based on the first block configuration data described hereinabove: 160 bits is set.

Also the succeeding block area data 722 has a data configuration substantially similar to that of the first block area. In particular, a header formed from information representative of the number of loops and a reserved area, a contents utilization control information (reproduction/copy control information) including a data type, a data length and a data value, a reserved area, and an overall hash value (Hash_value_for_All_CCI): 160 bits are set.

The overall hash value (Hash_value_for_All_CCI): 160 bits is a hash value generated based on the overall data of the first block area data 721 and the data of the succeeding block area data 722 except the overall hash value.

Now, a recording example of a contents utilization control information file and a hash value setting example as falsification verification data different from those of the form of FIG. 27 are described with reference to FIG. 30.

In the recording example of the contents utilization control information file of FIG. 27, both of the basic control information and the extended control information are placed in the first block area. However, in the example shown in FIG. 30, the first block stores only the basic control information while the extended control information is all placed in the succeeding blocks beginning with the second block.

The recording configuration of a contents utilization control information file in the present recording example is described with reference to FIG. 30.

Figure 30:
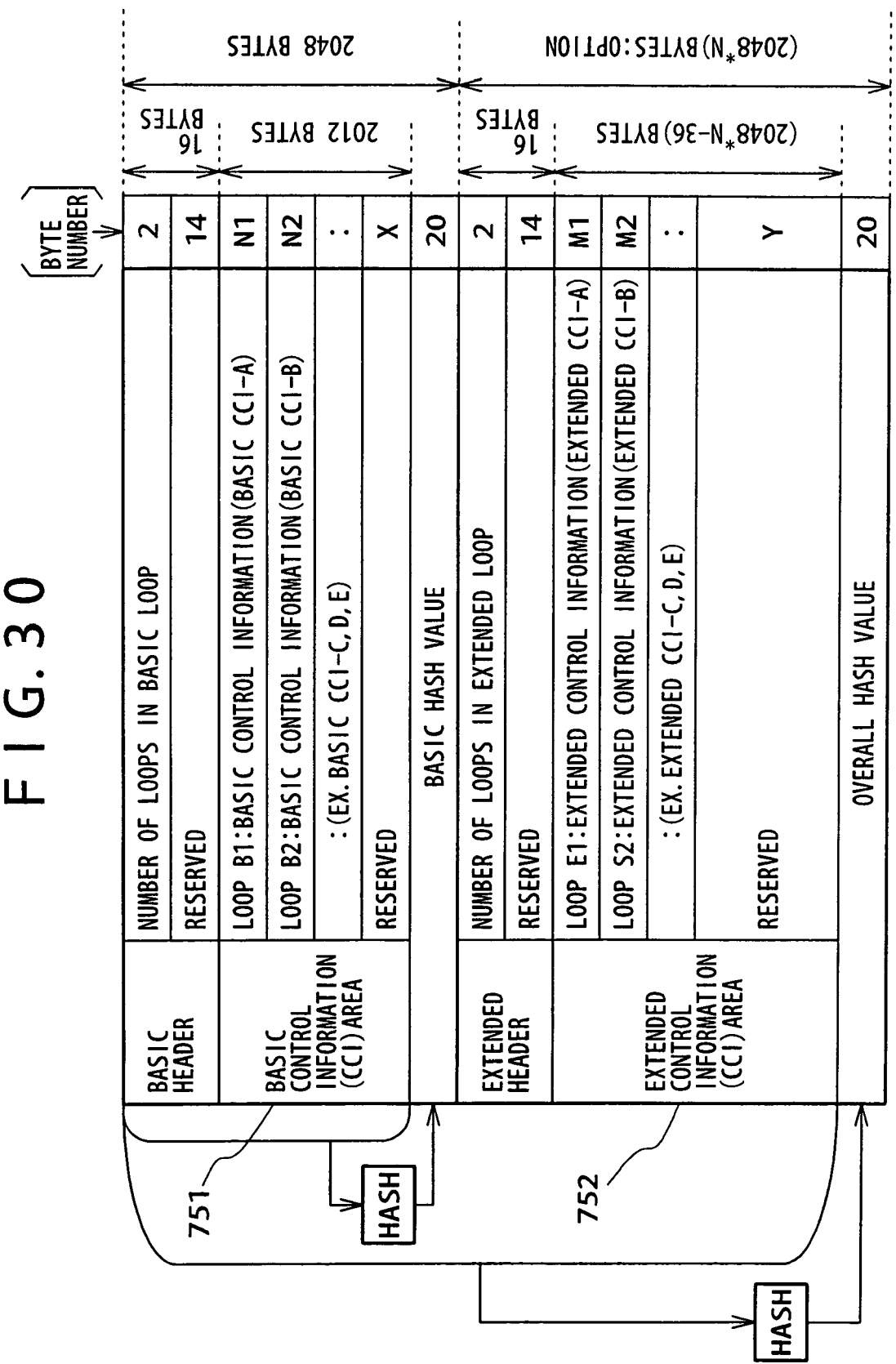
FIG. 30 is a view illustrating an example of recording of a contents utilization control information file and an example of setting of a hash value as falsification verification data.

The recording configuration shown in FIG. 30 includes a first block 751 as a user data area of 2,048 bytes which form block data in which contents utilization control information is placed, and a succeeding block 752. The succeeding block 752 includes one or more blocks. The succeeding block 752 includes user data of N blocks and has a data size of 2,048×N bytes.

The total byte number of the user data in the first block 751 is 2,048 bytes, and the data of (a. a basic header part: 16 bytes, (b. a basic control information (CCI) area: 2,012 bytes, and (c. a basic hash value: 20 bytes are stored in the first block 751.

In the a. basic header part (16 bytes), information regarding the loop number of contents utilization control information (reproduction/copy control information) included in the basic control information (CCI) area of the first block 751 and a reserved area are set. The data of the basic header part (16 bytes) is utilized as seed information for generation of a block key corresponding to the block.

In the b. basic control information (CCI) area (2,012 bytes) following the header part, only the basic control information (Basic CCI) from within the contents utilization control information (reproduction/copy control information) corresponding to each CPS unit is placed. The extended control information (Extended CCI) is not placed in the first block 751, but is all placed in the succeeding block 752. In the example shown in FIG. 30, totaling five information blocks of five pieces of basic control information (Basic CCI) A to E are placed in the first block 751.

As described hereinabove, the basic control information (Basic CCI) is data formed from basic minimum contents utilization control information (reproduction/copy control information). The basic control information (Basic CCI) is information which can be read by almost all information processing apparatus which execute a contents reproduction process in accordance with a predetermined contents reproduction processing program and requires execution of processing in accordance with control information.

In the first block 751, a basic hash value (20 bytes) generated based on the data of the basic header: 16 bytes and the basic control information (CCI) area: 2,012 bytes is placed. The hash value is data generated by applying a hash function such as a SHA-1 hash function to the basic header and the basic control information (CCI) data and is set as falsification verification data for the data mentioned. It is to be noted that the size of the hash value varies depending upon the hash function used, and in FIG. 30, an example is shown wherein a SHA-1 hash value of 160 bits (20 bytes) is used. However, it is possible to use a different hash function or a different hash value length. For the first hash value, a value obtained by inputting bit values from the top of the file to the bit immediately preceding to the area into which the hash value is to be recorded (where the SHA-1 is used, an area of 2,028 bytes from the top of the file) to the hash function is used.

An information processing apparatus which executes the contents utilization under the control only of the basic control information calculates a hash value based on then data of the basic header part and the data in the basic control information (CCI) area. Then, the information processing apparatus executes comparison of the calculated hash value with a hash value placed in the user data area of the block data. If the hash values coincide with each other, then the information processing apparatus determines that the data are not falsified, and continues the processing. However, if the hash values do not coincide with each other, then the information processing apparatus determines that the data suffer from falsification, and stops the contents reproduction, utilization process in accordance with the contents utilization control information.

An information processing apparatus which executes the contents utilization under the control only of the basic control information need not execute such processes as information reading of the second and succeeding blocks, hash calculation and so forth. Therefore, efficient processing can be anticipated.

The succeeding block 752 shown in FIG. 30 is user data of N blocks and is formed from data of 2,048×N bytes.

The following data are placed in the user data of the succeeding block 752:

a. an extended header part: 16 bytes;

b. an extended control information (CCI) area: an arbitrary number of bytes; and c. an overall hash value: 20 bytes.

The a. extended header part: 16 bytes includes 16 bytes of the top of the user data of the second block following the first block 751. In this area, information regarding the number of loops of the contents utilization control information (reproduction/copy control information) included in the extended control information (CCI) area and a reserved area are set. The data of the extended header part (16 bytes) is utilized as seed information for generation of a block key corresponding to the second block.

The b. extended control information (CCI) area: an arbitrary number of bytes is set as an area for placing a number of pieces of contents utilization control information (reproduction/copy control information) within a range which does not exceed (2,048×N−(16+20)) bytes given as the difference the size of the header part and the data part of the overall hash from the data size (2,048×N) of the succeeding block 752. In the succeeding block 752, only the extended control information except the basic control information placed in the first block 751 is placed. In the example shown in FIG. 30, a total of five information blocks of extended control information (Extended CCI) A to E are placed.

It is to be noted that, where a number of blocks are used for the succeeding block 752 to store the extended control information, 16-byte data of the top of the user data of each block is used as a seed area as block key generation information of the block. In the seed area, either configuration data of the contents utilization control information (reproduction/copy control information) is placed, or information similar to the extended header at the top of the second block is placed, or else dummy data is placed.

In the overall hash value: 20 bytes, an overall hash value (20 bytes) generated based on the overall data of the first block 751 and, all data of the extended header part: 16 bytes and the extended control information (CCI) area: an arbitrary number of bytes of the succeeding block 752 is placed. The overall hash value is data generated applying a hash function such as a SHA-1 hash function to the overall data of the first block 751, the extended header of the succeeding block 752 and the overall data of the extended control information (CCI). The overall hash value is thus used as falsification verification data for the overall data of the first block 751, the extended header of the succeeding block 752 and the overall data of the extended control information (CCI). The size of the hash value varies depending upon the hash function used, and in FIG. 30, an example is shown wherein a SHA-1 hash value of 160 bits (20 bytes) is used. However, it is possible to use a different hash function or a different hash value length.

An information processing apparatus which reads the contents utilization control information and executes the contents utilization in accordance with the utilization control information and, besides, executes a high grade contents utilization process in accordance with extended control information does not perform hash value verification of the first block but executes data falsification verification based on the overall hash value. If it is determined that the data are not falsified, then the processing is continued and the contents is utilized. However, if it is determined that the data suffer from falsification, then the contents reproduction, utilization process in accordance with the contents utilization control information is stopped.

In this manner, according to the configuration of the present embodiment, an apparatus which executes utilization of contents in accordance only with the basic control information may execute hash verification and decryption based only on the data in the first block 751, and a decryption process, hash calculation and verification for the succeeding block 752 can be eliminated. Consequently, efficient processing can be anticipated.

FIG. 31 is a view illustrating a syntax corresponding to the storage example of the contents utilization control information illustrated in FIG. 30.

Referring to FIG. 31, the syntax includes first block area data 771 formed from 2,048 bytes of the top and succeeding block area data 772 disposed following the first block area data 771 and having a size equal to an integral number of times 2,048 bytes.

In the first block area data 771, (Number_of_Basic_CCI_loops) as information representative of the number of information blocks (loops) which form the contents utilization control information (reproduction/copy control information) described in the basic control information (CCI) area and reserved (reserved) area: 112 bits are set as header part information. The data described hereinabove are the 16-byte data of the header part.

Further, as the basic control information (CCI) area information, (CCI_and_other_info_type) as data type information of the contents utilization control information (reproduction/copy control information): 16 bits, (CCI_and_other_info_data_length) as data length information of the contents utilization control information (reproduction/copy control information): 16 bits, (CCI_and_other_info_data) as data value information of the contents utilization control information (reproduction/copy control information): (CCI_and_other_info_data_length×8) bits, and reserved (reserved) area: X bits are set.

Furthermore, (Hash_value_for_Basic_CCI) as the hash value calculated based on the first block configuration data described hereinabove: 160 bits is set.

Also, the succeeding block area data 772 has a data configuration substantially similar to that of the first block area. In particular, a header formed from information representative of the number of loops and a reserved area, a contents utilization control information (reproduction/copy control information) section including a data type, a data length and a data value, a reserved area, and an overall hash value (Hash_value_for_All_CCI): 160 bits are set.

The overall hash value (Hash_value_for_All_CCI): 160 bits is a hash value generated based on the overall data of the first block area data 771 and the data of the succeeding block area data 772 except the overall hash value.

As described hereinabove, the contents utilization control information (reproduction/copy control information) includes basic control information (Basic CCI) and extended control information (Extended CCI). The basic control information (Basic CCI) is data formed from basic minimum contents utilization control information (reproduction/copy control information). The basic control information (Basic CCI) is information which can be read by almost all information processing apparatus which execute a contents reproduction process in accordance with a predetermined contents reproduction processing program. The basic control information (Basic CCI) requires the information processing apparatus to execute processing in accordance with the control information. On the other hand, the extended control information (Extended CCI) is data formed from extended contents utilization control information (reproduction/copy control information) for being applied to an information processing apparatus which has a processing function of a high-grade contents utilization process such as network transfer or streaming transmission/reception of data.

Figure 33:
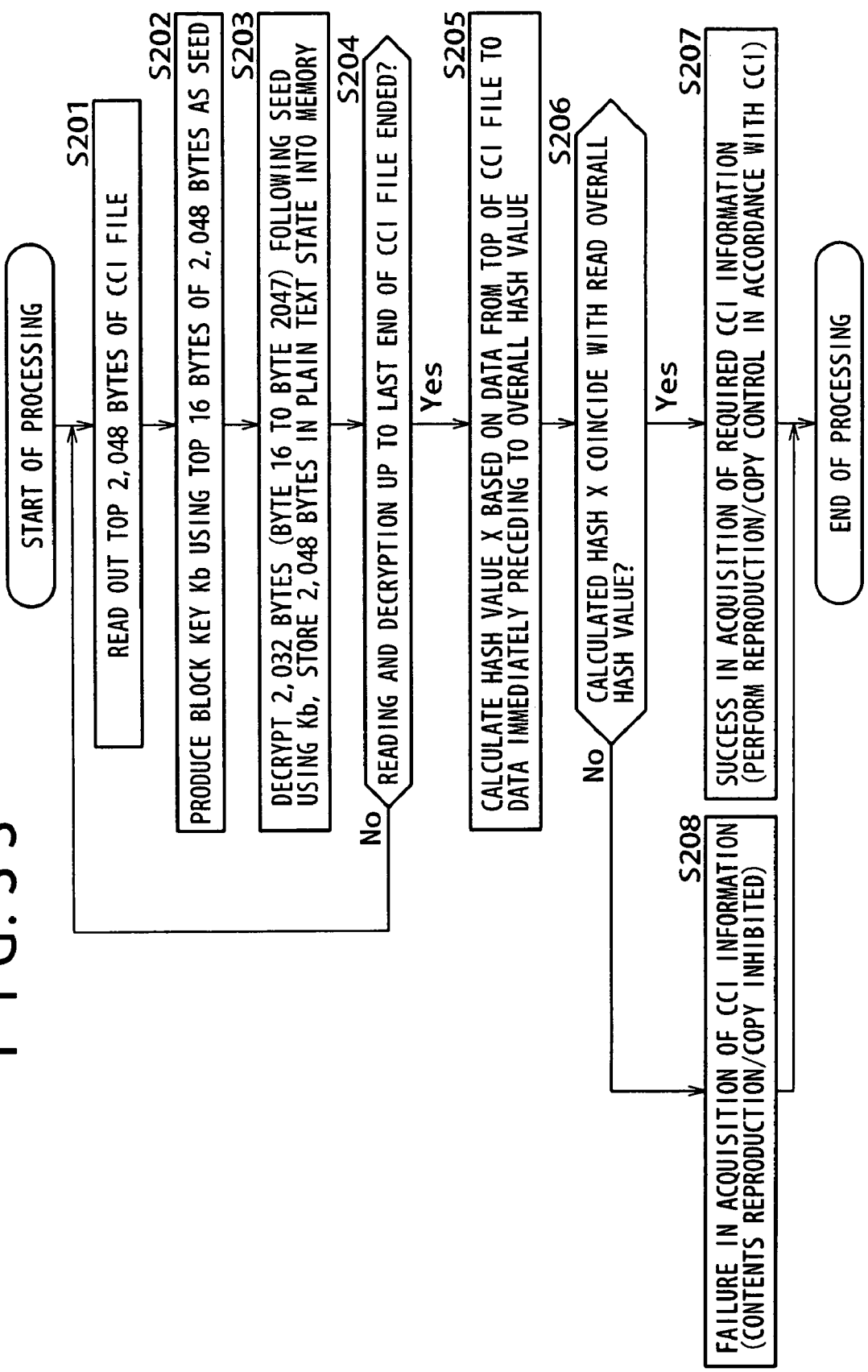
FIG. 33 is a flow chart illustrating a processing sequence of another information processing apparatus which reads both basic control information and extended control information and executes contents utilization in accordance with the basic control information and the extended control information.

Processing sequences of information processing apparatus which read such contents utilization control information (reproduction/copy control information) of different categories as described above from an information recording medium and execute processing in accordance with the read control information are described with reference to FIGS. 32 and 33.

FIG. 32 is a processing sequence of an information processing apparatus which reads only the basic control information and executes contents utilization in accordance with the basic control information.

At step S101, the information processing apparatus selects a contents control information file (CCI file) corresponding to a certain particular CPS unit and reads out 2,048 bytes of the top of the data area corresponding to the first block of the file.

At step S102, the information processing apparatus acquires 16 bytes of the top of the 2,048-byte data of the first block read out as described above and uses the 16 bytes as a seed to execute a key generation process using an encryption process with a CPS unit key, for example, an AES encryption process, to generate a block key Kb. The CPS unit key used here is a CPS unit key corresponding to a contents management unit (CPS unit) coordinated with the contents control information file (CCI file) from which the reading out has been executed.

At step S103, the information processing apparatus applies the generated block key Kb to execute a decryption process of the block encrypted data area of the 2,048-byte data of the first block read out at step S101 except the 16 bytes at the top of the data area. For example, the information processing apparatus executes a decryption process based on an AES cryptographic algorithm.

At step S104, the information processing apparatus calculates a hash value X based on the block data of 2,028 bytes obtained as a result of the decryption except the 20 bytes of the hash part data. For example, a SHA-1 algorithm is used as the algorithm for the calculation of the hash value.

At step S105, the information processing apparatus executes a comparison collation process between the calculated hash value and a has value written in the block data (20-byte data at the 2,028th to 2,047th bytes of the block data).

If the calculated hash value and the read hash value do not coincide with each other, then the processing advances to step S107, at which the information processing apparatus determines that the data suffer from falsification and stops the contents utilization in accordance with the contents control information.

If the calculated hash value and the read hash value coincide with each other, then the processing advances to step S106, at which the information processing apparatus determines that the data are free from falsification and acquires the contents control information to execute contents utilization in accordance with the acquired contents control information. The control information in this instance is the basic control information, and the information processing apparatus executes a contents utilization process in accordance with the basic control information.

Now, a processing sequence of an information processing apparatus which reads both of the basic control information and the extended control information and executes contents utilization in accordance with the basic control information and the extended control information is described with reference to FIG. 33.

At step S201, the information processing apparatus selects a contents control information file (CCI file) corresponding to a certain particular CPS unit and reads out 2,048 bytes at the top of the data area corresponding to the first block of the file.

At step S202, the information processing apparatus acquires 16 bytes of the top of the 2,048-byte data of the first block read out as described above and uses the 16 bytes as a seed to execute a key generation process using an encryption process with a CPS unit key, for example, an AES encryption process, to generate a block key Kb. The CPS unit key used here is a CPS unit key corresponding to a contents management unit (CPS unit) coordinated with the contents control information file (CCI file) from which the reading out has been executed.

At step S203, the information processing apparatus applies the generated block key Kb to execute a decryption process of the data of the block encrypted data area of the 2,048-byte data of the first block read out at step S201 except the 16 bytes at the top of the data area. For example, the information processing apparatus executes a decryption process based on an AES cryptographic algorithm.

At step S204, the information processing apparatus discriminates whether or not reading out and decryption of all block data which form the contents control information file (CCI file) are ended. If such reading out and decryption are not ended as yet, then the processing returns to step S201 to repetitively execute similar processes to those described above for a succeeding block, that is, acquisition of a seed, generation of a block key Kb and a decryption process.

If it is discriminated at step S204 that the reading out and decryption of all block data which form the contents control information file (CCI file) is ended, then the processing advances to step S205.

At step S205, the information processing apparatus calculates a hash value X based on all block data, which form the contents control information file (CCI file) obtained as a result of the decryption, except the 20 bytes of the overall hash part data. For example, a SHA-1 algorithm is used as the algorithm for the calculation of the hash value.

At step S206, the information processing apparatus executes a comparison collation process between the calculated hash value and the overall hash value read from the contents control information file (CCI file).

If the calculated hash value and the read hash value do not coincide with each other, then the processing advances to step S208, at which the information processing apparatus determines that the data suffer from falsification and stops the contents utilization in accordance with the contents control information.

If the calculated hash value and the read hash value coincide with each other, then the processing advances to step S207, at which the information processing apparatus determines that the data are free from falsification and acquires the contents control information to execute contents utilization in accordance with the acquired contents control information. The control information in this instance is the basic control information and the extended control information, and the information processing apparatus executes a contents utilization process in accordance with the control information.

10. Example of a Configuration of an Information Processing Apparatus

Now, an example of a configuration of an information processing apparatus which performs a recording process and a reproduction process of main contents and sub-contents which have the contents management unit (CPS unit) configuration described hereinabove is described with reference to FIG. 34.

The information processing apparatus 800 includes a drive 890 for driving an information recording medium 891 and for inputting a data recording signal and outputting a data reproduction signal, and a CPU 870 for executing a data process in accordance with various programs. The information processing apparatus 800 further includes a ROM 860 and a memory 880 serving as storage areas for programs, parameters and the like, an input/output I/F 810 for inputting and outputting a digital signal, and another input/output I/F 840 including an A/D, D/A converter 841 for inputting and outputting an analog signal. The information processing apparatus 800 further includes an MPEG codec 830 for executing encoding and decoding processes of MPEG data, a TS-PS processing section 820 for executing TS (Transport Stream) and PS (Program Steam) processes, and a cryptography processing section 850 for executing various cryptographic processes. The blocks mentioned are connected to a bus 801.

First, operation of the information processing apparatus 800 upon data recording is described. The data to be recorded may have any of two different forms including a digital signal input and an analog signal input.

Where the input signal is a digital signal, it is inputted from the input/output I/F 810 and stored on the information recording medium 891 after it undergoes, as occasion demands, a suitable encryption process by the cryptography processing section 850. Further, where the inputted digital signal is stored after the data format thereof is converted, the conversion into a data format for storage is performed for the inputted digital signal by the MPEG codec 830, CPU 870 and TS-PS processing section 820. Then, the digital signal of the converted data format undergoes a suitable encryption process by the cryptography processing section 850 and then is stored on the information recording medium 891.

Where the input signal is an analog signal, it is inputted from the input/output I/F 840 and converted into a digital signal by the A/D, D/A converter 841, whereafter it is converted into a signal to be used upon recording by the MPEG codec 830. Thereafter, the signal is converted into AV multiplexed data having the format of recording data by the TS-PS processing section 820. Then, as occasion demands, the AV multiplexed data undergo a suitable encryption process by the cryptography processing section 850, and the encrypted data are recorded on the information recording medium 891.

When recording of main contents formed from AV stream data configured, for example, from MPEG-TS data is to be performed, the main contents are sectioned into contents management units (CPS units) and encrypted using a unit key by the cryptography processing section 850. Then, the encrypted main contents are recorded on the information recording medium 891 by the drive 890.

Also, the sub-contents are sectioned into contents management units (CPS units) corresponding to data groups and encrypted using a unit key by the cryptography processing section 850. Then, the encrypted sub-contents are recorded on the information recording medium 891 by the drive 890.

It is to be noted that various kinds of management information described hereinabove, that is, the unit configuration and key management table, state management table and contents reproduction and copy control information management table, are also suitably produced or updated, and are stored, as occasion demands, as falsification verification data, or further as encrypted data, on the information recording medium 891.

Now, a process of the information processing apparatus 800 when it performs data reproduction from an information recording medium is described. For example, when the information processing apparatus 800 performs reproduction of AV stream data in the form of MPEG-TS data as main contents, if data read out from the information recording medium 891 by the drive 890 are identified as a contents management unit, then an acquisition process of a unit key corresponding to the contents management unit is executed. Then, the cryptography processing section 850 decrypts the data read out from the information recording medium 891 with the acquired unit key, and the TS-PS processing section 820 demultiplexes the decrypted data into various data such as Video data, Audio data and caption data.

The digital data decoded by the MPEG codec 830 are converted into an analog signal by the A/D, D/A converter 841 in the input/output I/F 840 and outputted as such. However, when a digital signal is to be outputted, the MPEG-TS data decrypted by the cryptography processing section 850 are outputted as digital data through the input/output I/F 810. The outputting in this instance is performed, for example, to a digital interface such as an IEEE 1394 or Ethernet cable or a wireless LAN. It is to be noted that, if it is intended to cope with a network connection function, then the input/output I/F 810 has a function for network connection. On the other hand, where the reproduction apparatus converts data into data of a format which can be received by an apparatus of an output destination and outputs the data of the converted format, the MPEG codec 830 applies rate conversion, and codec conversion processes for Video, Audio, caption data and the like demultiplexed once by the TS-PS processing section 820.

Then, the TS-PS processing section 820 multiplexes the resulting data from the MPEG codec 830 back into MPEG-TS or MPEG-PS data, and the multiplexed data are outputted from the input/output I/F 810. It is otherwise possible to use the CPU 870 to convert the data into a codec, multiplexed file other than an MPEG file and output the resulting file from the input/output I/F 810 for digital signals.

Also, in the case of sub-contents, if the data read out from the information recording medium 891 are identified as a contents management unit, then an acquisition process of a unit key corresponding to the contents management unit is executed. Then, the data are decrypted by the cryptography processing section 850 using the acquired unit key, and a reproduction process is executed for the decrypted data.

It is to be noted that, where various kinds of management information described hereinabove, that is, the unit configuration and key management table, state management table and contents reproduction and copy control information management table, are stored on the information recording medium 891, they are stored into the memory 880 after they are read out from the information recording medium 891. Key information for each contents management unit (CPS unit) necessary to perform reproduction can be acquired from the data stored in the memory 880. It is to be noted that, where the management tables are not stored on the information recording medium, a unit key can be acquired through a predetermined procedure from the server connected to the network.

As described hereinabove, a contents management unit (CPS unit) is set in a coordinated relationship with configuration data of main contents or sub-contents, and one unit key is coordinated with one contents management unit (CPS unit). An administrative reproduction control program for administratively executing reproduction control in contents reproduction detects occurrence of changeover of the contents management unit (CPS unit) and executes changeover of the key to be used after the changeover. If no key is acquired, the program executes process for displaying a message prompting acquisition of the key.

It should be noted that when the content utilization control information, that is, the content reproduction and copy control information is encrypted and set as falsification verification data, upon utilization of the contents, the information processing apparatus acquires the encrypted contents utilization control information corresponding to a contents management unit stored on the information recording medium. Then, the information processing apparatus executes a decryption process using a unit key set corresponding to the contents management unit and a falsification verification process. Then, under the condition that the contents are free from falsification, the information processing apparatus executes a contents utilization process based on the contents utilization control information.

Where the recording and reproduction apparatus acquires necessary information through a network outside the apparatus, the acquired data are stored into the memory 880 in the recording and reproduction apparatus. The data to be recorded may include key information necessary for contents reproduction, data of a caption, sound (Audio) information, a still picture and so forth to be reproduced together upon contents reproduction, contents management information, an operation rule (Usage Rule) for a reproduction apparatus corresponding to the contents management information and so forth.

It is to be noted that a program for executing a reproduction process and a recording process is stored in the ROM 860, and during execution processing of the program, the memory 880 is used for storage of parameters and data and as a working area. It is to be noted that, while FIG. 34 shows an apparatus configuration by which data recording and reproduction can be performed, it is otherwise possible to configure an apparatus which only has the reproduction function or the recording function, and the present invention can be applied also to those apparatus.

It is to be noted that the series of processes described hereinabove can be executed by hardware, software or a composite configuration of hardware and software. Where the series of processes is executed by software, a program which describes a processing sequence is installed into a memory in a computer incorporated in hardware for exclusive use so that the computer may execute the program or into a general purpose computer which can execute various processes so that the computer may execute the program.

For example, the program may be recorded on a recording medium such as a hard disc or ROM (Read Only Memory) in advance. The program may be temporarily or permanently stored (recorded) on a removable recording medium such as a flexible disc, a CD-ROM (Compact Disc-Read Only Memory), an MO (Magneto-Optical) disc, a DVD (Digital Versatile Disc), a magnetic disc or a semiconductor memory. Such a program stored on a removable recording medium as just described can be provided as package software.

It is to be noted that the program may not only be installed from such a removable recording medium into a computer but also be transferred from a download site by radio communication into a computer or transferred by wire communication through a LAN (Local Area Network) or the Internet to a computer. The computer thus can receive the program transferred in this manner and install the program into a recording medium built therein such as a hard disc.

It is to be noted that the processes disclosed in the present specification may be executed in a time series in the order as described or may be executed parallelly or individually depending upon the processing capacity of an apparatus used for the processes or as occasion demands. Further, in the present specification, the term "system" is used to represent a logical set apparatus composed of a number of apparatus, which may be included in the same housing or may be provided discretely.

Although the present invention has been described with reference to specific embodiments, those of skill in the art will recognize that changes may be made thereto without departing from the spirit and scope of the present invention as set forth in the hereafter appended claims.

The invention claimed is:

1. An information recording medium for allowing utilization management that differs among different contents, comprising:
   a recording data section storing recording data, wherein main contents which have a data format which complies with a particular audio visual format and sub-contents which have a data format which does not comply with the audio visual format are stored as the recording data in the recording data section;
   a contents management section storing contents management units, wherein configuration data of the main contents and the sub-contents is set as the contents management units in the contents management section; and
   an encrypted data section storing encrypted data, wherein data included in the contents management units is stored as the encrypted data in the encrypted data section encrypted with individual unit keys individually corresponding to the contents management units.

2. An information recording medium according to claim 1, wherein the audio visual format is a Blu-ray disc ROM format, and the main contents are recording data having a layered data configuration complying with the Blu-ray disc ROM format.

3. An information recording medium according to claim 1, wherein the sub-contents are a set of data groups each including at least one data file and the contents management units are set in a unit of a data group, and the information recording medium stores path identification information of the configuration files of the data groups corresponding to the contents management units as data group management information.

4. An information recording medium according to claim 1, wherein the sub-contents are a set of data groups each including at least one data file and the contents management units are set in a unit of a data group, and the information recording medium has a directory configuration wherein the data groups are set as individual folders.

5. An information recording medium according to claim 4, wherein the information recording medium stores identification information of the individual folders of the data groups corresponding to the contents management units as data group management information.

6. An information recording medium according to claim 1, wherein the information recording medium stores contents utilization control information corresponding to the contents management units as data individually encrypted with unit keys corresponding to the contents management units.

7. An information recording medium according to claim 1, wherein the information recording medium stores contents utilization control information corresponding to the contents management units as data configurations each having a falsification preventing processing configuration.

8. An information recording medium according to claim 1, wherein the information recording medium is configured such that data which coordinates contents utilization control information corresponding to each of the contents management units and a hash value based on the contents utilization control information with each other is stored in a form encrypted with a unit key corresponding to the contents management unit.

9. An information recording medium according to claim 1, wherein the information recording medium is configured such that repeated data of contents utilization control information corresponding to each of the contents management units is stored in a form encrypted with a unit key corresponding to the contents management unit.

10. An information recording medium according to claim 1, wherein the information recording medium is configured such that the information recording medium stores first playback contents as contents to be reproduced based on loading of the information recording medium into a drive and sets the first playback contents as the contents management units, and the data included in the contents management units is stored as encrypted data encrypted with individual unit keys coordinated with the individual contents management units.

11. An information recording medium according to claim 1, wherein the information recording medium is configured such that the information recording medium stores top menu contents as contents to be reproduced based on execution of a menu displaying function and sets the top menu contents as the contents management units, and the data included in the contents management units are stored as encrypted data encrypted with individual unit keys coordinated with the individual contents management units.

12. An information recording medium according to claim 1, wherein the information recording medium further stores coordination information between the contents management units and indices and a data file which defines random number information used for generation of a unit key.

13. An information processing apparatus for recording contents and allowing utilization management which differs among different contents wherein the information processing apparatus includes a drive for driving an information recording medium and a processor adapted to comprise:
    a contents management unit setting section for setting configuration data of main contents which have a data format which complies with a particular audio visual format and sub-contents which have data format which does not comply with the particular audio visual format as contents management units; and
    a data storage section for storing the data included in the contents management units as encrypted data encrypted with individual unit keys individually corresponding to the contents management units on an information recording medium.

14. An information processing apparatus according to claim 13, wherein the audio visual format is a Blu-ray disc ROM format, and the data storage section stores the main contents as recording data having a layered data configuration complying with the Blu-ray disc ROM format on the information recording medium.

15. An information processing apparatus according to claim 13, wherein the contents management unit setting section sets the contents management unit in a coordinated relationship with a set of data groups each including at least one data file included in the sub-contents, and the data storage section stores path identification information of the configuration files of the data groups corresponding to the contents management units as data group management information on the information recording medium.

16. An information processing apparatus according to claim 13, wherein the contents management unit setting section sets the contents management unit in a coordinated relationship with a set of data groups each including at least one data file included in the sub-contents, and the data storage section stores the one or more data files included in the sub-contents based on a directory configuration wherein the data groups are set as individual folders.

17. An information processing apparatus according to claim 16, wherein the data storage section stores identification information of the individual folders of the data groups corresponding to the contents management units as data group management information on the information recording medium.

18. An information processing apparatus according to claim 13, wherein the data storage section stores contents utilization control information corresponding to the contents management units as data individually encrypted with unit keys corresponding to the contents management units on the information recording medium.

19. An information processing apparatus according to claim 13, wherein the data storage section stores contents utilization control information corresponding to the contents management units as data configurations each having a falsification preventing processing configuration on the information recording medium.

20. An information processing apparatus according to claim 13, wherein the data storage section stores data which coordinates contents utilization control information corresponding to each of the contents management units and a hash value based on the contents utilization control information with each other in a form encrypted with a unit key corresponding to the contents management unit on the information recording medium.

21. An information processing apparatus according to claim 13, wherein the data storage section stores repeated data of contents utilization control information corresponding to each of the contents management units in a form encrypted with a unit key corresponding to the contents management unit on the information recording medium.

22. An information processing apparatus according to claim 13, wherein the data storage section sets, as the contents management units, first playback contents as contents to be reproduced based on loading of the information recording medium into a drive and stores the data included in the contents management units as encrypted data encrypted with individual unit keys coordinated with the individual contents management units on the information recording medium.

23. An information processing apparatus according to claim 13, wherein the data storage section sets, as the contents management units, top menu contents as contents to be reproduced based on execution of a menu displaying function and stores the data included in the contents management units as encrypted data encrypted with individual unit keys coordinated with the individual contents management units on the information recording medium.

24. An information processing apparatus according to claim 13, wherein the data storage section further stores coordination information between the contents management units and indices and a data file which defines random number information used for generation of a unit key on the information recording medium.

25. An information processing apparatus for executing a reproduction process of contents of a utilization management object wherein the information processing apparatus includes a drive for driving an information recording medium and a processor adapted to comprise:
    an acquisition section for acquiring encrypted contents utilization control information corresponding to contents management units stored on an information recording medium; and
    an execution section for executing a decryption process using a unit key set corresponding to any of the contents management units and a falsification verification process and executing a contents utilization process based on the contents utilization control information under a condition that the contents are free from falsification, wherein the contents are utilized.

26. A computer executing an information processing method for recording contents and allowing utilization management which differs among different contents, comprising:
    a processor setting configuration data of main contents which have a data format which complies with a particular audio visual format and sub-contents which have a data format which does not comply with the particular audio visual format as contents management units; and
    the processor storing the data included in the contents management units as encrypted data encrypted with individual unit keys individually corresponding to the contents management units on an information recording medium.

27. An information processing method according to claim 26, wherein the audio visual format is a Blu-ray disc ROM format, and the storing step includes storing the main contents as recording data having a layered data configuration complying with the Blu-ray disc ROM format on the information recording medium.

28. An information processing method according to claim 26, further comprising setting the contents management unit in a coordinated relationship with a set of data groups each including at least one data file included in the sub-contents, and storing path identification information of the configuration files of the data groups corresponding to the contents management units as data group management information on the information recording medium.

29. An information processing method according to claim 26, further comprising setting the contents management unit in a coordinated relationship with a set of data groups each including at least one data file included in the sub-contents, and storing the at least one data file included in the sub-contents based on a directory configuration wherein the data groups are set as individual folders.

30. An information processing method according to claim 29, further comprising storing identification information of the individual folders of the data groups corresponding to the contents management units as data group management information on the information recording medium.

31. An information processing method according to claim 26, further comprising storing contents utilization control information corresponding to the contents management units as data individually encrypted with unit keys corresponding to the contents management units on the information recording medium.

32. An information processing method according to claim 26, further comprising storing contents utilization control information corresponding to the contents management units as data configurations each having a falsification preventing processing configuration on the information recording medium.

33. An information processing method according to claim 26, further comprising storing data which coordinates contents utilization control information corresponding to each of the contents management units and a hash value based on the contents utilization control information with each other in a form encrypted with a unit key corresponding to the contents management unit on the information recording medium.

34. An information processing method according to claim 26, further comprising storing repeated data of contents utilization control information corresponding to each of the contents management units in a form encrypted with a unit key corresponding to the contents management unit on the information recording medium.

35. An information processing method according to claim 26, further comprising setting, as the contents management units, first playback contents as contents to be reproduced based on loading of the information recording medium into a drive and storing the data included in the contents management units as encrypted data encrypted with individual unit keys coordinated with the individual contents management units on the information recording medium.

36. An information processing method according to claim 26, further comprising setting, as the contents management units, top menu contents as contents to be reproduced based on execution of a menu displaying function and storing the data included in the contents management units as encrypted data encrypted with individual unit keys coordinated with the individual contents management units on the information recording medium.

37. An information processing method according to claim 26, further comprising storing coordination information between the contents management units and indices and a data file which defines random number information used for generation of a unit key on the information recording medium.

38. An computer executing an information processing method for executing a reproduction process of contents of a utilization management object, comprising:

a receiver acquiring encrypted contents utilization control information corresponding to contents management units stored on an information recording medium;

a processor executing a decryption process using a unit key set corresponding to any of the contents management units and a falsification verification process; and the processor executing a contents utilization process based on the contents utilization control information under a condition that the contents are free from falsification, wherein the contents are utilized.

39. A computer executing a computer program for recording contents and allowing utilization management which differs among different contents, comprising:

a processor performing a contents management unit setting step of setting configuration data of main contents which have a data format which complies with a particular audio visual format and sub-contents which have a data format which does not comply with the particular audio visual format as contents management units; and the processor performing a data storage step of storing the data included in the contents management units as encrypted data encrypted with individual unit keys individually corresponding to the contents management units on an information recording medium.

40. A computer executing a computer program for executing a reproduction process of contents of a utilization management object, comprising:

a receiver performing an acquisition step of acquiring encrypted contents utilization control information corresponding to contents management units stored on an information recording medium;

a processor performing a falsification verification process execution step of executing a decryption process using a unit key set corresponding to any of the contents management units and a falsification verification process; and the processor performing a contents utilization process execution step of executing a contents utilization process based on the contents utilization control information under a condition that the contents are free from falsification, wherein the contents are utilized.

41. A computer-readable medium encoded with a program for allowing utilization management that differs among different contents comprising:

a content management section comprising one or more pieces of contents each sectioned into contents management units and including encrypted data encrypted with a unit key set corresponding to each of the contents management units and contents utilization control information set corresponding to each of the contents management units; and a contents utilization section comprising contents utilization control information being configured such that the contents utilization control information is stored as encrypted data encrypted using the unit key set corresponding to each of the contents management units and has falsification verification data added thereto.

42. An information recording medium according to claim 41, wherein the contents utilization control information is configured such that the contents utilization control information is encrypted in a unit of a block having a predetermined amount of data and is stored as encrypted block data encrypted using a block seed which is configuration data of each of the blocks and a block key generated by a cryptographic process using the unit key.

43. An information recording medium according to claim 42, wherein the block seed is block configuration data which does not configure the contents utilization control information.

44. An information recording medium according to claim 42, wherein the contents utilization control information is data including control information of different categories of basic control information and extended control information and is configured such that the basic control information is placed in one block and falsification verification data for the data of the block in which the basic control information is placed is placed in the same block.

45. An information recording medium according to claim 42, wherein the contents utilization control information is data including control information of different categories of basic control information and extended control information and is configured such that the basic control information is placed in one block and falsification verification data for the data of the block in which the basic control information is placed is placed in the same block, and second falsification verification data for the data which include all data of the basic control information and the extended control information is placed.

46. An information processing apparatus for executing a reproduction process of contents of a utilization management object wherein the information processing apparatus includes a drive for driving an information recording medium and a processor adapted to comprise,
a data storage section storing an acquisition section for acquiring contents utilization control information corresponding to a contents management unit stored on an information recording medium; and
the data storage section storing an execution section for using a unit key set corresponding to the contents management unit to execute a decryption process in a unit of a block of block data which forms the contents utilization control information and has a predetermined data amount and a falsification verification process based on falsification verification data included in the block data and executing a contents utilization process based on the decrypted contents utilization control information under a condition that it is confirmed that the data are free from falsification, wherein the contents are utilized.

47. An information processing apparatus according to claim 46, wherein the acquisition section further acquires a block seed from each of the blocks of the contents utilization control information, and the execution section executes a decryption process in a unit of a block based on the block seed and a block key produced by a cryptographic process using the unit key.

48. An information processing apparatus according to claim 46, wherein the execution section selects, from among data of a plurality of blocks which form the contents utilization control information, the data of only one block including basic control information, executes a decryption process for the selected block in which the basic control information is placed and a falsification verification process based on falsification verification data included in the block data, and executes a contents utilization process based on the decrypted contents utilization control information under a condition that it is confirmed that the data are free from falsification.

49. An information processing apparatus according to claim 46, wherein the execution section selects, from among data of a plurality of blocks which form the contents utilization control information, the data of a plurality of blocks including basic control information and extended control information, executes a decryption process for the selected plurality of blocks in a unit of a block, executes a falsification verification process for the data based on falsification verification data included in the data of the plurality of blocks, and executes a contents utilization process based on the decrypted contents utilization control information under a condition that it is confirmed that the data are free from falsification.

50. An information processing apparatus for executing a data recording process on an information recording medium for allowing utilization management that differs among different contents, wherein the information processing apparatus includes a drive for driving an information recording medium and a processor adapted to comprise:
a data storing unit storing a falsification verification data production section for producing falsification verification data for contents utilization control information corresponding to each of contents management units set in order to perform individual utilization management control;
the data storing unit storing an encryption section for executing an encryption process using a unit key set corresponding to each of the contents management units to produce encrypted data; and
the data storing unit storing a production and recording section for executing a production and recording process for the encrypted contents utilization control information including the falsification verification data.

51. An information processing apparatus according to claim 50, further comprising:
a block key generation section for sectioning the contents utilization control information into blocks having a predetermined data amount and generating a block key through a cryptographic process using a block seed extracted from the configuration data of each of the blocks and the unit key; and
a block encrypted data generation and recording section for generating block encrypted data with the block key and recording the block encrypted data on an information recording medium.

52. An information processing apparatus according to claim 51, wherein the block seed is extracted from block configuration data which does not configure the contents utilization control information.

53. An information processing apparatus according to claim 51, further comprising:
a sectioning section for sectioning the contents utilization control information into different categories of basic control information and extended control information;
a placing section for placing the basic control information into one block;
a falsification verification data production section for producing falsification verification data for the data of the block in which the basic control information is placed; and
a placing and recording section for placing the falsification verification data into the same block and recording the data of the block.

54. An information processing apparatus according to claim 51, further comprising:
a sectioning section for sectioning the contents utilization control information into different categories of basic control information and extended control information;
a placing section for placing the basic control information into one block;
a falsification verification data production section for producing falsification verification data for the data of the block in which the basic control information is placed;

a placing and recording section for placing the falsification verification data into the same block and recording the data of the block; and a second falsification verification data production and recording section for producing second falsification verification data for the data which include all data of the basic control information and the extended control information and recording the second falsification verification data.

55. A computer executing an information processing method for executing a reproduction process of contents of a utilization management object, comprising:

a receiver acquiring contents utilization control information corresponding to a contents management unit stored on an information recording medium;

a processor using a unit key set corresponding to the contents management unit to execute a decryption process in a unit of a block of block data which forms the contents utilization control information and has a predetermined data amount;

the processor executing a falsification verification process based on falsification verification data included in the block data; and the processor executing a contents utilization process based on the decrypted contents utilization control information under a condition that it is confirmed that the data are free from falsification, wherein the contents are utilized.

56. An information processing method according to claim 55, wherein the decryption process includes acquiring a block seed from each of the blocks of the contents utilization control information and executing a decryption process in a unit of a block based on the block seed and a block key produced by a cryptographic process using the unit key.

57. An information processing method according to claim 55, further comprising:

selecting, from among data of a plurality of blocks which form the contents utilization control information, the data of only one block including basic control information; and executing a decryption process for the selected block in which the basic control information is placed and a falsification verification process based on falsification verification data included in the block data and executing a contents utilization process based on the decrypted contents utilization control information under a condition that it is confirmed that the data are free from falsification.

58. An information processing method according to claim 55, further comprising:

selecting, from among data of a plurality of blocks which form the contents utilization control information, the data of a plurality of blocks including basic control information and extended control information; and executing a decryption process for the selected plurality of blocks in a unit of a block, executing a falsification verification process for the data based on falsification verification data included in the data of the plural blocks, and executing a contents utilization process based on the decrypted contents utilization control information under a condition that it is confirmed that the data are free from falsification.

59. A computer executing an information processing method for executing a data recording process on an information recording medium for allowing utilization management that differs among different contents, comprising:

a processor producing falsification verification data for contents utilization control information corresponding to each of contents management units set in order to perform individual utilization management control;

the processor executing an encryption process using a unit key set corresponding to each of the contents management units to produce encrypted data; and the processor executing a generation and recording process for the encrypted contents utilization control information including the falsification verification data.

60. An information processing method according to claim 59, further comprising sectioning the contents utilization control information into blocks having a predetermined data amount, generating a block key through a cryptographic process using a block seed extracted from the composition data of each of the blocks and the unit key, generating block encrypted data with the block key and recording the block encrypted data on (original): An information recording medium.

61. An information processing method according to claim 60, wherein the block seed is extracted from block configuration data which does not configure the contents utilization control information.

62. An information processing method according to claim 60, further comprising:

sectioning the contents utilization control information into different categories of basic control information and extended control information;

placing the basic control information into one block; and producing falsification verification data for the data of the block in which the basic control information is placed; and placing the falsification verification data into the same block and recording the data of the block.

63. An information processing method according to claim 60, further comprising:

sectioning the contents utilization control information into different categories of basic control information and extended control information;

placing the basic control information into one block;

producing falsification verification data for the data of the block in which the basic control information is placed;

placing the falsification verification data into the same block and recording the data of the block; and producing second falsification verification data for the data which include all data of the basic control information and the extended control information and recording the second falsification verification data.

64. A computer executing a computer program for executing a reproduction process of contents of a utilization management object, comprising:

a receiver performing an acquisition step of acquiring contents utilization control information corresponding to a contents management unit stored on an information recording medium;

a processor performing a decryption step of using a unit key set corresponding to the contents management unit to execute a decryption process in a unit of a block of block data which forms the contents utilization control information and has a predetermined data amount;

the processor performing a step of executing a falsification verification process based on falsification verification data included in the block data; and a step of executing a contents utilization process based on the decrypted contents utilization control information under a condition that it is confirmed that the data are free from falsification, wherein the contents are utilized.

65. A computer executing a computer program for executing a data recording process on an information recording medium for allowing utilization management that differs among different contents, comprising:

a processor performing a step of producing falsification verification data for contents utilization control information corresponding to each of contents management units set in order to perform individual utilization management control;

the processor performing an encryption processing step of executing an encryption process using a unit key set corresponding to each of the contents management units to produce encrypted data; and the processor performing a step of executing a generation and recording process for the encrypted contents utilization control information including the falsification verification data.

* * * * *